United States Patent
Steinberg et al.

(10) Patent No.: US 8,553,949 B2
(45) Date of Patent: Oct. 8, 2013

(54) CLASSIFICATION AND ORGANIZATION OF CONSUMER DIGITAL IMAGES USING WORKFLOW, AND FACE DETECTION AND RECOGNITION

(75) Inventors: Eran Steinberg, San Francisco, CA (US); Peter Corcoran, Galway (IE); Yury Prilutsky, San Mateo, CA (US); Petronel Bigioi, Galway (IE); Mihai Ciuc, Bucharest (RO); Stefanita Ciurel, Bucharest (RO); Constantin Vertan, Bucharest (RO)

(73) Assignee: DigitalOptics Corporation Europe Limited, Galway (IE)

( * ) Notice: Subject to any disclaimer, the term of this patent is extended or adjusted under 35 U.S.C. 154(b) by 847 days.

(21) Appl. No.: 12/554,258

(22) Filed: Sep. 4, 2009

(65) Prior Publication Data
US 2010/0066822 A1 Mar. 18, 2010

Related U.S. Application Data

(63) Continuation-in-part of application No. 10/764,335, filed on Jan. 22, 2004, now Pat. No. 7,587,068.

(51) Int. Cl.
G06K 9/00 (2006.01)
G06K 9/62 (2006.01)

(52) U.S. Cl.
USPC .......................................... 382/118; 382/224

(58) Field of Classification Search
USPC .................... 382/118, 224; 348/77
See application file for complete search history.

(56) References Cited

U.S. PATENT DOCUMENTS

| 4,047,187 A | 9/1977 | Mashimo et al. |
| 4,317,991 A | 3/1982 | Stauffer |
| 4,376,027 A | 3/1983 | Smith et al. |
| RE31,370 E | 9/1983 | Mashimo et al. |
| 4,638,364 A | 1/1987 | Hiramatsu |
| 5,018,017 A | 5/1991 | Sasaki et al. |
| RE33,682 E | 9/1991 | Hiramatsu |

(Continued)

FOREIGN PATENT DOCUMENTS

| GB | 2370438 A1 | 6/2002 |
| JP | 5260360 A2 | 10/1993 |

(Continued)

OTHER PUBLICATIONS

Non-Final Office Action mailed May. 24, 2010, for U.S. Appl. No. 12/506,124, filed Jul. 20, 2009.

(Continued)

Primary Examiner — John Strege
(74) Attorney, Agent, or Firm — Andrew V. Smith

(57) ABSTRACT

A processor-based system operating according to digitally-embedded programming instructions performs a method including identifying a group of pixels corresponding to a face region within digital image data acquired by an image acquisition device. A set of face analysis parameter values is extracted from said face region, including a faceprint associated with the face region. First and second reference faceprints are determined for a person using reference images captured respectively in predetermined face-portrait conditions and using ambient conditions. The faceprints are analyzed to determine a baseline faceprint and a range of variability from the baseline associated with the person. Results of the analyzing are stored and used in subsequent recognition of the person in a subsequent image acquired under ambient conditions.

15 Claims, 29 Drawing Sheets

(56) References Cited

U.S. PATENT DOCUMENTS

| | | | |
|---|---|---|---|
| 5,063,603 A | 11/1991 | Burt | |
| 5,164,831 A | 11/1992 | Kuchta et al. | |
| 5,164,992 A | 11/1992 | Turk et al. | |
| 5,227,837 A | 7/1993 | Terashita | |
| 5,280,530 A | 1/1994 | Trew et al. | |
| 5,291,234 A | 3/1994 | Shindo et al. | |
| 5,311,240 A | 5/1994 | Wheeler | |
| 5,384,912 A | 1/1995 | Ogrinc et al. | |
| 5,430,809 A | 7/1995 | Tomitaka | |
| 5,432,863 A | 7/1995 | Benati et al. | |
| 5,488,429 A | 1/1996 | Kojima et al. | |
| 5,496,106 A | 3/1996 | Anderson | |
| 5,500,671 A | 3/1996 | Andersson et al. | |
| 5,576,759 A | 11/1996 | Kawamura et al. | |
| 5,633,678 A | 5/1997 | Parulski et al. | |
| 5,638,136 A | 6/1997 | Kojima et al. | |
| 5,642,431 A | 6/1997 | Poggio et al. | |
| 5,680,481 A | 10/1997 | Prasad et al. | |
| 5,684,509 A | 11/1997 | Hatanaka et al. | |
| 5,706,362 A | 1/1998 | Yabe | |
| 5,710,833 A | 1/1998 | Moghaddam et al. | |
| 5,724,456 A | 3/1998 | Boyack et al. | |
| 5,744,129 A | 4/1998 | Dobbs et al. | |
| 5,745,668 A | 4/1998 | Poggio et al. | |
| 5,774,129 A | 6/1998 | Poggio et al. | |
| 5,774,747 A | 6/1998 | Ishihara et al. | |
| 5,774,754 A | 6/1998 | Ootsuka | |
| 5,781,650 A | 7/1998 | Lobo et al. | |
| 5,802,208 A | 9/1998 | Podilchuk et al. | |
| 5,812,193 A | 9/1998 | Tomitaka et al. | |
| 5,818,975 A | 10/1998 | Goodwin et al. | |
| 5,835,616 A | 11/1998 | Lobo et al. | |
| 5,842,194 A | 11/1998 | Arbuckle | |
| 5,844,573 A | 12/1998 | Poggio et al. | |
| 5,852,823 A | 12/1998 | De Bonet | |
| 5,870,138 A | 2/1999 | Smith et al. | |
| 5,911,139 A | 6/1999 | Jain et al. | |
| 5,911,456 A | 6/1999 | Tsubouchi et al. | |
| 5,978,519 A | 11/1999 | Bollman et al. | |
| 5,991,456 A | 11/1999 | Rahman et al. | |
| 6,053,268 A | 4/2000 | Yamada | |
| 6,072,904 A | 6/2000 | Desai et al. | |
| 6,097,470 A | 8/2000 | Buhr et al. | |
| 6,101,271 A | 8/2000 | Yamashita et al. | |
| 6,128,397 A | 10/2000 | Baluja et al. | |
| 6,142,876 A | 11/2000 | Cumbers | |
| 6,148,092 A | 11/2000 | Qian | |
| 6,188,777 B1 | 2/2001 | Darrell et al. | |
| 6,192,149 B1 | 2/2001 | Eschbach et al. | |
| 6,234,900 B1 | 5/2001 | Cumbers | |
| 6,246,790 B1 | 6/2001 | Huang et al. | |
| 6,249,315 B1 | 6/2001 | Holm | |
| 6,263,113 B1 | 7/2001 | Abdel-Mottaleb | |
| 6,268,939 B1 | 7/2001 | Klassen et al. | |
| 6,282,317 B1 | 8/2001 | Luo et al. | |
| 6,301,370 B1 | 10/2001 | Steffens et al. | |
| 6,332,033 B1 | 12/2001 | Qian | |
| 6,349,373 B2 | 2/2002 | Sitka et al. | |
| 6,351,556 B1 | 2/2002 | Loui et al. | |
| 6,389,181 B2 | 5/2002 | Shaffer et al. | |
| 6,393,148 B1 | 5/2002 | Bhaskar | |
| 6,400,470 B1 | 6/2002 | Takaragi et al. | |
| 6,400,830 B1 | 6/2002 | Christian et al. | |
| 6,404,900 B1 | 6/2002 | Qian et al. | |
| 6,407,777 B1 | 6/2002 | DeLuca | |
| 6,418,235 B1 | 7/2002 | Morimoto et al. | |
| 6,421,468 B1 | 7/2002 | Ratnakar et al. | |
| 6,430,307 B1 | 8/2002 | Souma et al. | |
| 6,430,312 B1 | 8/2002 | Huang et al. | |
| 6,438,264 B1 | 8/2002 | Gallagher et al. | |
| 6,456,732 B1 | 9/2002 | Kimbell et al. | |
| 6,459,436 B1 | 10/2002 | Kumada et al. | |
| 6,473,199 B1 | 10/2002 | Gilman et al. | |
| 6,501,857 B1 | 12/2002 | Gotsman et al. | |
| 6,502,107 B1 | 12/2002 | Nishida | |
| 6,504,942 B1 | 1/2003 | Hong et al. | |
| 6,504,951 B1 | 1/2003 | Luo et al. | |
| 6,516,154 B1 | 2/2003 | Parulski et al. | |
| 6,526,161 B1 | 2/2003 | Yan | |
| 6,554,705 B1 | 4/2003 | Cumbers | |
| 6,556,708 B1 | 4/2003 | Christian et al. | |
| 6,564,225 B1 | 5/2003 | Brogliatti et al. | |
| 6,567,775 B1 | 5/2003 | Maali et al. | |
| 6,567,983 B1 | 5/2003 | Shiimori | |
| 6,606,398 B2 | 8/2003 | Cooper | |
| 6,633,655 B1 | 10/2003 | Hong et al. | |
| 6,661,907 B2 | 12/2003 | Ho et al. | |
| 6,697,503 B2 | 2/2004 | Matsuo et al. | |
| 6,697,504 B2 | 2/2004 | Tsai | |
| 6,754,389 B1 | 6/2004 | Dimitrova et al. | |
| 6,760,465 B2 | 7/2004 | McVeigh et al. | |
| 6,765,612 B1 | 7/2004 | Anderson et al. | |
| 6,783,459 B2 | 8/2004 | Cumbers | |
| 6,801,250 B1 | 10/2004 | Miyashita | |
| 6,826,300 B2 | 11/2004 | Liu et al. | |
| 6,850,274 B1 | 2/2005 | Silverbrook et al. | |
| 6,876,755 B1 | 4/2005 | Taylor et al. | |
| 6,879,705 B1 | 4/2005 | Tao et al. | |
| 6,888,955 B2 * | 5/2005 | Masumoto et al. | 382/118 |
| 6,928,231 B2 | 8/2005 | Tajima | |
| 6,940,545 B1 | 9/2005 | Ray et al. | |
| 6,965,684 B2 | 11/2005 | Chen et al. | |
| 6,993,157 B1 | 1/2006 | Oue et al. | |
| 6,999,605 B2 * | 2/2006 | Kitagawa et al. | 382/118 |
| 7,003,135 B2 | 2/2006 | Hsieh et al. | |
| 7,020,337 B2 | 3/2006 | Viola et al. | |
| 7,020,345 B2 * | 3/2006 | Tsai et al. | 382/274 |
| 7,027,619 B2 | 4/2006 | Pavlidis et al. | |
| 7,035,456 B2 | 4/2006 | Lestideau | |
| 7,035,467 B2 | 4/2006 | Nicponski | |
| 7,038,709 B1 | 5/2006 | Verghese | |
| 7,038,715 B1 | 5/2006 | Flinchbaugh | |
| 7,046,339 B2 | 5/2006 | Stanton et al. | |
| 7,050,607 B2 | 5/2006 | Li et al. | |
| 7,064,776 B2 | 6/2006 | Sumi et al. | |
| 7,082,212 B2 | 7/2006 | Liu et al. | |
| 7,092,555 B2 | 8/2006 | Lee et al. | |
| 7,099,510 B2 | 8/2006 | Jones et al. | |
| 7,110,575 B2 | 9/2006 | Chen et al. | |
| 7,113,641 B1 | 9/2006 | Eckes et al. | |
| 7,119,838 B2 | 10/2006 | Zanzucchi et al. | |
| 7,120,279 B2 | 10/2006 | Chen et al. | |
| 7,151,843 B2 | 12/2006 | Rui et al. | |
| 7,158,680 B2 | 1/2007 | Pace | |
| 7,162,076 B2 | 1/2007 | Liu | |
| 7,162,101 B2 | 1/2007 | Itokawa et al. | |
| 7,171,023 B2 | 1/2007 | Kim et al. | |
| 7,171,025 B2 | 1/2007 | Rui et al. | |
| 7,175,528 B1 | 2/2007 | Cumbers | |
| 7,187,786 B2 | 3/2007 | Kee | |
| 7,190,829 B2 | 3/2007 | Zhang et al. | |
| 7,190,843 B2 * | 3/2007 | Wei et al. | 382/274 |
| 7,200,249 B2 | 4/2007 | Okubo et al. | |
| 7,218,759 B1 | 5/2007 | Ho et al. | |
| 7,227,976 B1 | 6/2007 | Jung et al. | |
| 7,254,257 B2 | 8/2007 | Kim et al. | |
| 7,274,822 B2 | 9/2007 | Zhang et al. | |
| 7,274,832 B2 | 9/2007 | Nicponski | |
| 7,315,631 B1 | 1/2008 | Corcoran et al. | |
| 7,317,816 B2 | 1/2008 | Ray et al. | |
| 7,324,670 B2 | 1/2008 | Kozakaya et al. | |
| 7,330,570 B2 | 2/2008 | Sogo et al. | |
| 7,357,717 B1 | 4/2008 | Cumbers | |
| 7,440,594 B2 | 10/2008 | Takenaka | |
| 7,515,740 B2 | 4/2009 | Corcoran et al. | |
| 7,551,755 B1 | 6/2009 | Steinberg et al. | |
| 7,555,148 B1 | 6/2009 | Steinberg et al. | |
| 7,558,408 B1 | 7/2009 | Steinberg et al. | |
| 7,564,994 B1 | 7/2009 | Steinberg et al. | |
| 7,587,068 B1 | 9/2009 | Steinberg et al. | |
| 7,715,597 B2 | 5/2010 | Costache et al. | |
| 7,783,085 B2 | 8/2010 | Perlmutter et al. | |
| 8,199,979 B2 | 6/2012 | Steinberg et al. | |
| 8,224,039 B2 * | 7/2012 | Ionita et al. | 382/118 |

(56) References Cited

U.S. PATENT DOCUMENTS

| | | |
|---|---|---|
| 2001/0028731 A1 | 10/2001 | Covell et al. |
| 2001/0031142 A1 | 10/2001 | Whiteside |
| 2001/0041020 A1 | 11/2001 | Shaffer et al. |
| 2002/0105662 A1 | 8/2002 | Patton et al. |
| 2002/0106114 A1 | 8/2002 | Yan et al. |
| 2002/0113879 A1 | 8/2002 | Battle et al. |
| 2002/0114535 A1 | 8/2002 | Luo |
| 2002/0136433 A1 | 9/2002 | Lin |
| 2002/0141586 A1 | 10/2002 | Margalit et al. |
| 2002/0154793 A1 | 10/2002 | Hillhouse et al. |
| 2002/0168108 A1 | 11/2002 | Loui et al. |
| 2002/0172419 A1 | 11/2002 | Lin et al. |
| 2003/0025812 A1 | 2/2003 | Slatter |
| 2003/0035573 A1 | 2/2003 | Duta et al. |
| 2003/0048926 A1 | 3/2003 | Watanabe |
| 2003/0048950 A1 | 3/2003 | Savakis et al. |
| 2003/0052991 A1 | 3/2003 | Stavely et al. |
| 2003/0059107 A1 | 3/2003 | Sun et al. |
| 2003/0059121 A1 | 3/2003 | Savakis et al. |
| 2003/0084065 A1 | 5/2003 | Lin et al. |
| 2003/0086134 A1 | 5/2003 | Enomoto |
| 2003/0107649 A1 | 6/2003 | Flickner et al. |
| 2003/0118216 A1 | 6/2003 | Goldberg |
| 2003/0122839 A1 | 7/2003 | Matraszek et al. |
| 2003/0156202 A1 | 8/2003 | Van Zee |
| 2003/0158838 A1 | 8/2003 | Okusa |
| 2003/0210808 A1 | 11/2003 | Chen et al. |
| 2004/0005086 A1* | 1/2004 | Wolff et al. ............... 382/118 |
| 2004/0008258 A1 | 1/2004 | Aas et al. |
| 2004/0052418 A1 | 3/2004 | DeLean |
| 2004/0145660 A1 | 7/2004 | Kusaka |
| 2004/0210763 A1 | 10/2004 | Jonas |
| 2004/0213454 A1 | 10/2004 | Lai et al. |
| 2004/0223063 A1 | 11/2004 | DeLuca et al. |
| 2004/0264780 A1 | 12/2004 | Zhang et al. |
| 2005/0013479 A1 | 1/2005 | Xiao et al. |
| 2005/0036676 A1 | 2/2005 | Heisele |
| 2005/0063569 A1 | 3/2005 | Colbert et al. |
| 2005/0069208 A1 | 3/2005 | Morisada |
| 2006/0006077 A1 | 1/2006 | Mosher et al. |
| 2006/0018521 A1 | 1/2006 | Avidan |
| 2006/0104488 A1 | 5/2006 | Bazakos |
| 2006/0110014 A1 | 5/2006 | Philomin et al. |
| 2006/0120599 A1 | 6/2006 | Steinberg et al. |
| 2006/0140055 A1 | 6/2006 | Ehrsam et al. |
| 2006/0140455 A1 | 6/2006 | Costache et al. |
| 2006/0177100 A1 | 8/2006 | Zhu et al. |
| 2006/0177131 A1 | 8/2006 | Porikli |
| 2006/0228040 A1 | 10/2006 | Simon et al. |
| 2006/0239515 A1 | 10/2006 | Zhang et al. |
| 2006/0251292 A1 | 11/2006 | Gokturk et al. |
| 2007/0011651 A1 | 1/2007 | Wagner |
| 2007/0091203 A1 | 4/2007 | Peker et al. |
| 2007/0098303 A1 | 5/2007 | Gallagher et al. |
| 2007/0154095 A1 | 7/2007 | Cao et al. |
| 2007/0154096 A1 | 7/2007 | Cao et al. |
| 2007/0195996 A1 | 8/2007 | Kitamura |
| 2007/0201853 A1* | 8/2007 | Petschnigg ............... 396/155 |
| 2008/0137919 A1 | 6/2008 | Kozakaya et al. |
| 2008/0144966 A1 | 6/2008 | Steinberg et al. |
| 2010/0158324 A1* | 6/2010 | Liu .............................. 382/118 |

FOREIGN PATENT DOCUMENTS

| | | | |
|---|---|---|---|
| KR | 10-2004-0034342 A | 4/2004 | |
| KR | 1020040034342 A | 4/2004 | |
| KR | 10-2006-000366 A | 1/2006 | |
| KR | 1020060003666 A | 1/2006 | |
| WO | 2007/142621 A1 | 12/2007 | |
| WO | WO-2007142621 A1 | 12/2007 | |
| WO | 2008/015586 A2 | 2/2008 | |
| WO | 2008/017343 A1 | 2/2008 | |
| WO | WO-2008015586 A2 | 2/2008 | |
| WO | 2008/015586 A3 | 8/2008 | |
| WO | 2008/109622 A1 | 9/2008 | |

OTHER PUBLICATIONS

Beymer, David, "Pose-Invariant face Recognition Using Real and Virtual Views, A.I. Technical Report No. 1574", Massachusetts Institute of Technology Artificial Intelligence Laboratory, 1996, pp. 1-176.

Bradski Gary et al., "Learning-Based Computer Vision with Intel's Open Source Computer Vision Library", Intel Technology, 2005, pp. 119-130, vol. 9—Issue 2.

Chang, T., "Texture Analysis and Classification with Tree-Structured Wavelet Transform", IEEE Transactions on Image Processing, 1993, pp. 429-441, Vol, 2—Issue 4.

Chen at al., "Face annotation for family photo album management", International Journal of Image and Graphics, 2003, vol. 3—Issue 1.

Corcoran Peter et al., "Combining PCA-based Datasets without Retraining of the Basis Vector Set", IEEE PC, 2007.

Corcoran, P. et al., "Automatic Indexing of Consumer Image Collections Using Person Recognition Techniques", Digest of Technical Papers. International Conference on Consumer Electronics, 2005, pp. 127-128.

Corcoran, Peter et al., "Automated sorting of consumer image collections using face and peripheral region image classifiers", IEEE Transactions on Consumer Electronics, 2005, pp. 747-754, vol. 51—Issue 3.

Costache, G. et al., "In-Camera Person-Indexing of Digital Images", Digest of Technical Papers. International Conference on Consumer Electronics, 2006, pp. 339-340.

Demirkir, C. et al., "Face detection using boosted tree classifier stages", Proceedings of the IEEE 12th Signal Processing and Communications Applications Conference, 2004, pp. 575-578.

Drimbarean, A.F. et al., "Image Processing Techniques to Detect and Filter Objectionable Images based on Skin Tone and Shape Recognition", International Conference on Consumer Electronics, 2001, pp. 278-279.

Hall, P. et al., "Adding and subtracting eigenspaces with eigenvalue decomposition and singular value decomposition", Image and Vision Computing, 2002, pp. 1009-1016, Vol, 20—Issue 13-14.

Hall. P. et al., "Adding and Subtracting eigenspaces", Proceedings of the British Machine Vision Conference, 1999, pp. 453-462, vol. 2.

Hall, P. et al., "Merging and Splitting Eigenspace Models, XP008081056, ISSN: 0162-8828, Pages Searching Authority, or the Declaration, for PCT Application No. PCT/IB2007/003985, dated Jun. 17, 2008, 20 pages.", IEEE Transactions on Pattern Analysis and Machine Intelligence, 2000, pp. 1042-1049, vol. 22—Issue 9.

Hall, Peter et al., "Incremental Eigenanalysis for Classification, XP008091807", British Machine Vision Conference, pp. 286-295.

Huang et al., "Image Indexing Using Color Correlograms", Proceedings of the 1997 Conference on Computer Vision and Pattern Recognition (CVPR '97), 1997, pp. 762.

Jebara, Tony S. et al., "3D Pose Estimation and Normalization for Face Recognition, A Thesis submitted to the Faculty of Graduate Studies and Research in Partial fulfillment of the requirements of the degree of Bachelor of Engineering", Department of Electrical Engineering, 1996, pp. 1-121, McGill University.

Kusumoputro, B. et al., "Development of 3D Face Databases by Using Merging and Splitting Eigenspace Models, retrieved from URL: http://www.wseas.us/e-library/conferences/digest2003lpapersl466-272.pdf on Sep. 16, 2008", WSEAS Trans. on Computers, 2003, pp. 203-209, vol. 2—Issue 1.

Lai, J.H. et al., "Face recognition using holistic Fourier in variant features, http://digitalimaging.inf.brad.ac.uk/publication/pr34-1.pdf.", Pattern Recognition, 2001, pp. 95-109, vol. 34.

Lei et al., "A CBIR Method Based on Color-Spatial Feature", IEEE Region 10th Ann. Int. Conf., 1999.

Liu, X. et al., "Eigenspace updating for no-stationary Process and its application to face recognition", Pattern Recognition, 2003, pp, 1945-1959, vol. 36—Issue 9, Elsevier.

Melenchon, Javier et al., "Efficiently Downdating, Composing and Splitting Singular Value Decompositions Preserving the Mean Infor-

(56) References Cited

OTHER PUBLICATIONS mation", Pattern Recognition and Image Analysis Lecture Notes in Computer Science, 1990, pp. 436-443, vol. 4478, Springer-Verlag.
PCT Notification of Transmittal of the International Search Report and the Written Opinion of the International Searching Authority, or the Declaration, for PCT Application No. PCT/IB2007/003985, dated Jun. 17, 2008, 20 pages.
PCT Notification of Transmittal of the International Search Report and the Written Opinion of the International Searching Authority, or the Declaration, for PCT Application No. PCT/US2007/75136, dated Oct. 1, 2008, 9 pages.
PCT Notification of Transmittal of the International Search Report and the Written Opinion of the International Searching Authority, or the Declaration, for PCT Application No. PCT/US2008/055831, dated Jun. 24. 2008, 7 Pages.
Shah, Agam, "CES: Digital Imaging Market Set to Explode, panel says, The Industry Standard, Internet article www.thestandard.com/article.php?story=20040108174644982", 2004, 2 pages.
Stricker et al., "Similarity of color images", SPIE Proc, 1995, pp. 1-12, vol. 2420.
Tjahyadi et al., "Application of the DCT Energy Histogram for Face Recognition", Proceedings of the 2nd International Conference on Information Technology for Application, 2004, pp. 305-310.
Turk, Matthew et al., "Eigenfaces for Recognition", Journal of Cognitive Neuroscience, 1991, 17 pgs, vol. 3—Issue 1.
US Final Office Action dated Oct. 16, 2007, cited in co-pending related U.S. Appl. No. 10/764,335, 47 pgs.
US Office Action dated Oct. 3, 2008, cited in co-pending related U.S. Appl. No. 10/764,274, 53 pgs.
US Office Action dated Sep. 25, 2008, cited in co-pending related U.S. Appl. No. 10/763,801, 50 pgs.
US Office Action dated Sep. 29, 2008, cited in co-pending related U.S. Appl. No. 10/764,336, 35 pgs.
US Office Action dated Sep. 29, 2008, cited in co-pending related U.S. Appl. No. 10/764,339, 46 pgs.
Viola, P. et al., "Rapid Object Detection using a Boosted Cascade of Simple Features", Proceedings of the 2001 IEEE Computer Society Conference on Computer Vision and Pattern Recognition, 2001, pp. I-511-I-518, vol. 1.
Viola, P. et al., "Robust Real-Time Face Detection", International Journal of Computer Vision, 2004, pp. 137-154, vol. 57—Issue 2, Kluwer Academic Publishers.
Wan, S.J. et al., "Variance-based color image quantization for frame buffer display", S. K. M. Wong Color Research & Application, 1990, pp. 52-58, vol. 15—Issue 1.
Xin He et al., "Real-Time Human Face Detection in Color Image", International Conference on Machine Learning and Cybernetics, 2003, pp. 2915-2920, vol. 5.
Yang, Ming-Hsuan et al., "Detecting Faces in Images: A Survey, ISSN:0162-8828, http://portal.acm.org/citation.cfm?id=505621&coll=GUIDE&dl=GUIDE&CFID=680-9268&CFTOKEN=82843223.", IEEE Transactions on Pattern Analysis and Machine intelligence archive, 2002, pp. 34-58, vol. 24—Issue 1, IEEE Computer Society.
Zhang, Jun et al., "Face Recognition: Eigenface, Elastic Matching, and Neural Nets", Proceedings of the IEEE, 1997, pp. 1423-1435, vol. 85—Issue 9.
Zhao, W. et al., "Face recognition: A literature survey, ISSN: 0360-0300, http://portal.acm.org/citation.cfm?id=954342&coll=GUIDE& dl=GUIDE&CFID=680-9268&CFTOKEN=82843223.", ACM Computing Surveys (CSUR) archive, 2003, pp. 399-458, vol. 35—Issue 4, ACM Press.
Zhu Qiang et al., "Fast Human Detection Using a Cascade of Histograms of Oriented Gradients", Proceedings of the 2006 IEEE Computer Society Conference on Computer Vision and Pattern Recognition, 2006, pp. 1491-1498, IEEE Computer Society.
M. Chantler, M. Petrou, A. Penirsche, M. Schmidt, G. McGunnigle, Classifying Surface Texture while Simultaneously Estimating Illumination Direction. International Journal of Computer Vision, 62(1-2), 83-96. Special Issue on Texture Analysis and Synthesis, 2005.
A.Z. Kouzani: "Illumination-effects compensation in facial images", Systems, Man, and Cybernetics, 1999. IEEE SMC '99 Conference Proceedings. 1999 IEEE International Conference on Tokyo, Japan Oct. 12-15, 1999, Piscataway, NJ, USA, IEEE, US, vol. 6, Oct. 12, 1999, pp. 840-844, XP010363112 ISBN: 978-0-7803-5731-0 DOI: http://dx.doi.org/10.1109/ICSMC.1999.816661.
Maricor Soriano, Elzbieta Marszalec, J. Birgitta Martinkauppi, Matti Pietikåinen: "Making saturated facial images useful again," Proceedings of the SPIE, SPIE, Bellingham, VA, vol. 3826, Jun. 17, 1999, pp. 113-121, XP002325961 ISSN: 0277-786X DOI: http://dx.doi.org/10.1117/12.364317.
Sinjini Mitra, Marios Savvides: "Gaussian Mixture Models Based on the Frequency Spectra for Human Identification and Illumination Classification", Automatic Identification Advanced Technologies, 2005. Fourth IEEE Work Shop on Buffalo, NY, USA Oct. 17-18, 2005, Piscataway, NJ, USA, IEEE, Oct. 17, 2005, pp. 245-250, XP010856528 ISBN: 978-0-7695-2475-7.
Terence Sim, Simon Baker, and Maan Bsat: "The CMU Pose, Illumination, and Expression (PIE) database," Automatic Face and Gesture Recognition, 2002. Proceedings. Fifth IEEE International Conference on, IEEE, Piscataway, NJ, USA, May 20, 2002, pp. 53-58, XP010949335 ISBN: 978-0-7695-1602-8.
Chen et al., Face Annotation for Family Photo Album Management, International Journal of Image and Graphics, 2003, pp. 1-14, vol. 3, No. 1.
Non-Final Rejection, dated Jun. 29, 2012, for U.S. Appl. No. 12/631,711, filed Dec. 4, 2009.
EPO Communication regarding the transmission of the European search report, European search opinion, and Supplementary European search report, for European patent application No. 08743677.0, report dated Feb. 14, 2011, 6 Pages.
Peter Corcoran, and Gabriel N. Costache, Combining PCA-based Datasets without Retraining of the Basis Vector Set, IEEE PC Jul. 24, 2007.
Jun Zhang, et al., Face Recognition: Eigenface, Elastic Matching, and Neutral Nets, Proceedings of the IEEE, vol. 85, No. 9, Sep. 1997, p. 1423-1435.
G. Costache, R. Mulryan, E. Steinberg, and P. Corcoran, In-camera person-indexing of digital images, Consumer Electronics, 2006, ICCE '06. 2006, Digest of Technical Papers, International Conference on Jan. 7-11, 2006 pp. 2.
Hall P., et al., Merging and Splitting Eigenspace Models, IEEE Transactions on Pattern Analysis and MachineIntelligence, IEEE Service Center, Los Alamitos, CA, US, vol. 22, No. 9, Sep. 1, 2000, pp. 1042-1049, XP008081056, ISSN: 0162-8828.
Hall, P., et al., Adding and subtracting eigenspaces with eigenvalue Decomposition and Singular Value Decomposition, Image and Vision Computing, Guildford, GB, vol. 20, No. 13-14, Dec. 1, 2002, pp. 1009-1016, XP008089613, ISSN: 0262-8856.
Hall, P., et al., Adding and Subtracting eigenspaces, Proceedings of the British Machine Vision Conference, vol. 2, Sep. 16, 1999, pp. 453-462, XP008089611.
B. Kusumoputro, et al., Development of 3D Face Databases by using Merging and Splitting Eigenspace Models, WSEAS Trans. on Computers, vol. 2, No. 1, 2003, pp. 203-209, XP008091807.
Liu, X., et al., Eigenspace updating for non-stationary Process and its application to face recognition, Pattern Recognition, Elsevier, GB, vol. 36. No. 9, Sep. 1, 2003, pp. 1945-1959, XP004429544, ISSN: 0031-3203.
Corcoran, Peter, et al., Automated sorting of consumer image collections using face and peripheral region image classifiers, IEEE Transactions on Consumer Electronics, IEEE Service Center, New York, NY, US, vol. 51, No. 3, Aug. 1, 2005, pp. 747-754, XP008089612, ISSN: 0098-3063.
Javier Melenchon, et al., Efficiently Downdating, Composing and Splitting Singular Value Decompositions Preserving the Mean Information, Pattern Recognition and Image Analysis Lecture Notes in Computer Science, LNCS, Springer Berlin Heidelberg, BE, vol. 4478, Jan. 1, 1900, pp. 436-443, XP019060614, ISBN: 978-3-540-72848-1.

(56) References Cited

OTHER PUBLICATIONS

Patent Abstracts of Japan, publication No. 2001-283224, Face Collating Method, Recording Medium Stored with the Collating Method and Face Collator, published Oct. 12, 2001, 1 page.

Patent Abstracts of Japan, publication No. 2001-216518, Method and Device for Matching and Recording Medium, published Aug. 10, 2001, 1 page.

Patent Abstracts of Japan, publication No. 2006-259974, Image-Processing Method and Device, published Sep. 28, 2006, 1 page.

* cited by examiner

CLASSIFICATION AND ORGANIZATION OF CONSUMER DIGITAL IMAGES USING WORKFLOW, AND FACE DETECTION AND RECOGNITION

CROSS-REFERENCE TO RELATED APPLICATIONS

This application is a continuation in part (CIP) of U.S. patent application Ser. No. 10/764,335, filed Jan. 22, 2004, now U.S. Pat. No. 7,587,068, which is one of a series of contemporaneously-filed patent applications including U.S. Ser. No. 10/764,339, now U.S. Pat. No. 7,551,755, entitled, "Classification and Organization of Consumer Digital Images using Workflow, and Face Detection and Recognition"; U.S. Ser. No. 10/764,336, now U.S. Pat. No. 7,558,408, entitled, "A Classification System for Consumer Digital Images using Workflow and User Interface Modules, and Face Detection and Recognition"; U.S. Ser. No. 10/764,335, now U.S. Pat. No. 7,587,068, entitled, "A Classification Database for Consumer Digital Images"; U.S. Ser. No. 10/764,274, now U.S. Pat. No. 7,555,148, entitled, "A Classification System for Consumer Digital Images using Workflow, Face Detection, Normalization, and Face Recognition"; and U.S. Ser. No. 10/763,801, now U.S. Pat. No. 7,564,994, entitled, "A Classification System for Consumer Digital Images using Automatic Workflow and Face Detection and Recognition".

BACKGROUND

1. Field of the Invention

The invention relates to digital image processing, particularly to the field of automatic or semiautomatic grouping and classification of images in a database or image collection and based on the occurrence of faces in the images and the identification and classification of such faces.

2. Description of the Related Art

The techniques of face detection and face recognition are each being explored by those skilled and a great many advancement have been made in those respective fields in recent years. Face detection has to do with the problem of locating regions within a digital image or video sequence which have a high probability of representing a human face. Face recognition involves the analysis of such a "face region" and its comparison with a database of known faces to determine if the unknown "face region" is sufficiently similar to any of the known faces to represent a high probability match. The related field of tracking involves face or identity recognition between different frames in a temporal sequence of frames. A useful review of face detection is provided by Yang et al., in IEEE Transactions on Pattern Analysis and Machine Intelligence, Vol. 24, No. 1, pages 34-58, January 2002. A review of face recognition techniques is given in Zhang et al., Proceedings of the IEEE, Vol. 85, No. 9, pages 1423-1435, September 1997.

Other related art refers to the grouping, classification, management, presentation and access to collections of digital images in databases, file-systems or other storage mechanisms, being based on image content, global image parameters, or image metadata. Such content based approaches analyze the image content using spatial color distribution, texture, shape, object location and geometry, etc. However they do not explicitly teach to utilize face recognition in conjunction with these techniques, or to initially detect faces in their images, prior to applying a recognition process. It is recognized in the present invention that an advantageous system that provides automation in the detection, recognition and classification processing of digital images would be highly desirable.

None of the prior art references that are cited throughout the description below provides this feature. Many of the classification techniques described are applied to entire images and they do not teach to detect faces in an image, or to perform recognition of such faces. Many of these references concentrate on methods storing or accessing images using databases, but they do not employ in conjunction with these methods the advantageous image processing techniques described by inventors of the present invention.

Some of the medical applications provide classification and archiving of images into particular groups that are associated with a single customer. For example, the customer may be a patient and the classification may be particularly related to medical diagnosis or treatment applications where a large amount of image data (X-rays, Ultrasound scans, etc) which is related to a single patient may be gathered. However, these do not utilize face recognition as a means to compile or manage this image data, i.e., a user is expected to categorize the image according to the associated patient.

Further references available in the literature of the related art describe multi-format transcoding applications for visual data. Others describe means for constructing digital photo albums. These references do not, however, teach to use image processing techniques in the management or access of the data.

At this point we note that the present invention is presented primarily in the context of collections of consumer digital images which would be generated by a typical user of a digital camera. Such an image collection is in a constant state of growth as new sets of images are added every time the user off-loads pictures from the camera onto his computer. Because the image set is in a constant state of flux, it is often not practical to perform database-wide sorting, grouping or management operations every time a few images are added to the collection, because this would put an excessive load on the users computer. Much of the related art literature describes how to function with and operate on a large static image collection. Thus when a sizeable batch of new images is added, as will often happen when a camera is offloaded, these related art teaching do not describe how to perform significant image processing and database-wide testing to determine similarities between new and existing database images and then group and store the new images before the user can access and enjoy his pictures. In reality the application of image processing techniques, or of other image-related tools is understood by the inventors in the present invention as being an ongoing process for collections of consumer images and for the design of these tools, where possible, to operate as automated or semi-automated background processes for applications in consumer imaging.

There is a very compelling need for new and improved tools to manage collections of images. More particularly, there is a need for tools, which can manage and organize image collections which are in a constant state of change and growth. It is also important that these tools can manage and organize such ad-hoc collections using methods, which are easily understandable by the layman and, where possible that such tools can function in semi- or fully-automatic modes so that their work of cataloging and organizing is almost imperceptible to the end-user.

BRIEF DESCRIPTION OF THE DRAWINGS

FIG. 1(a) is an outline of the main system components implemented as a computer program.

FIG. 1(b) shows an alternative embodiment in which certain aspects of the system of the preferred embodiment, including the face detection and recognition modules, are implemented within an image capture appliance such as a digital camera, while the remaining aspects are implemented as a computer program on a desktop computer.

FIG. 1(c) shows an embodiment wherein the system is entirely implemented within a digital camera.

FIG. 6(a) shows a frontal candidate region which is incorrectly oriented and must be rotated into an upright position prior to applying the face recognition module;

FIG. 6(b) is a frontal candidate region which is of a reduced size and must be enlarged prior to applying the recognition module;

FIG. 6(c) is a correct frontal face candidate region which does not require either orientation or size correction;

FIGS. 6(d) and 6(e) illustrate two non-frontal face candidate regions which require pose normalization in addition to size and orientation normalization.

FIGS. 7(a)-7(c) illustrate how a simple 1-D scaling of a normalized face model can be used to model the majority of face candidate regions with good accuracy;

FIGS. 7(d)-7(f) illustrate how a 2-D face candidate region can be mapped onto such a 3-D normalized face model with 1-D scaling along the horizontal axis.

INCORPORATION BY REFERENCE

Figure 1A:
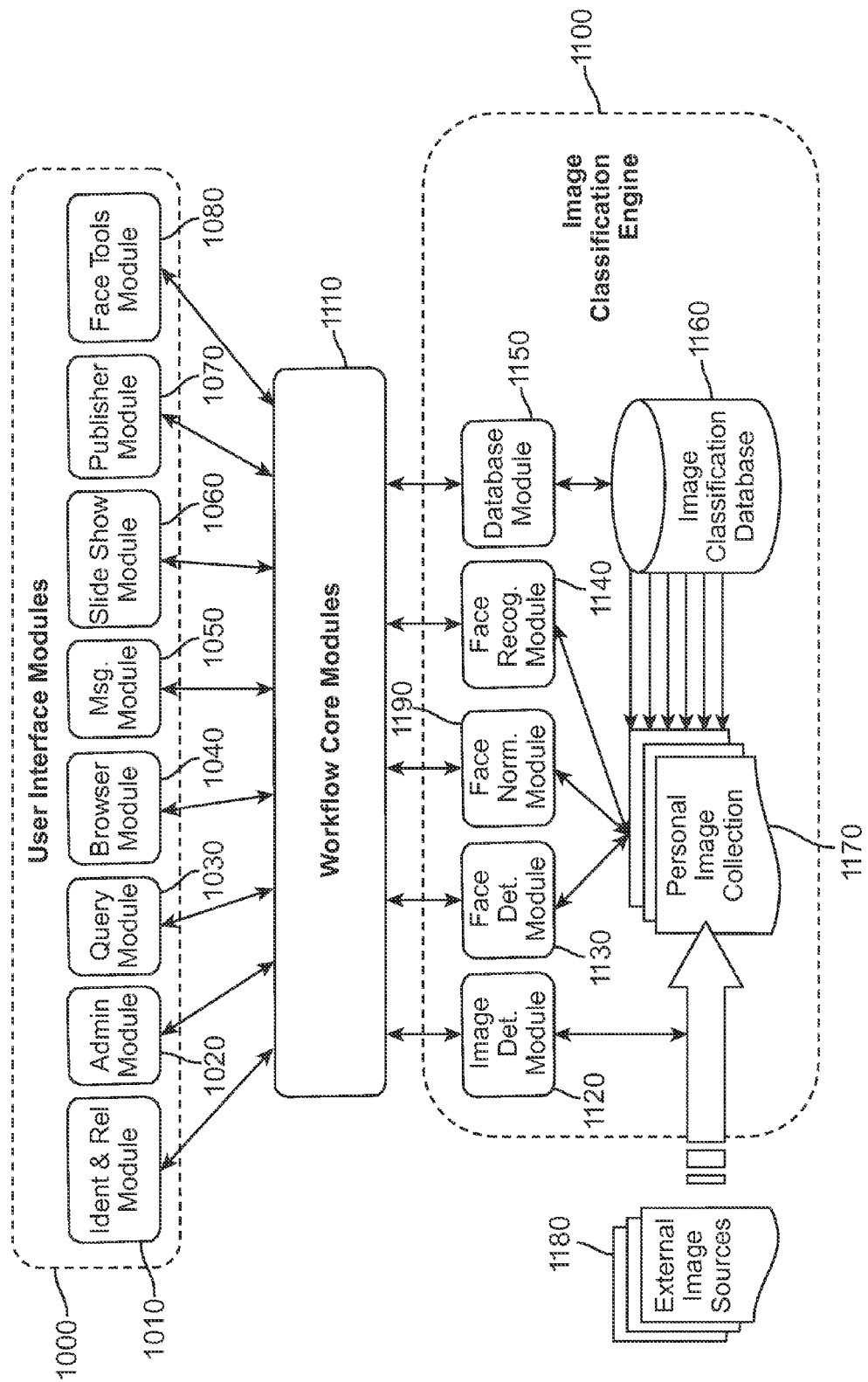
FIGS. 1(a)-1(c) shows an overview of the principle components of the invention.

What follows is a cite list of references each of which is, in addition to that which is described as background, the invention summary, the abstract, the brief description of the drawings and the drawings themselves, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description herein:

U.S. Pat. Nos. RE33682, RE31370, 4,047,187, 4,317,991, 4,367,027, 4,638,364, 5,291,234, 5,488,429, 5,638,136, 5,710,833, 5,724,456, 5,781,650, 5,812,193, 5,818,975, 5,835,616, 5,852,823, 5,870,138, 5,911,139, 5,978,519, 5,991,456, 6,072,904, 6,097,470, 6,101,271, 6,128,397, 6,148,092, 6,188,777, 6,192,149, 6,249,315, 6,263,113, 6,268,939, 6,282,317, 6,301,370, 6,332,033, 6,349,373, 6,351,556, 6,393,148, 6,404,900, 6,407,777, 6,421,468, 6,438,264, 6,456,732, 6,459,436, 6,473,199, 6,501,857, 6,502,107, 6,504,942, 6,504,951, 6,516,154, 6,526,161, 6,564,225, and 6,567,983;

United States published patent applications no. 2003/0084065, 2003/0059121, 2003/0059107, 2003/0052991, 2003/0048950, 2003/0025812, 2002/0172419, 2002/0168108, 2002/0114535, 2002/0105662, and 2001/0031142;

Japanese patent application no. JP5260360A2;

British patent application no. GB0031423.7; and

Yang et al., IEEE Transactions on Pattern Analysis and Machine Intelligence, Vol. 24, no. 1, pp 34-58 (January 2002).

Illustrative Definitions

"Face Detection" involves the art of isolating and detecting faces in an image; Face Detection includes a process of determining whether a human face is present in an input image, and may include or is preferably used in combination with determining a position and/or other features, properties, parameters or values of parameters of the face within the input image;

"Face Recognition" involves the art of matching an unknown facial region from an image with a set of "known" facial regions.

"Image-enhancement" or "image correction" involves the art of modifying a digital image to improve its quality. Such modifications may be "global" applied to the entire image, or "selective" when applied differently to different portions of the image. Some main categories non-exhaustively include:

(i) Contrast Normalization and Image Sharpening.

(ii) Image Crop, Zoom and Rotate.

(iii) Image Color Adjustment and Tone Scaling.

(iv) Exposure Adjustment and Digital Fill Flash applied to a Digital Image.

(v) Brightness Adjustment with Color Space Matching; and Auto-Gamma determination with Image Enhancement.

(vi) Input/Output device characterizations to determine Automatic/Batch Image Enhancements.

(vii) In-Camera Image Enhancement (viii) Face Based Image Enhancement.

"Auto-focusing" involves the ability to automatically detect and bring a photographed object into the focus field.

A "pixel" is a picture element or a basic unit of the composition of an image or any of the small discrete elements that together constitute an image.

"Digitally-Acquired Image" includes an image that is digitally located and held in a detector.

"Digitally-Captured Image" includes an image that is digitally recorded in a permanent file and/or preserved in a more or less permanent digital form.

"Digitally-Detected Image": an image comprising digitally detected electromagnetic waves.

A "face region" is a region of a main image which has been determined to contain a human face. In particular, it may contain a substantially oval, skin-colored region which has physical features corresponding to eyes, nose and mouth, or some portion of a face or subset of these facial features.

A face region is preferably "normalized" in accordance with the invention. Prior to extracting face classifier parameters (see definition below) from a face region, it is preferably first transformed into a normalized form. This may involve any or all of three principle steps: (i) resizing to a standard "size", e.g., based on the separation of eyes, nose and/or mouth; (ii) "orientation" in an upright or other selected direction which may involve rotation of the face region; and (iii) orientation to compensate for up/down or left/right variations in the "pose" of the face. Note that these normalizations may usually performed in reverse order in accordance with a preferred embodiment: first pose normalization is implemented, followed by orientation normalization and finally the face region is normalized for size. A fourth form of normalization that may be preferably performed is luminance normalization (see below definition), but it is treated or characterized separately from the above, which are referred to as spatial normalizations.

"Face classifier parameters" are a set of values of vector and/or scalar classifiers extracted from a normalized face region. Typical examples of such a set of classifiers could be: (i) principle component vectors, (ii) independent component vectors, (iii) 2D fourier transform components, (iv) wavelet transform components, (v) gabor components, etc. Note that several face classifier techniques may be combined to provide a definitive faceprint.

The set of face classifier parameters associated with a particular face region is known as the "faceprint" of that face region. The faceprint is preferably a set of face classifier parameters and may be subdivided into two or more subsets of face classifier parameters which may overlap.

An "archived faceprint" is a set of face classifier parameters associated with a particular fate region ultimately extracted from a parent image and preferably normalized, and stored in the main recognition database, preferably along with links to the parent image and the face region.

A "known identity" is a set of (database) associations between a known person or other object and one or more face classes comprising one or more archived faceprints.

The following process is referred to as "luminance normalization". It is common for horizontal and/or vertical variations in luminance levels to occur across a face region due to the ambient lighting at the time an image was captured or other factors such as artificial sources or flashes. In this case, certain types of face classifiers may be distorted and it may be advantageous to normalize luminance levels across the face region prior to extracting face classifier parameters in accordance with a preferred embodiment. As typical variations are linear in form and as the variations manifest themselves principally in skin-colored pixels, it is relatively straightforward to adjust each image pixel of a face region to approximately compensate for such luminance variations caused by ambient lighting.

When two or more faceprints lie within a certain geometric distance of each other in facespace, they may be preferably grouped into a single face class. If a newly determined faceprint lies within this geometric distance of the face class, then this face class may be expanded to include the new faceprint, or may be added to the face class without expansion if the all of its face classifier values lie within the existing face class parameter value ranges. This existing face class is referred to as a "prior face class". If the newly determined faceprint is not sufficiently close to any prior face class then a new face class may be created for it.

"Image category data" is referred to as a set of user-defined categories for describing a user's personal or other collection of images. Some pre-defined categories may also be provided in the workflow and/or database modules of the software. Much of the data may, however, be user-defined in order to allow each user to chose image descriptors which are most useful and relevant to their own personal image collection. Examples of image category data include: Beach Fun, Ski Slopes, Mountain Fun (holiday categories); Garden Views, Vegetable Season 2002, My Flowers 2003 (for a gardener); Kids Birthdays 2003, The New Baby, Summer Camps, High School Graduations (for a family), and so on. Note that much of this data may be recorded manually, although face recognition data can preferably also assist in linking certain known identities with certain image categories.

"Image data" is data which helps describe and/or categorize a particular parent image. Examples include time & location when an image was captured (these may be automatically generated and recorded by some cameras); associations between the image and defined "events" or "occasions" such as weddings, graduations, christenings, etc; associations between the image and defined "places" or "locations" such as a holiday resort, a city, a relative's house or a country; associations between an image and a set of user-defined categories relating, for example, to a specialized hobby, a family member, a particular family or holiday activity, or however else a user wishes to define & categorize their personal images.

"Identity data" is data relating to an individual person (or an identifiable object or pet) which can include personal data such as nickname, name, home address, phone number, etc. It may also encompass data relating to interpersonal or family relationships or memberships of social or relationship based groups of persons or objects. Each person (or object) may have a key "identifier" which may be stored in an "ID List" and links to additional identity data associated with the person or object, including, e.g., recognition data.

"Face recognition data is the data by which known persons (or objects, pets or other identities) are linked, e.g., to an appearance table which may contain one or more appearances associated with that person (or object, identity, etc.). Each appearance may be linked to a list of face classes each of which may contain one or more faceprints.

"Added value services tools" are software modules which can provide additional value to an image collection, such as by leveraging the face-related data stored in the system database. As an example, one tool might allow an end-user to search all images containing members of the Jones family and determine what overlap exists with members of the Smith family ("face search tool"). This could then allow the user to determine what members, if any, of the Jones family should be invited to a social event such as a 21$^{st}$ birthday party for one of the daughters of the Smith family ("relationship tool"); additional tools could then prepare invitation cards with collages ("collage tool") of the family members and print these invitations ("print manager tool").

A "unique identifier" may include a filename of an originally-acquired image which contains one or more face regions.

An "identification listing" is referred to as a list of names of people who have been identified by an image classification engine. If a new face is detected, but cannot or is not associated with any known identity, then a new identity is preferably created in the identification listing. This list may link to additional personal data records relating to known identity and also to face recognition data associated with the known identity and a list of images, if any, which contain the person or other identity.

An "image list" is a list of images which have been processed by the image classification engine, and preferably includes links to the locations of the originals of images on an external storage subsystem. In an alternative embodiment, the original binary image data may be maintained within the system database. In a further alternative embodiment, the original image data may be maintained by a remote Web service and the list of original image may include a list of URLs to link to the original binary data of each image. In all of these embodiments, it may be desirable that changes in the storage location of a particular image should be notified to the workflow module of the preferred embodiment which can incorporate such modification into the system database.

"Metadata" may be typically character/ASCII data which is stored in a header region within an image file. For the industry standard Jpeg format, e.g., metadata is stored in EXIF format which includes a series of data tags each of which delimits an ASCII text region. Typical data to be stored as metadata may include data pertaining to the conditions of image acquisition, data pertaining to the manufacturer and model of camera or image acquisition apparatus, data pertaining to the focal length, aperature and/or f-stop settings of an electronic camera lens, data pertaining to the size of original image, the quality of Jpeg compression, the mode of camera flash settings, if used, white and color balance settings (if available), and so on. Note that manufacturers may define custom tags and that binary data may be stored in metadata fields—although it is not common—provided that certain encoding precautions are taken. In the context of the preferred embodiment, metadata refers to any data stored within the original image file other than the raw binary data of the original image itself.

DETAILED DESCRIPTION OF THE PREFERRED EMBODIMENTS

A system, method and techniques are now described for applying digital image processing using face detection and face recognition techniques to identify the persons contained within a digital image, which may be part of a personal or other image collection. An exemplary database structure is also described, for sorting, grouping, accessing, browsing and/or managing images based on the identities of the persons found within an image.

Additionally, workflow techniques are described which (i) simplify the initial training of the face recognition module when it is initialized for a new collection of images; (ii) allow the user to select between a number of alternative persons when the face recognition module is uncertain of the identity of a particular face located by the face detector module; (iii) allow the user to enter details of a new face which should be added to the list of known persons; and/or (iv) allow the user to construct database queries based on the persons identified within their personal database.

Overview

In a preferred embodiment, a collection of images is typically stored on a personal computer, although alternatively it may also be stored on a local database server, or on a remote server which is accessed over a network, or as part of an offline storage such as CDs, DVD or an embedded device, or otherwise. The preferred embodiment involves a computer program with a number of linked components which altogether create the workflow module. An image detection module determines when new images are added to the image collection and alerts the main workflow module which then activates a face detection module which scans the image to determine if faces are present. If faces are found, then they are preferably normalized and face prints are generated. Then, the images and face prints, together with the locations of the detected facial-regions and other face classifier parameter data, are made available for the face recognition module to extract, enhance and scan the facial regions and compares their faceprints with a database of "known faceprints". In general, each of the internal modules can be implemented in an automated, user assisted or fully manual mode. In addition, each of the modules may shift over time form a mostly manual to mostly automated operation. This is achieved as part of a "training" capability of the system.

In an alternative embodiment the face detection module may be implemented entirely within an image capture device and the locations of detected faces may be marked as metadata tags within the saved image. When the image is later transferred to a computer on which the main workflow module is active, the presence and locations of faces in an image may be detected and the remainder of the recognition and classification process may proceed as described below.

In a further embodiment both the face detection and face recognition modules are implemented in the image capture device and the faceprints derived from faces detected in an image are recorded in the image metadata for later processing by the main workflow module. In this embodiment, a compressed version of the main faceprint database is also implemented within the image capture device. This micro-classification database is derived from the main database using a grouping algorithm which reduces the number of faceprints (and, where appropriate, face classes) associated with a particular identity. This is achieved using a clustering algorithm which will be described in the detailed description of this embodiment. The micro-classification database can be loaded into the camera flash memory, or alternatively may be created and maintained on removable storage such as a compact-flash card. In a variation of this embodiment a reduced functionality version of the main workflow module is implemented in the image capture device and this allows interaction between the face detection and recognition modules and the user-interface (UI) software modules of said imaging device. In all cases the face recognition process may be augmented by additional processing steps when images are transferred to a computer on which the main workflow module is active. This can be used to do focusing, metering and/or framing on particular people in a group. In addition, a face in an image may be matched to one or more sub-groups or to all known faces in the database. Alternatively, a model of a single face or subset may be matched against the image.

In one embodiments, the image capture device may access the main classification database over a network connection. In another embodiment, the entire system, including the classification database, can be implemented within an image capture device such as a digital camera or scanner.

The face recognition process is a particular aspect which differs from conventional face recognition means. A detailed description is given in the main embodiment section, so an overview is merely provided here. When a faceprint is returned to the main workflow module from the face recognition module the "N" most probable matches are determined by searching the face recognition data tables in the image classification database and if the majority of these matches have the same "identity", and the workflow module is running in "automatic mode", then a successful "automatic match" is considered to have taken place. If, however, there are several equally probable identity matches, or the workflow module is running in "manual" or "learning" mode, then the face recognition module passes these images onto the workflow module which then presents these possible matches to the user and requests that they select a matching "person" for this facial image.

The user may select one of the "known persons" or may create a new "person" with an associated set of "profile" data in the image classification database. This database includes an appearance list for each of the "known persons" containing one or more identities and a table of face classes associated with each such identity. Multiple identities can be associated with each person because people typically change their appearance in daily life. Examples of such instances of varying appearance may be handling people with/without make-up; with/without beard or moustache or with different hair styles; with/without sunburn or tan; with/without glasses, hats, etc; and at different ages. In addition, there may be a chronological description where the faces progress over time which may manifest in changes in hairstyle, hair color or lack thereof, skin smoothness, etc. Within each face class is preferably grouped a set of similar faceprints which are associated with that face class for that person. The database module may also access additional information on individual images, including image metadata, camera metadata, global image parameters, color histogram or correlogram information, etc., which may assist in categorization and search of images. If the user selects a "known identity", then if this new faceprint is sufficiently close to one of the face classes for that identity, it will be preferably added to that face class. Otherwise, in "manual" or "learning" mode the user may be shown a typical image representative of each face class and asked which face class the faceprint should be added to, or if they wish to create a new face class for that person. In "auto" mode, a new face class will be created by the workflow module for that identity.

If the user chooses to create a new identity because the detected face is a new friend, family member or acquaintance, then they may enter a nickname (or "handle") to identify that person. Other additional data may be entered such as the person's full name, phone number, address, birthday, association with other "identities" in the database (e.g. a member of the Sullivan Family; a friend of Pat; Uncle Bill, etc. . . . ) and so on.

Thus, each faceprint in the database module is preferably associated with a single identity, while each identity is associated with one or more face classes containing one or more faceprints. Now as a person's image collection grows the number of faceprints associated with each identity in the database will increase in proportion. The number of face classes associated with each identity will generally increase more slowly as it is unlikely that a person will have more than 5-10 distinct face classes associated with them. This, in turn, will facilitate and improve the accuracy of the recognition process so that after a time most faces will be identified automatically. However, when the number of faceprints associated with an identity increases beyond a certain threshold the recognition process will become significantly slower. To tackle this problem, the faceprints within a particular face class may be "clustered" or "averaged" into a smaller and more definitive set of faceprints when their number increases beyond a certain threshold. This process may be automated and serve to improve the response time of the face recognition module as the size of the faceprint database grows. This feature represents an improvement on existing recognition techniques as it allows for incremental improvement of the recognition process without requiring a complete re-training, and thus a change in the fundamental basis vectors used to describe the faceprints.

A person or other being such as a pet, or an inanimate object such as a home or automobile, may have more than a single identity which accommodates the occasional radical changes in appearance which can occur with people or other identities from time to time in a person's life. In general herein, the example of a person will be used, but the descriptions are meant to apply to other animate and inanimate identities that may be the subject of a collection of pictures such as pets, automobiles, rooms in a house, etc. Consider, for example, the case of a new baby who within a couple of years becomes a toddler, later a child and an adolescent; or to take some more radical examples, consider an adult male who decides to grow a moustache, or beard, or a young woman who frequently wears make-up on social occasions. Many other factors can affect a person's appearance in ways which will confuse a conventional face recognition system such as wearing glasses or hats, having sunburn, etc. By permitting a plurality of identity groupings for a single person, the system of the preferred embodiment provides a means to overcome such disadvantages which are inherent in the prior art.

In an alternative embodiment where the face recognition process occurs within the capture device, the image may already contain one or more face locations and faceprints. This information may be embedded in the image itself with other metadata provided by the capture device. In this case, the face detection operation may be skipped entirely and the face recognition module might not extract faceprints from the image, as is usually preferred. Thus the workflow module can immediately begin to search for matches in the database of "known" faceprints. The faceprints will typically depend on the database that was used to perform the matching, and thus on a latest training set. In some cases, is the main database is retrained after prints are copied to the device, e.g., in the case of Fisher faces, then the prints on the device will not generally be used to match to the main database, i.e., the prints may only be valid until the next re-training.

This describes how the information contained in the faceprint database may be gathered over time. However the user of the system may be more concerned with how he or she may access and use this information to add value to an image collection and to facilitate the organization and management of the collection. Thus, in addition to program modules, the system preferably includes a set of image manipulation tools. These include a query module which assists the end user build up database queries based on "identity" and "relationship" searches on the faceprint database. These queries may be combined with more conventional queries derived from additional image information stored in the database that may include, but is not limited to, image metadata, camera metadata, global image parameters, image color histogram, color correlogram, etc. Thus the user might search for "all Summer Holiday 2002 pictures of members of the Sullivan family at the Beach". The query module will find all such pictures and present these to the user in the browser module. Additional tools which can be incorporated include a slideshow module which assists the user in preparing slideshow animations from the retrieved images; an image enhancement module which implements many of the techniques described in our face tools application(s) to enhance the retrieved pictures and a publisher module which facilitates the generation of Xmas and birthday cards, party invitations, and other fun stuff.

The database may also include some relational description between individual users. The relationship or proximity between people may be defined via a family tree, friends graph, chronological relationship, geographical location, GPS information, and occurrence of multiple faces in a single image.

The following table provides such relations in a textual form. One familiar in the art of creating a database can understand the relation of a database from such information.

| Proximity Parameter | Example |
| --- | --- |
| Family Tree | Joe is Jane and John's Father |
| Friends | John is friendly with Jim |
| | John is a friend of Jim and Jack |
| | but John and Jack are not friends |
| Chronological | Jane and Josephine were Jarret's friend in 2005 |
| | Jackie met Jillian in the summer of 1944 |

| Proximity Parameter | Example |
| --- | --- |
| Geographical Location | Joanne and Jake live in Mexico City |
| | Jennifer travels a lot |
| GPS Data | Joseph's pictures were taken in Nepal |
| Ultiple faces in an image | Jack and Jill have been together in 5 pictures |
| | Jacob was never in the same picture as Jaqueline |

This metadata can be important for classifying a face based on statistical probability. In particular, Bayesian statistics may be implemented for such calculations based on a-priori knowledge. As a simple example, if Image 1000 is of Jim with good probability, and the next image is of Jim and another person, which could be either John or Jack, based on the a-priori knowledge of the relationship (John is friendly with Jim and but John and Jack are not friends) one can statistically conclude that it is of higher probability that the second person is Jim and not Jack. Of course, more sophisticated decisions can be conducted based on the relationships defined above.

On a higher level of database cross correlation, several databases may be shared, combined or used to train a collection of images. For example if Joe creates a database and Jim his father just installs the face detection software, Jim may use Joes database of the family to jump start the training process.

A particular advantage is achieved in that the system may allow consumers to organize and archive their personal image collections based on the people present in each image. This can facilitate access to a personal image collection and greatly enhance the value of the images contained therein.

A further advantage is that the workflow solution can be a combination of fully manual, user assisted or fully automated. A further related advantage is that the system can tend toward perfecting itself and move towards a more automated solution as the training progresses.

An additional advantage is that the system provides a workflow solution to allow users to transparently train the program to recognize faces. A further advantage in this regard is that a user does not require a large pre-selected database of facial images to perform the initial training of the recognition engine. Instead this training can occur over a period of time and the proportion of fully-automatic detections may be increased as the number of faceprints in the main database grows.

An associated advantage is that the system does not require re-training of the fundamental basis vectors set used to describe "faceprints" and thus the face recognition data which is stored in the main system database can be shared with other users. A further advantage is that the system provides a means for the user to search their image collection(s) using queries which include the identity of an individual or a group of people. A further advantage of the invention is that it provides tools to allow face-based enhancement of individual images.

In addition, the system of the preferred embodiment includes tools which add significant value to a personal image collection by facilitating the creation of "identity-based" slideshows, Xmas and birthday cards, party and dinner invitations, etc. Yet a further advantage is that the face recognition database may be shared among related users to simplify the training detection and archival process.

Overall Workflow

Figure 1B:
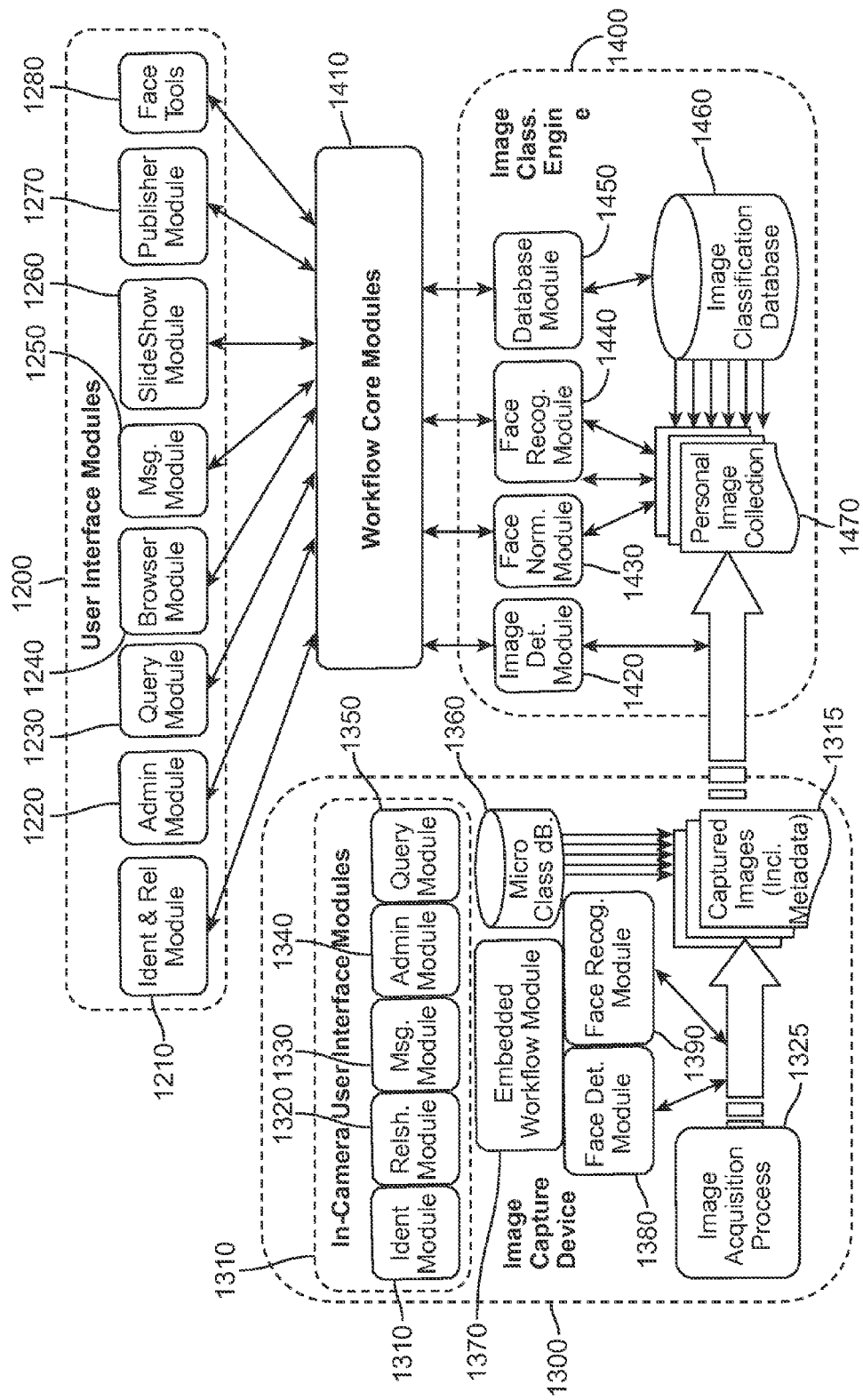

FIGS. 1(a)-1(b) schematically illustrate an overall workflow of the face classification system in accordance with a preferred embodiment. In particular, FIG. 1(a) describes an external computer application, and FIG. 1(b) describes a system, wherein certain functions are implemented on the image acquisition device. In yet a third embodiment, the system is entirely or substantially resident on the image acquisition device.

The system, as illustrated at FIGS. 1(a)-1(b), is separated into two major subcomponents: (i) an image classification engine [1100] and (ii) a series of user interface modules [1000]. The interworking of these two system components is controlled by the core workflow module [1110]. The user interface modules allow interaction with a user of the system and are mostly designed to provide the user with improved tools to access and derive added-value from their image collection.

Examples of such user-interface modules include, but are not limited to, (i) an Identity & Relationship Browser module [1010] which allows a user to browse known persons based on their relationships and memberships of social groupings. This module links such persons and groups to image groupings from the users image collection which include the person being browsed, or members of a group of persons with a particular relationship to that person; (ii) a Query module [1030] which allows a user to construct more complex search criteria for their image collection (e.g. find all pictures which include "John" and "Jane" and are "Social Events" involving the "Brady Family"); (iii) an Image Browser module [1040] which allows a user to browse each image in their collection and view, and alter, the various information relating to that image including the relationship(s) between an image and different persons, social groups, events and other activities which are known to the system; (iv) a Slideshow [1060] module which provides a user with tools to link and combine image sequences featuring a selected person or social group for viewing as a slideshow, or transmitting the slideshow by e-mail, or storing the links in the system database for future use; (v) a Publisher [1070] module which allows a user to prepare added-value printed items such as cards, parry invitations, collages of pictures, etc, which are based on pictures from the users personal image collection featuring selected persons and/or social groups; and (vi) a Face Tools [1080] module which allows a user to enhance and improve images based on the detection and location of faces in the images.

Additional user-interface modules are provided to allow a user to access and control other system functionality: an Administration module [1020] to allow system configuration and settings to be changed according to user preferences; a Message module [1050] records a log of system messages and is useful to debug or investigate the historical behaviour of the system.

The Image Classification Engine [1100] is the second major system component. This comprises a set of image analysis modules which perform the functions required to determine the identity of a person in a consumer digital image.

The first of these modules is an Image Detection module [1120] alerts the system that at least one new image has been obtained from some external image source; in the context of a desktop PC this could, for example, occur when a compact flash card or CD-ROM is inserted into a removable drive bay of the computer. Those skilled in the art will realize that there are various means, both hardware and software based, to implement such an image detection module. One well-known example is the means by which the Windows OS detects when a new CD is inserted into the CD-ROM drive of a PC and presents the user with a dialog box to select how images on said CD-ROM disc should be managed by the OS. We cite this as one possible implementation of such an image Detection Module.

Once at least one new image is detected it is preferably then analyzed by the Face Detection module [1130]. This module employs a means to determine if facial candidate regions are present in the new image. Although faces are utilized as specifically emphasized in images of persons and perhaps even pets, other regions may be used such as distinguishing features of automobiles of a collection, or feet of persons who are patients of a podiatrist, and so on. Detailed descriptions of face detection techniques and applications and advantages are set forth further below.

If no such face regions are determined to be present, then the image is marked as a "non-face" image, the relevant entries are made in the system database, and it is added to the users personal image collection. A user may be optionally provided an opportunity to manually mark face regions within the image. Depending on the system settings, the user may be offered an opportunity to manually include other additional information on the image such as the image category, location, or the event or activity it should be associated with. Once the image is stored and its database entry is completed, then control passes back to the Image Detection module [1120] which waits for the next image.

If however the image does contain face-candidate regions then further handling of the image is passed to the Workflow Core module [1110]. This module begins by refining the initial face detection process and extracting the facial candidate regions from the image using the Face Detection module [1130]. These are then passed to the Face Normalization module [1190] which analyzes the lighting, pose, facial features and/or orientation of each face candidate region. Following this analysis, which may involve referencing the entire original image in certain cases, the Face Normalization module [1190] performs certain transformations, shape & texture analysis and filtering on each candidate region and then passes the normalized region back to the Workflow Core module [1110]. This normalized face candidate region will now become the input to the Face Recognition module [1140].

We note that in some cases where extreme variations in lighting conditions, or in the pose or spatial orientation of a candidate face occur, or when a relatively small set of training images are currently available to support the face recognition process that conventional image transformation and filtering techniques may provide an inferior means of image normalization. Thus, in an advantageous alternative embodiment, the face candidate region can be mapped onto a 3D face model which preserves the shape and texture of the original 2D image and allows non-linear lighting and pose compensation to be performed more accurately. Following such compensation, the corrected 3D facial model is projected onto a new, frontal and lighting normalized 2D facial image.

The next component of the Image Classification Engine [1100] is the Face Recognition module [1140]. Before describing this module in more detail, however, it is useful to provide a generalized introduction to face recognition techniques and thus to describe the concept of a Faceprint as used herein.

Figure 8A:
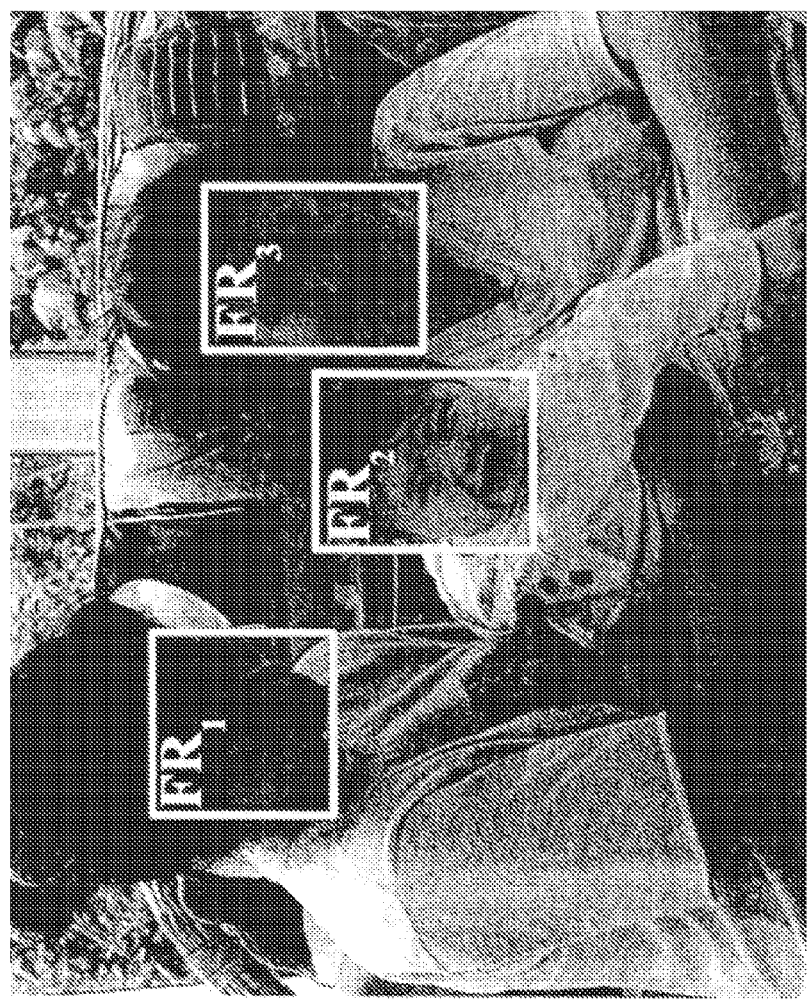
FIGS. 8(a)-8(b) illustrate how three face regions (FR1, FR2 and FR3) may be mapped to faceprints (FP1, FP2, and FP3) in a 3-component face space.
Figure 8B:
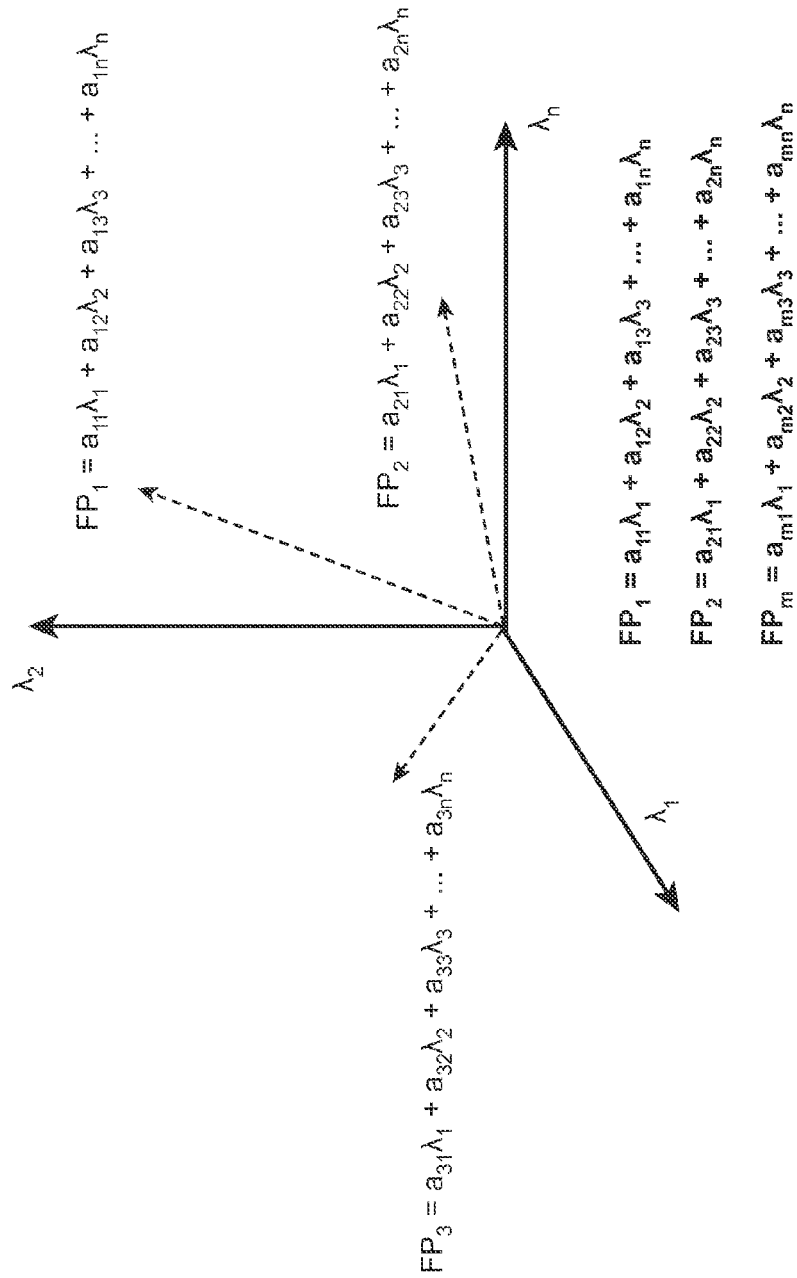
Figure 8C:
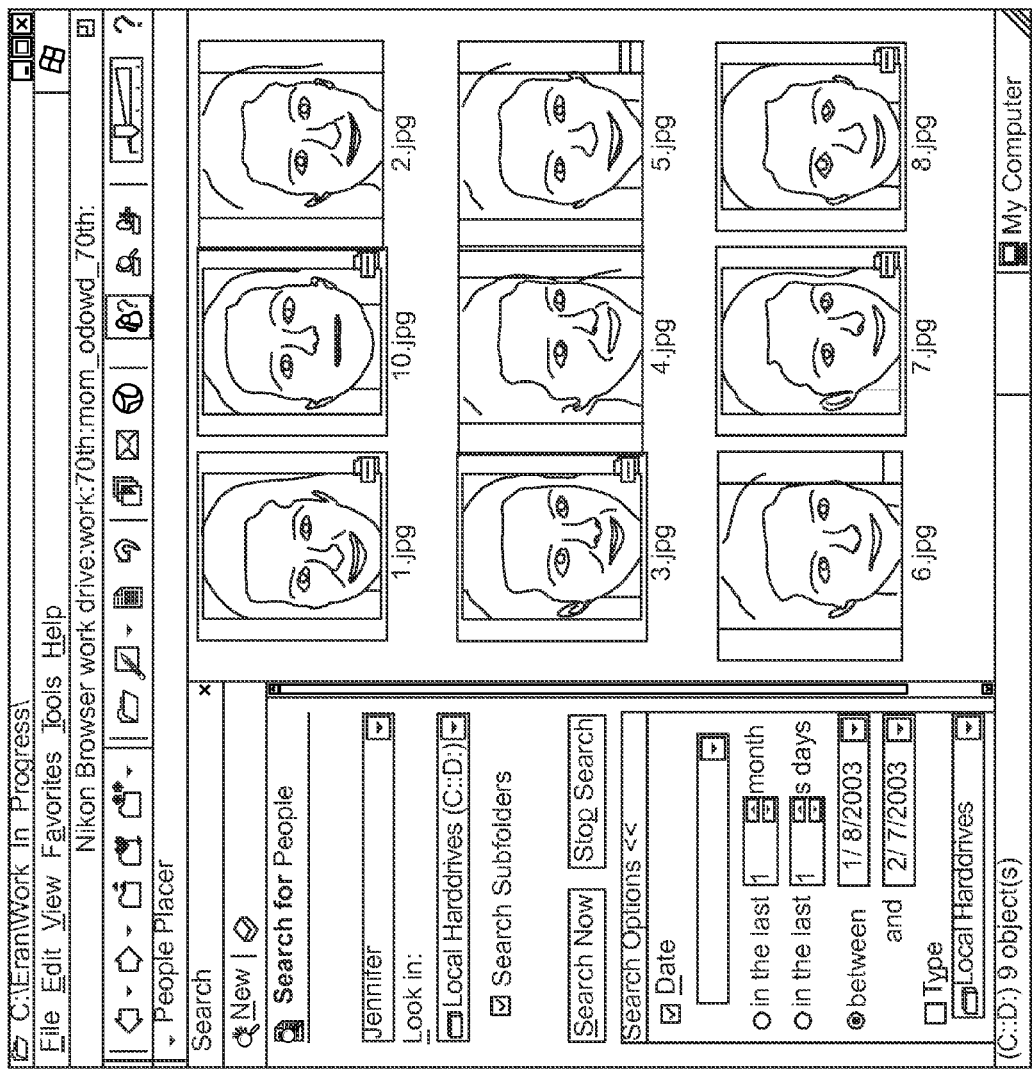
FIG. 8(c) illustrates multiple face regions extracted from digital images that have subtle pose, orientational, illumination and/or size distortions to be adjusted automatically upon detection in a normalization process in accordance with a preferred embodiment prior to automatic or semi-automatic face recognition processing.

After a face candidate region is detected and normalized, we will have a nice "frontal" mugshot of a person, such as the image labeled 10.jpg in FIG. 8(c). This is referred to as a "face region" or a "confirmed face region". Now, the mugshot proceeds to be further processed. There are quite a few ways of doing this, and the preferred method involves doing a 2D transform which is analogous to doing a Fourier Transform from the spatial to frequency domains. In the case of the preferred embodiment, we actually go from the spatial domain (mugshot) to a "face-space" (FS) domain. The most significant components of that "face-space" form the basis vectors which we use to describe and compare the normalized mugshots. The magnitudes of each of these most significant "face-space" (FS) components describe a vector location in FS. Typically, about 20 components (dimensions) are involved to get the most useful results. However, the diagramatic representations are limited to 3 dimensions (or components) for clarity and ease of illustration. FIGS. 8(a)-8(b) illustrate how three face regions (FR1, FR2 and FR3) may be mapped to faceprints (FP1, FP2, and FP3) in a 3-component face space.

In practice, the normalized face regions may or may not be stored as mugshots. Instead, the original image may be stored along with the locations, in that original image, of any detected face regions. Then, data may be stored to allow the normalized face region (mugshot) to be recreated from the original image as desired. The faceprint may be stored for each face region. The faceprints that are what may be advantageously used in accordance with a preferred embodiment to achieve actual recognition of people or objects or other identities.

In some embodiments, the full set of components might not be used of a stored faceprint to compare face regions. It may sometimes be advantageous to have a multi-stage recognition process which uses a combination of several different techniques to extract different face-transform components. For example, there may be three distinct sets of components derived from three different types of face transforms. Examples include principle component analysis (PCA), linear discriminant analysis (LDA), independent component analysis (ICA), and Gabor transforms, among others as may be understood by those skilled in the art upon reviewing the present description. These can be used to perform three distinct sets of recognition tests, or can be partially combined. In a preferred embodiment, we have found that using two distinct types of faceprint data (PCA and LDA, e.g.) in a two stage process confers significant improvement over using either of them separately.

The role of the Face Recognition module [1140] is to generate a feature vector, or Faceprint, for a face candidate region identified in an image. This is returned to the Workflow Core module [1110] where the generated Faceprint is compared with existing identity regions and face classes. This is achieved by accessing the Image Classification Database [1160] via a Database Interface Module [1150]. If the Faceprint can be clearly associated with a single identity region then the face is considered to be positively identified and the Image Classification Database [1160] is updated accordingly. If there is no clear association with a known identity region the user is prompted to manually provide recognition data on the face candidate region and may be presented with a list of "closest" choices. If necessary the user may also create a new identity region and data profile for this Faceprint. The Workflow Core module [1110] then updates the Image Classification Database [1160] accordingly. This process will be described in greater detail below. Finally the image completes its analysis by the Image Classification Engine [1100] and is added to the Personal Image Collection [1170] of the user.

FIG. 1(b) illustrates an alternative embodiment of the invention in which certain components of the system are directly incorporated into an image acquisition appliance, typically a digital camera. In this embodiment certain aspects of the Face Detection, Face Recognition and Core Workflow process are implemented in the camera and the information about the image that is determined from these processes may be incorporated in individual images as Image Metadata (e.g. as custom EXIF tags in a JPEG image). Those skilled in the art will recognize that there are many permutations of the User Interface Modules [1200] and the In-Camera User Interface Modules [1310] which can be implemented and which may be appropriate for different applications and purposes.

Similarly, the functionality of modules from the Image Classification Engine [1400] can be separated in various ways and implemented in part, or indeed in its entirety within the Image Capture Device [1300]. In the embodiment described here a compressed Micro Classification Database [1360] provides an initial dataset for the Face Recognition module [1390]. If the Image Capture Device [1300] is set to operate in "recognition mode" then the Image Acquisition Process [1325] will alert the Face Detection module [1380] when a new image is successfully acquired. If face candidate regions are present in this image the Face Detection module [1380] will alert the Embedded Workflow module [1370] which may use the information derived from the face candidate regions to interact with the user of the Image Capture Device [1300] or may pass the extracted face candidate regions on to the Face Recognition module [1390] to obtain the relevant Faceprint. In this embodiment the Workflow module [1370] does not implement a detailed recognition process, but does store the locations of any candidate face regions and any derived Faceprint(s) in the Metadata of the image. The main recognition process is initiated when images are uploaded from the Image Capture Device [1300] to a user's Personal Image Collection [1470] and essentially follows the same steps described above except that in this embodiment (i) the Face Detection process has already been implemented in the camera and the location of face candidate regions is already available in the image Metadata and (ii) a preliminary Faceprint or even a Recognition Match for each face candidate region may also be available, depending on the quality of the detected candidate region(s). Note that in another embodiment the entire system functionality could be implemented in the Image Capture Device [1300] if sufficient processing power and data storage is available.

Figure 1C:
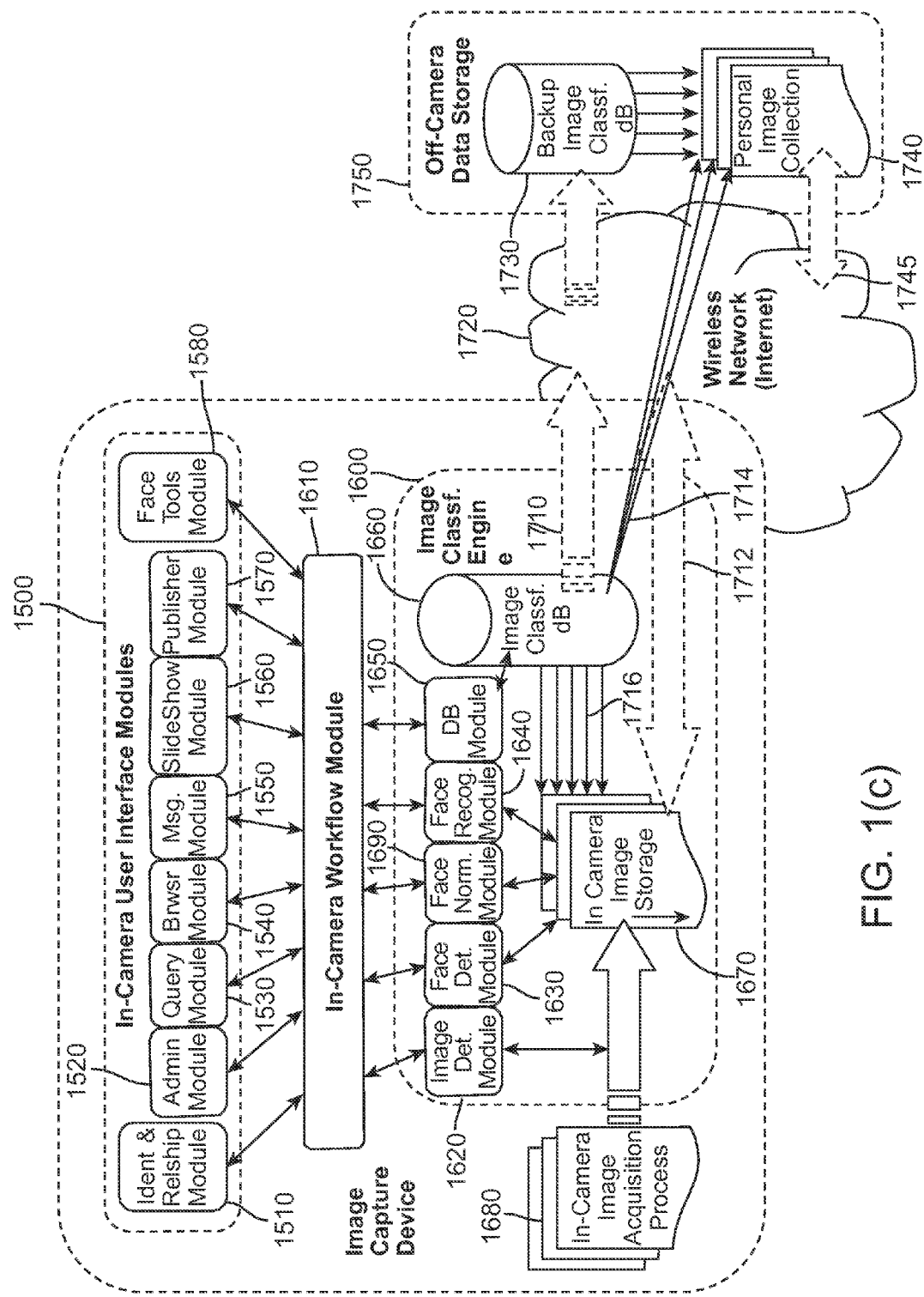

FIG. 1(c) schematically illustrates the in-camera user interface (UI) modules 1500, the workflow module 1610 and the image acquisition engine 1600 each implemented entirely within a digital camera or other image capture device. The in-camera UI modules 1500 shown include an identity and relationship module 1510, an administration module 1520, a query module 1530, a browser module 1540, a message module 1550, a slide show module 1560, a publisher module 1570, and a face tools module 1580.

The image classification engine 1600 includes an image detection module 1620, a face detection module 1630, a face normalization module 1690, a face recognition module 1640 and a database module 1650. Each of these modules of the image classification engine 1600 work in conjunction with the workflow module 1610 in automatic and/or semi-automatic processing of image data. The image detection module 1620 works in conjunction with the in-camera image acquisition process to alert the workflow module that an original image has been captured and initially processed into in-camera image storage 1670. Information from the image classification database 1660 is preferably linked and/or stored with corresponding images, face prints, etc., via connection 1716, into in camera image storage 1670. These stored images are then preferably processed by the face detection module 1630, face normalization module 1690, when one or more faces are detected within the acquired images, and face recognition module 1640 which compares face classifier parameter values of the normalized face regions, or face prints, with archived face prints to discern whether there are matches with known identities. The database module 1650 communicates with an image classification database, e.g., for archiving and recalling face prints, images and related data in accordance with the processing of the workflow module 1610.

The camera shown is configured for preferably wirelessly networking over a network 1720, e.g., over the internet, to off-camera data storage 1750. The wireless network preferably communicates data from the camera to the off-camera storage by a connection 1745 for adding data to a backup image classification database 1730 and/or a personal image collection 1740. The images within the in-camera image storage 1670 and data contained within the image classification database 1660 may be communicated by links 1712 and 1710, respectively, to off-camera storage 1750 or other electronic device via wireless network 1720 and/or hardwired or cable output connection. The bi-directional arrow 1745 indicates that the off-camera data storage 1750, and particularly the personal image collection 1740, can be added to via download via the network 1720, ultimately from the in-camera storage 1670 and/or image classification data base 1660. Arrows 1714 of FIG. 1(*c*) indicate that the personal image collection 1740 within the off-camera storage 1750 correspond to data contained within the image classification database 1650.

As indicated in the above description, it is preferred that a main image collection will still remain outside the camera on some form of Web/Network based storage. Alternatively, the camera may have sufficient storage for a user, although even as in-camera storage capabilities grow, users will still likely prefer to be able to get access to their images without needing the use of the camera, e.g., if the camera is in for servicing to remove dust and thus temporarily off-line, or being used by a friend, or put away while the user is on his/her computer for another reason.

Additionally, in the illustrated embodiment of FIG. 1(*c*), the main image collection (1740) remains in this off-camera data storage (1750) with a backup of the main image classification database (1730) also maintained outside the camera as well as inside it. One advantage for keeping two copies of the database, i.e., one inside the camera and one outside, is that a user may want to use external tools on, say, a home PC to edit the collection without using the camera appliance. As indicated, synchronization between the main image collection (1745) and the internal images of the camera (1712) and the internal and external classification databases (1710) is preferably maintained (in this embodiment) over a wireless network/internet connection (1720).

There can be links from the internal camera database (1660) to both the pictures in the camera (1716) and to other images in the main external image collection (1714). It is also implicit in this embodiment that images may be moved both to and from the camera appliance, over the network link, based on the requirements of user tools (1500) which are all now implemented in the camera.

One particular advantage of implementing key elements of the workflow within a camera or portable imaging device is that account may be taken of local acquisition conditions. Each person may have multiple identities associated with him or her. Each identity may include one or more face classes. One example of the usefulness of such multiple identities is a customization of each identity to a particular set of local acquisition conditions. For example, images captured in full sun on the beach in Hawaii will differ significantly from those captured under flash at nighttime, or a similar set of beach photographs captured on a cloudy day on the beach in Ireland. It is advantageous to be able to match, in a simple way, local conditions with a subset of a person's associated face classes, or alternatively to be able to customize a generic identity derived from multiple overlapping face classes according to the local acquisition conditions.

In a further embodiment, such normalizations may be advantageously achieved using a handheld imaging device.

Many techniques for transforming face data into a feature vector may concentrate the widest variability of the training dataset into the first principle components (or basis vectors) of the faceprint feature vector. Thus, in the exemplary case of an eigenfaces technique, practically all of the luminance variations are concentrated, depending on the dataset, into the first or first and second eigenface basis vectors. Accordingly, methods of normalizing, for illumination, a feature vector based on eigenfaces involve removing the first or first and second eigenfaces when forming the relevant faceprint vector.

Also, on a handheld imaging appliance, such as a digital camera, a convenient method to find a consistent and repeatable baseline level for illumination employs built-in image optimization capabilities of the camera. For example, if a face is located at a set distance of 2-3 m and an image is captured of that face, one can be confident with most state-of-art imaging devices that a uniform and consistent illumination of the face will be achieved regardless of the ambient illumination or whether the shot is an indoor or outdoor one. The acquisition of such an image may be referred to as a main image portrait acquisition or simply main image.

In certain embodiments, it is desirable to force the use of the camera flash in order to acquire a reference image. This will depend on the type of imaging device and the size of main imaging sensor. Many modern cameras, however, have sufficient light gathering capacity to be able to acquire an optimal portrait image indoors without use of flash.

By combining these two techniques, a very powerful determination is achieved of the local range of variability for a particular person's face classes. This range of variability is somewhat analogous to the embodiment involving "clustered face classes" associated with FIG. 12(*c*), where multiple, overlapping face classes are replaced with a single face class with a wider range of variability.

Let us next explain the operation of this new normalization technique. Firstly an image of the person for whom we wish to determine a local face class is captured with the camera in flash mode, enabling it to compensate for any deficiency in the ambient illumination conditions. Then a second image is captured in non-flash mode, or at a lower resolution or with faster exposure settings. This second image provides a measure of the variability introduced by the ambient conditions.

In one embodiment, it is convenient to use a preview image stream of a digital camera. This preview stream is typically captured as a set of raw unprocessed images directly from the image sensor within the camera. It provides a good indication of the raw ambient image acquisition conditions. Further, as it may be captured at a lower resolution than the main image acquisition and at a fixed exposure and acquisition rate (typically 30-60 fps), no compensation for illumination conditions is typically performed on this preview stream. Thus it is an advantageous indicator of extreme ambient conditions when referenced against a main image portrait acquisition.

The camera then process both of these reference images, extracting face regions and processing them to generate a pair of faceprints for each face region. The faceprints associated with each acquired facial image are illustrated in FIG. 15(*a*). A major variability is captured in the first basis vector, or principle component and can be determined by subtracting these, viz: FV_F(1)−FV_NF(1)=VAR. In FIGS. 15(*b*) and 15(*c*), the first component of the flash and non-flash feature vectors are removed, and it is illustrated how this VAR vector can be used to align the higher order components of the remaining flash and non-flash feature vectors (or faceprints). While the main variation between the two faceprints due to local illumination has been removed, there is still a significant variability between the flash and non-flash faceprints. Clearly, the wider the variation between baseline flash and ambient illumination, the greater this variability. Our technique of capturing two reference images enables us to make an accurate determination of this variability using faceprint analysis.

Figure 15A:
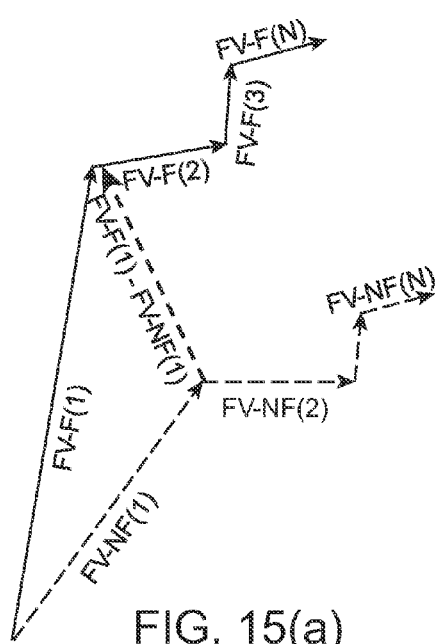
FIG. 15(a) illustrates a faceprint associated with an acquired facial image.
Figure 15B:
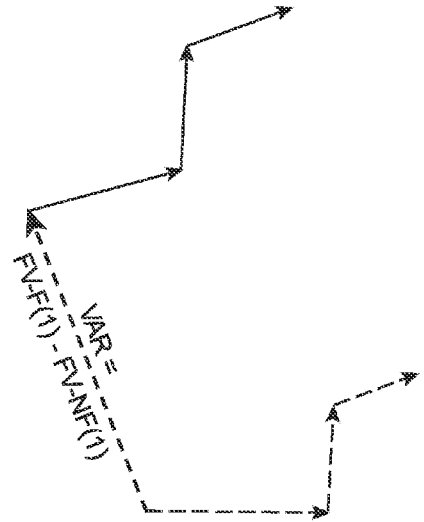
FIGS. 15(b) and 15(c) illustrates how a VAR vector can be used to align higher order components of flash and non-flash feature vectors, or faceprints.
Figure 15C:
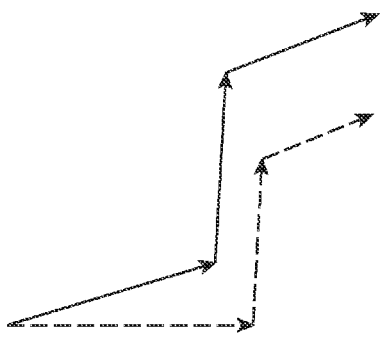
Figure 15D:
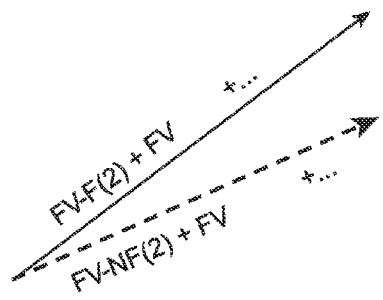
FIG. 15(d) illustrates a combined, illumination-normalized feature vector for slab and non-flash faceprints.
Figure 15E:
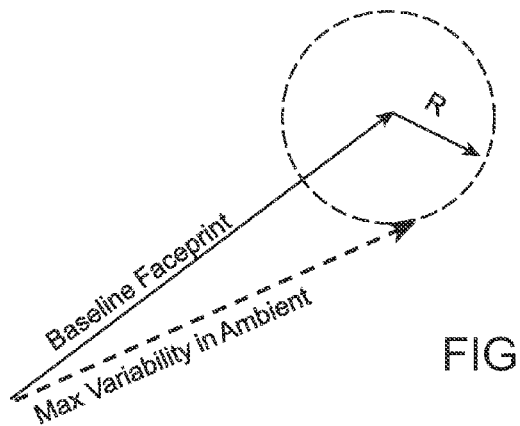
FIG. 15(e) illustrates a local baseline faceprint determined from a flash image and a radius of variability determined from the image in ambient illumination.

FIG. 15(d) illustrates a combined, illumination-normalized, feature vectors for flash and non-flash faceprints. FIG. 15(e) show how these feature vectors define a local baseline faceprint, determined from the flash image, and a radius of variability, determined from the image in ambient illumination.

Figure 12A:
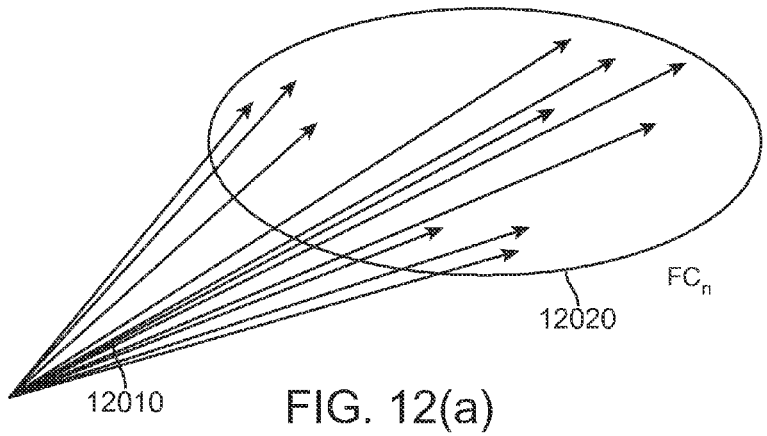
FIG. 12(a) shows a face class which has grown over time to incorporate a relatively large number of faceprints which exhibit localized clustering.
Figure 12B:
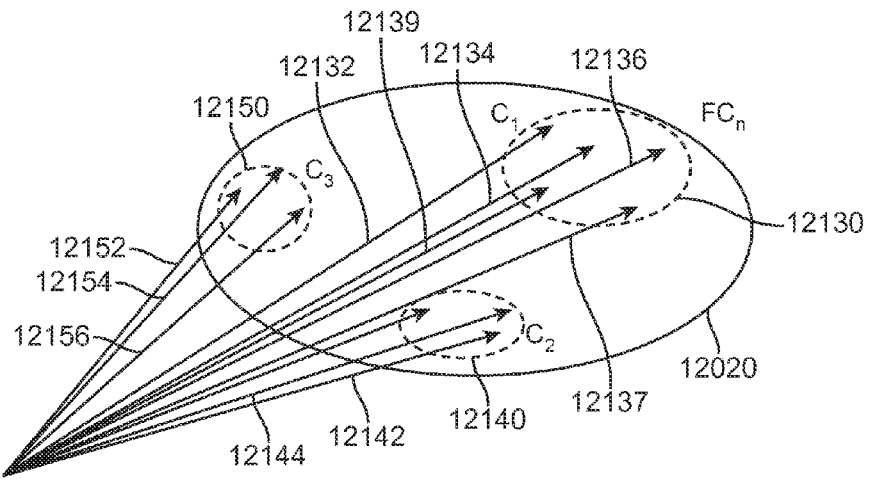
FIG. 12(b) illustrates explicitly how these faceprints are clustered.
Figure 12C:
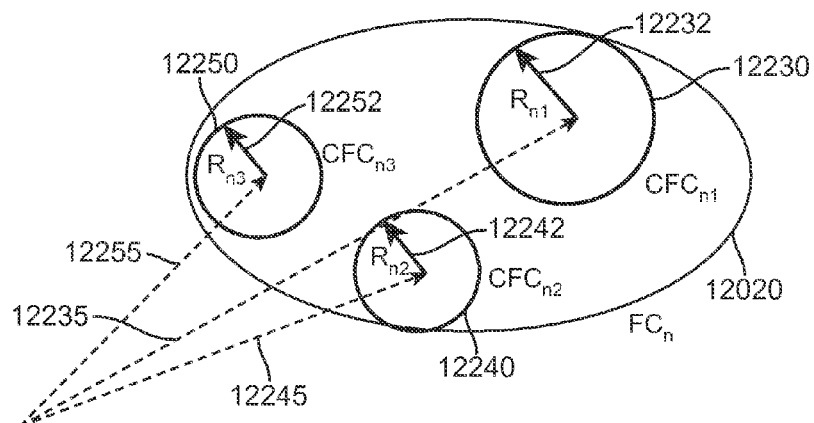
FIG. 12(c) shows how each local cluster can be replaced by a single clustered face class which is composed of a centre faceprint location in face space and a cluster radius, $R_n$.

Referring to FIG. 12(c), it can seen how this technique provides a very useful means of determining a local "clustered face class" for the faceprint of a person, determined from local conditions using flash and non-flash reference images. This can be used to match local conditions with a subset of a person's identities from the main identity database, or alternatively and analogous to the "clustered face classes" of FIG. 12(c), to customize a generic identity for the person derived from multiple overlapping face classes.

An optimally acquired image does not require the use of flash. The main acquisition system of a camera may be used to get a hi-res "camera-optimized" portrait image. Preview images may be used which are lower resolution, have a fixed frame rate (and so fixed acquisition time) and are not post processed by the camera. Regardless of whether flash is used for the main image or not, it provides an advantageous portrait image which can be used to determine median parameters of a person's faceprint. Preview images can be used to find extreme values for each faceprint in the ambient conditions that the camera is experiencing at that time.

This has several advantages. First, it is not necessary in this embodiment to gather and analyze dozens of different values to get a person's recognition profile. One can simply capture one main image and then one or more preview images, which can be captured just before or after the main image or at the same time. Second, this is a process that can be performed on a camera, is valid for a particular time and place and ambient condition. This information may also be passed back to a more sophisticated system on a desktop or Web system, e.g., for further processing. Ranges of recognition parameters may be advantageously obtained in local, ambient conditions from a pair of differently acquired (reference) face images in a camera.

Image Classification Database

Figure 2A:
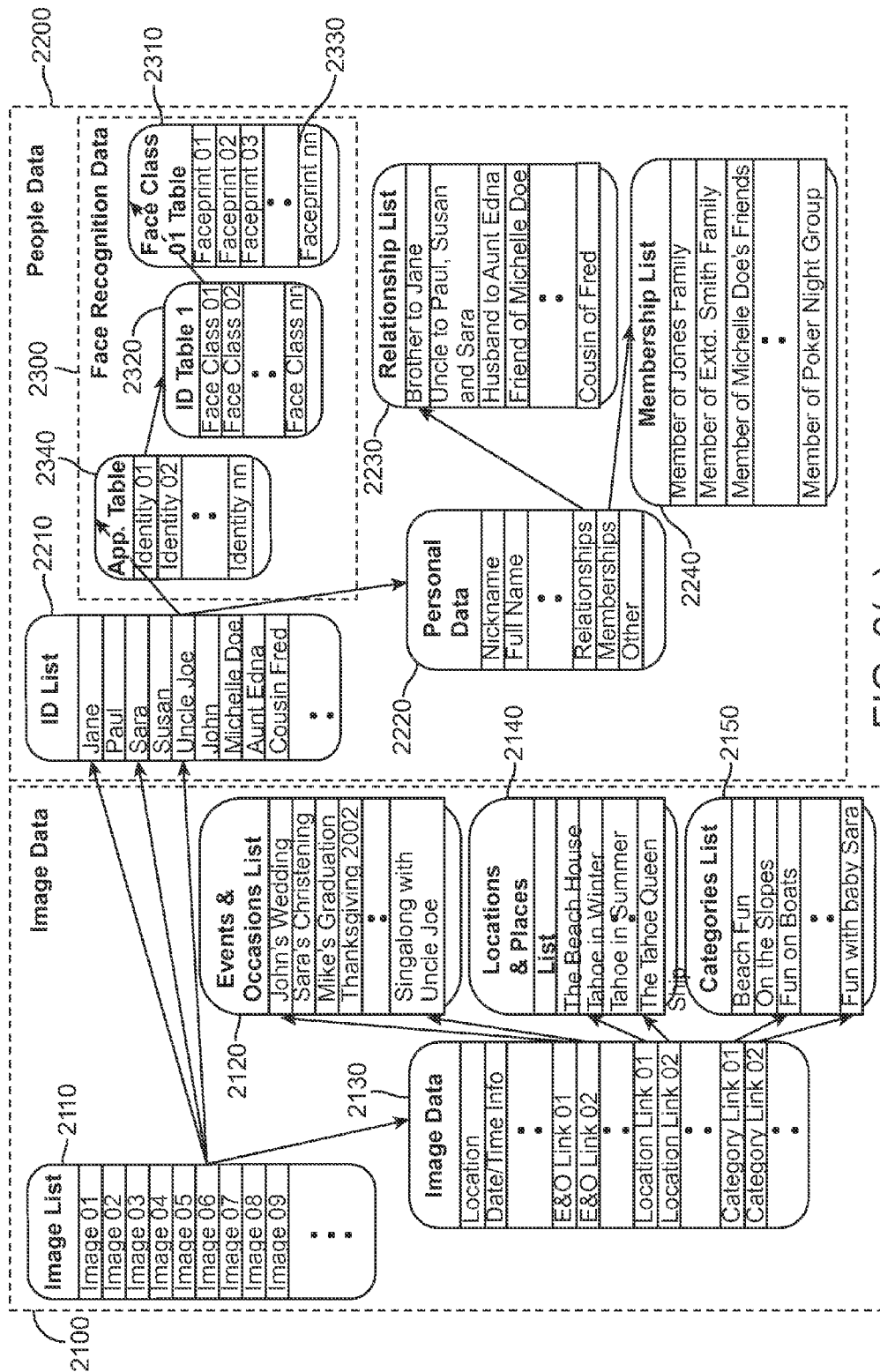
FIG. 2(a) describes an embodiment of a main system database.

FIG. 2(a) illustrates a representative example of the data structure of the Image Classification Database [1160]. A list of links to each image in the Personal Image Collection is maintained in an Image List [2110]. The data associated with each image is separated into two principle subcomponents: (i) the actual Image Data [2100] which contains information about the nature of a particular image in a user's Personal Image Collection. Examples include base Image Data [2130] about the date, time or place (if a camera incorporates a GPS subsystem) at which a picture was taken; Events & Occasions associations [2120] which link an image with a list of social or personal occasions such as weddings, family gatherings, seasonal events, etc; Location associations [2140] such as the beach, a ski resort or a theme park; Category associations [2150] such as various family activities, work or holiday related picture, hobbies, sports, etc. and (ii) a set of People Data [2200] which contains information about persons who are known to the user. Some of this information may be determined automatically by analysis of images, but much of it will require that the user at least confirm the information which is determined automatically and some information will need to be entered manually. The task of managing this user interaction and associating the recorded information with a particular image is achieved by the Core Workflow module [1110, 1410].

The set of People Data [2200] includes an ID List [2210] which links each person who is added to the list with a set of Personal Data [2220] and a set of Face Recognition Data [2300]. In the embodiment described here the Personal Data [2220] can also include a set of Relationship Data which is stored in a Relationship List [2230] and describes the relationship between this person and other persons who have entries in the database. It can also include a Group Membership List [2240] which contains information about social groups which the person belongs to, including family, extended family, workplace groupings or social activity groupings. Most of this information will need to be entered manually when a new Personal Profile is entered into the system database. The task of managing this user interaction and associating the recorded information with a particular Personal Profile is also achieved by the Core Workflow module [1110, 1410].

Face Recognition Data

Figure 2B:
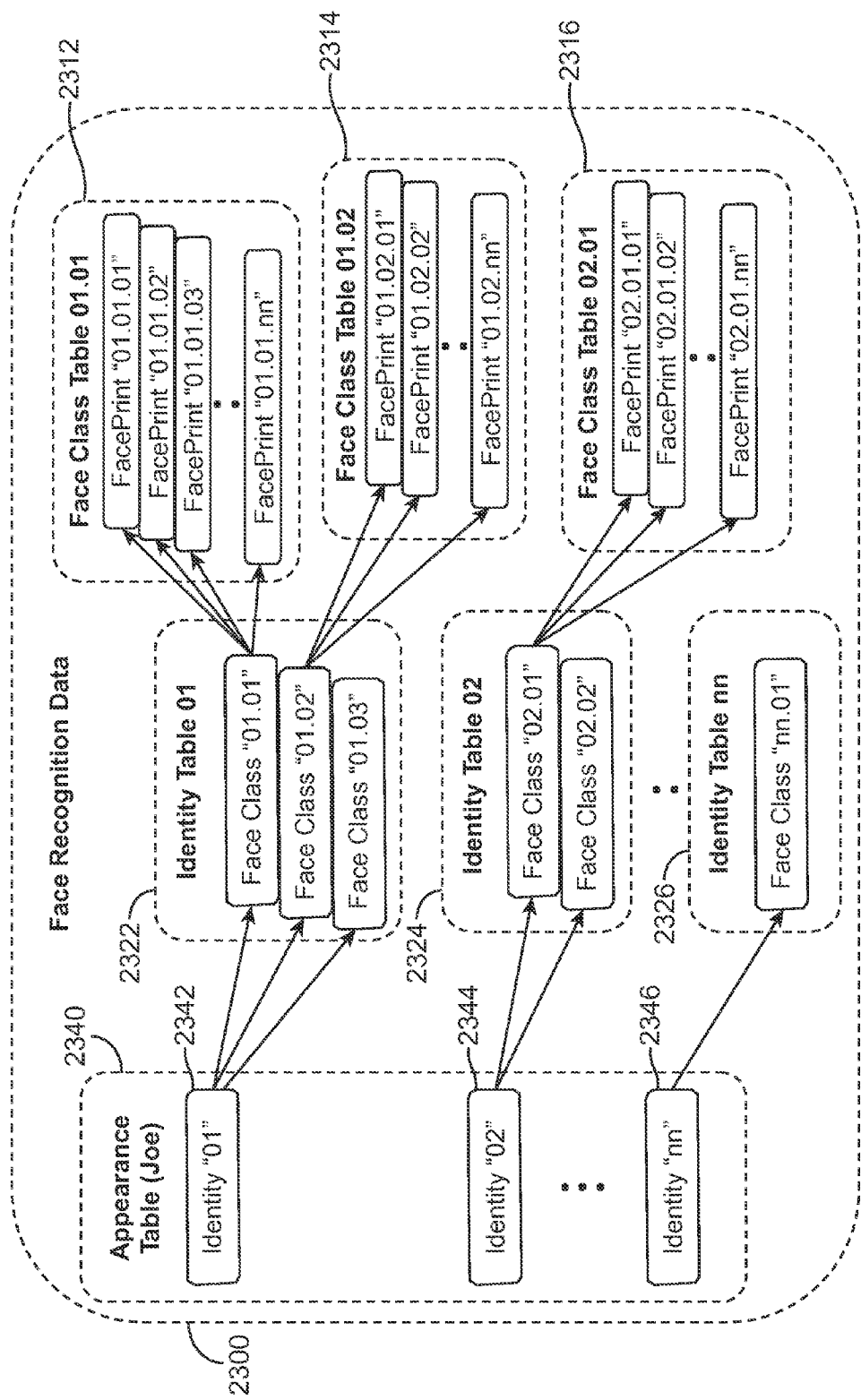
FIG. 2(b) gives additional detail of the face recognition data component of the database.

FIG. 2(b) gives a more detailed description of how the Face Recognition Data [2300] is organized for a single person. An Appearance Table or List [2340] may be generated to contain a list of alternative "appearances" that a person may have. In turn, there is an Identity Space Table (not marked, but including identity table 01 [2322], identity table 02 [2324] and identity tables nn [2326] and however many additional identity tables that may be useful), associated with each "appearance" that a person may have and including one or more Face Class Tables [2310]. Each Face Class Table [2310] includes, in turn, one or more Faceprints [2330]. The Faceprints are a set of co-ordinates in the known Face Space. The data stored in this set of database tables is directly associated with known Identity Regions, Face Class Regions and Faceprint Vectors in the Face Space and will be explained in more detail when the operation of the face recognition process is described in more detail with reference to FIGS. 9(a)-13(e).

Face Detection Workflow

Figure 3:
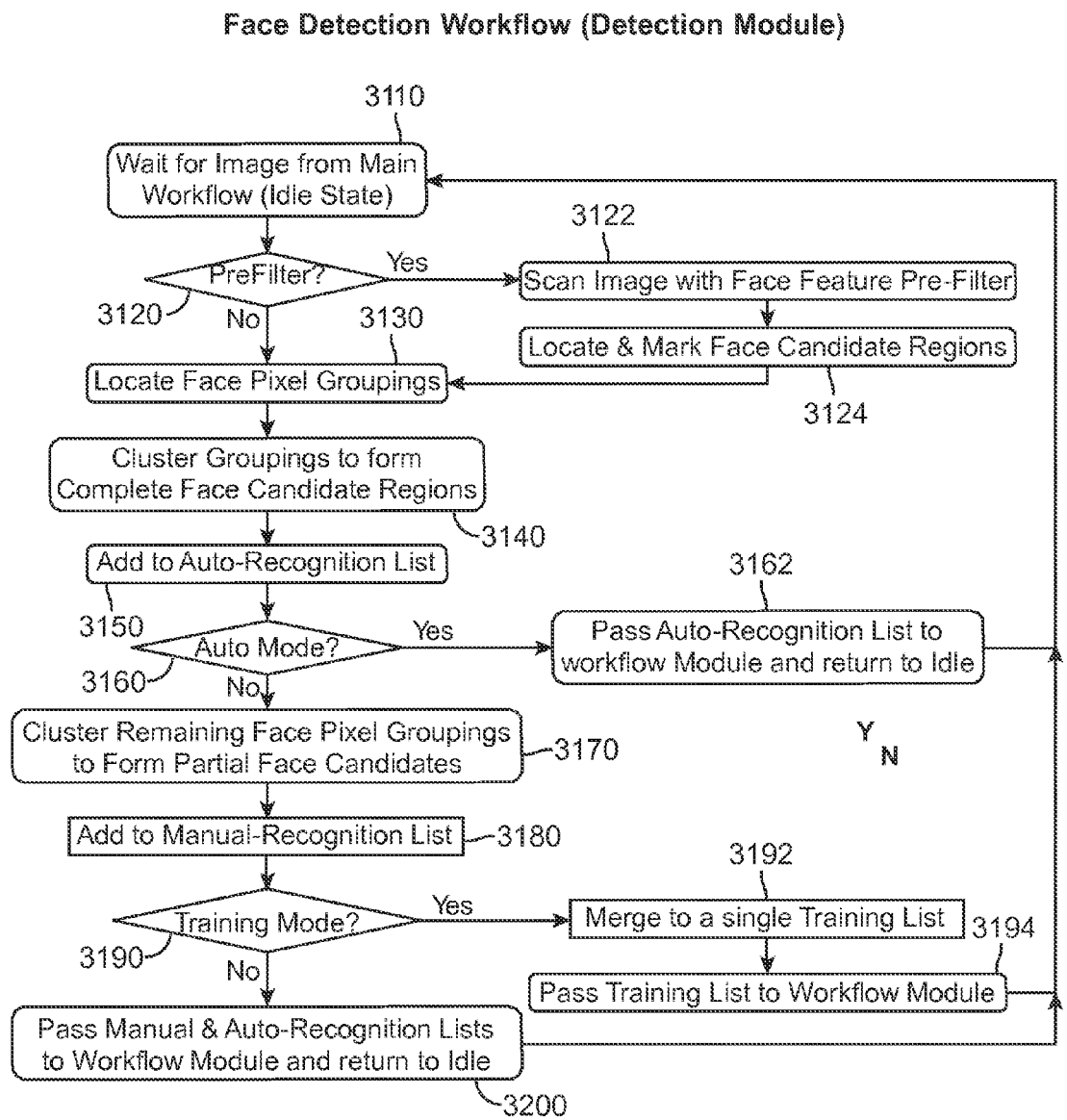
FIG. 3 describes a main face detection workflow in accordance with a preferred embodiment.

FIG. 3 illustrates the Face Detection Workflow as implemented by the relevant modules in FIGS. 1(a)-1(b). The system sits in a wait state [3110] until the Image Detection Module [1120] informs the Face Detection module that an image is available for processing. If a Prefilter setting is active [3120] the module will initially apply the Prefilter Scan [3122] and recording location information on any potential face candidate regions [3124]. If no Prefilter is required the module moves directly to the Skin Pixel Locator [3120]. Once all relevant skin pixels have been marked they are preferably clustered to form larger, contiguous face candidate regions [3140]. If the module is operating in fully automatic mode [3160] then only complete face candidate regions are accepted and added to the Auto-Recognition List which is then passed to the Core Workflow Module [3162]. If, however, this module is operating in a "semi-automatic" or "learning" mode then additional, incomplete or partial face candidate regions are clustered [3170] and added to a Manual-Recognition List [3180]. In "learning" mode [3190]—this is required when the system has very little training data to allow it to differentiate between different faces— both the Auto-Recognition List and the Manual-Recognition List are merged into a single Training List [3192] which is then passed back to the Core Workflow Module [3194]; or if the system is operating in semi-automatic mode [3190] then a separate Auto-Recognition List and Manual-Recognition List are passed back to the Core Workflow Module [3200]. The module then returns to its normal standby or "wait" state until the next image is detected and loaded. It is noted that in a preferred embodiment, skin detection and clustering are separate from the learning mode feature, and there is preferably no training involved in the detection stage.

Core System Workflow

Figure 4A:
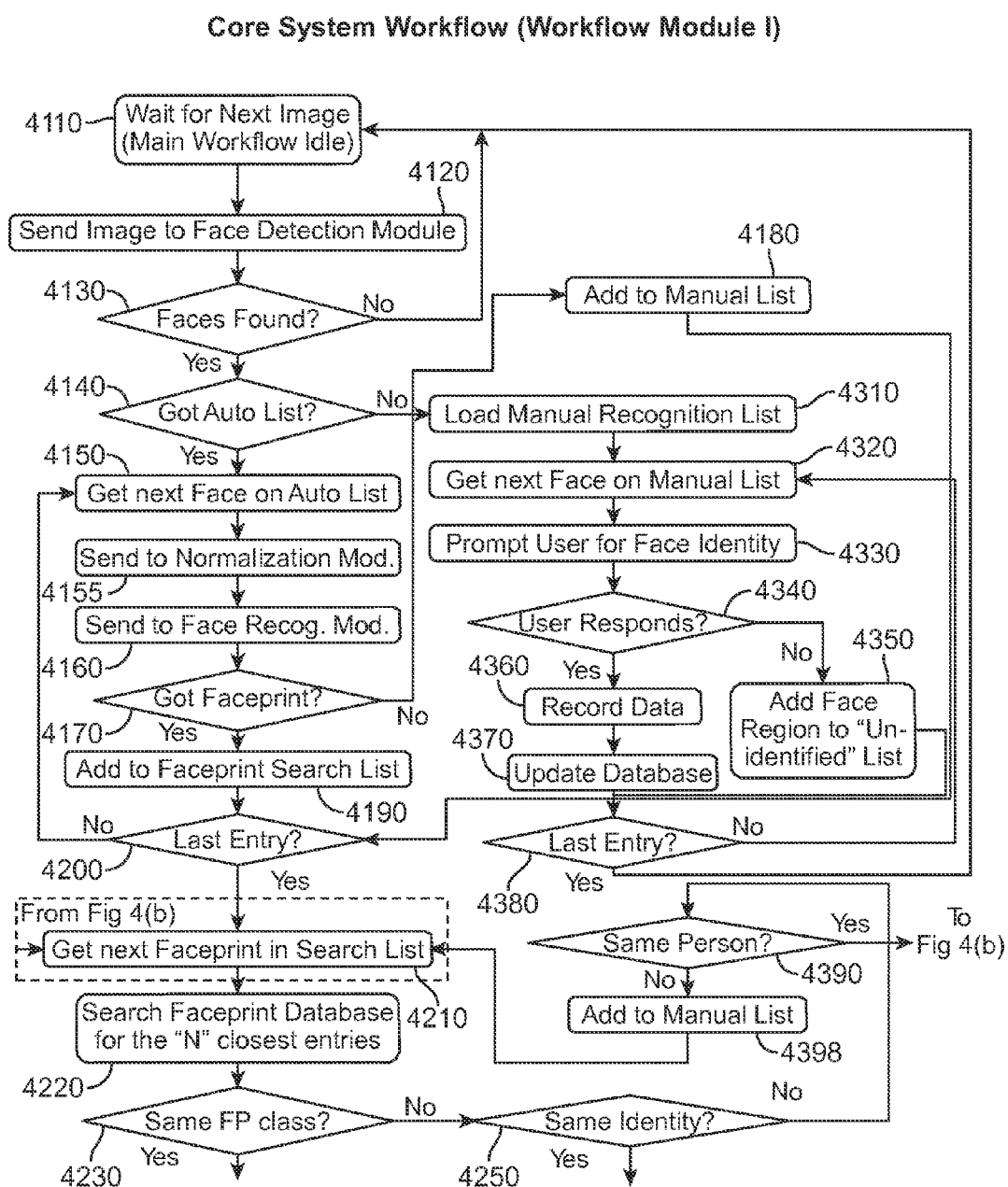
FIGS. 4(a)-4(b) describe a core system workflow in accordance with a preferred embodiment.
Figure 4B:
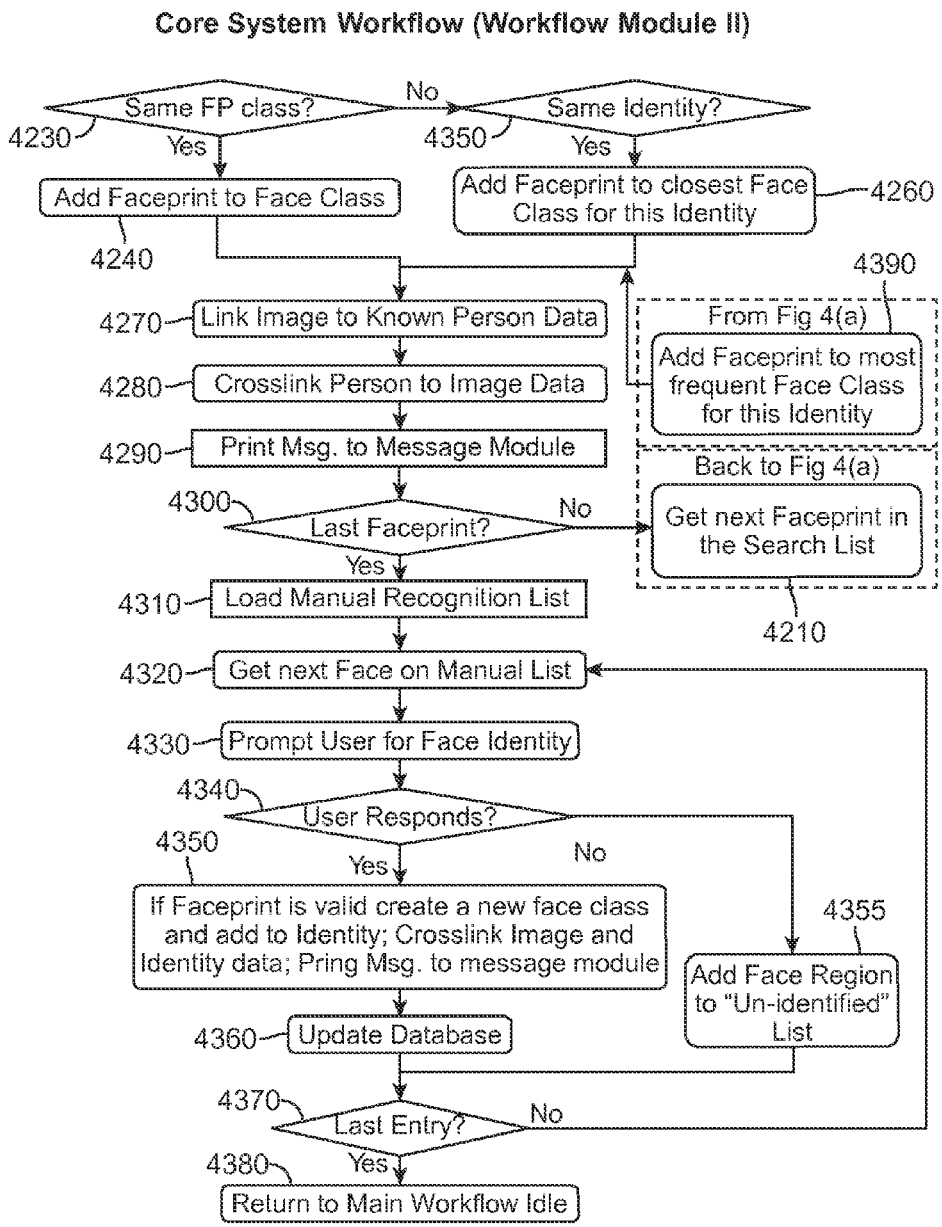

FIGS. 4(a)-4(b) illustrate the Core System Workflow and is split into two inter-related diagrams. In this embodiment, we assume that the system is implemented on a single computer as illustrated in FIG. 1(a). Some additional modifications would be involved if the system is split between an Image Capture Device and a Desktop PC as illustrated in FIG. 1(b).

This module sits in a wait state [4110] until a new image is detected by the Image Detection module [1120] whereupon the image is sent to the Face Detection module [4120]. After completing the detection process the Face Detection module returns its results and if no faces are found [4130] in an image, this module returns to its idle/wait state [4110]. When faces are found the module first tests to see if an Auto-Recognition List exists [4140] and if not it loads the Manual-Recognition List [4310] (or a Training List if the system is in training mode). Then each face candidate region on the Manual-Recognition List is loaded [4320] and the user is prompted to identify said face candidate region [4330]. If the user does not respond [4340] then after a timeout interval the face is added to an Unidentified Face Candidate list [4350]. If the user does respond [4340] then the identity associated with this face candidate region is recorded [4360] and the Face Recognition Database is updated [4370] with this new association between the assigned identity and the Faceprint of this face candidate region. Note that if the system is busy processing a set of images this task can be placed in a background queue. The process of associating an assigned identity with an extracted Faceprint will be described in more detail later. Finally, when the Manual Recognition List is exhausted [4380] the module returns to its idle state [4110] and waits for the next image to be detected.

Normally we expect the system to have an Auto-Recognition List [4140] and in this case the Core Workflow module enters a loop which gets the next face from the Auto-Recognition List [4150] and sends it to the Face Recognition module [4160] which should normally return a valid Faceprint [4170]. If, however, a valid Faceprint is not extracted then the image is probably obscured or incomplete and is added to the Manual Recognition List [4180] for later identification by the user. Normally, however, the Face Recognition module will return a valid Faceprint and this is then added to the Faceprint Search List [4190]. If the Auto Recognition List is not empty [4200] then there are still face candidates in this list so we load the next of these [4150] and continue with the process of extracting Faceprints for each face candidate region. Otherwise, the Faceprint Search List is loaded [4210] and a search for the closest matching identity to the Faceprint extracted from each valid face candidate is initiated.

The search methodology employed in this embodiment is described in greater detail when we come to discuss the physical manifestations of our concepts such as Faceprints, Identity Regions and Face Classes in Face Space. For now, the description will be confined, for ease of illustration but not in a limiting sense, to how the database fields of the Face Recognition Data portion of the Image Classification Database are used to determine the most likely match to a particular Faceprint.

Firstly, a search of all the known Faceprints, or of a selected sub-set when working in semi-automatic mode, which have been recorded by the Image Classification Engine is made and the distance between the current Faceprint and each of these is calculated [4220]. This calculation can be based on one of a number of known multi-dimensional classifier metrics, depending on the means employed to derive the fundamental set of Face Space basis vectors. Typically the basis vectors will be determined using either Principle Component Analysis (PCA) or Independent Component Analysis (ICA) methods and thus we preferably employ either the Euler distance, the Mahalanobis distance and/or the Fisher faces approach for these calculations, although alternative distance metrics may be appropriate for alternative sets of basis vectors such as Fourier- or Wavelet-based basis vectors.

After this distance calculation, the search algorithm first determines if the N closest matches lie within the same Face Class. If so, then the current Faceprint can be unambiguously associated with that particular Face Class [4230]. The system may be configured such that if the distance between the target faceprint and the nearest face print is much less than to any other face print, then that may be determined also to unambiguously identity a person. In this sense, the sensitivity of the matching may be set to any of a wide range of possible values. The current Faceprint is then added to that Face Class table [4240]. If it cannot be associated with a single Face Class, either because there are not sufficient Faceprints within that class, or because the N closest matches are spread across two or more Face Classes, then the algorithm next determines if the N closest matches belong to the same Identity Grouping [4250], and if this is the case, an unambiguous match can still be achieved. The current Faceprint can next be added to the closest Face Class within that Identity Grouping and that Face Class is expanded to encompass the current Faceprint [4260]. Finally, if the current Faceprint cannot be unambiguously associated with a single Face Class, or a single Identity Grouping, it is still possible that the same "known person" may be associated with the N closest matches [4390]. If this is the same person then the new Faceprint can be unambiguously associated with that person [4395]. If, after each of these steps, an unambiguous match with a "known person" is not achieved, then the face candidate region associated with the current Faceprint is added to the manual recognition list [4398] and the user will be asked to complete the recognition process, or discard the face candidate region completely.

Note that as the number of Faceprints in the Image Classification Database grows the number, N, of required closest matches will be increased from time to time in order to improve the accuracy & reliability of the recognition process. We further note that the distance metric used to determine the N closest matches is also used to determine if the matches are too distant to constitute a reliable match with a particular Face Class, Identity Grouping or Known Person.

Once a match has been determined and the current Faceprint has been added to the Face Recognition Data for the "known person" who was matched, the system next creates a link from the Image Data to the database profile of that "known person" [4270]. A cross-link is also added to the profile of the matched "known person" which associates the image with that person [4280]. Finally a message detailing the successful match is sent to the Message Module [4290] which may store, forward, or display it, depending on the administrative settings of the system. If this is not the last face candidate region in the Search List then the system loads the next Faceprint [4210] and repeats the search & match process for it.

Once all of the face candidate regions on the Auto Recognition List have been processed the system must next consider any face candidate regions which are on the Manual Recognition List. It begins by loading the Manual Recognition List [4310] and loading the first face candidate region from that list [4320]. This face candidate region is next presented to the user of the system via a dialog box [4330]. This dialog box includes the current face candidate region and, if the associated Faceprint was processed by the auto-identification algorithm, a number of potential matching faces of "known persons" may also be explicitly displayed. In addition the user may be provided with a browsable list of all "known persons" to select from and an option to create a new "known person". If the user does not respond within a specified time interval [4340] then the system may automatically add this face candidate region and the associated Faceprint to an Unidentified List [4355]. This list of face candidate regions may be presented to the user the next time that user input is detected. This facilitates the unattended operation of the face recognition process if a large set of new images is added to the system.

Given that the user does identify the face candidate region, then the associated Faceprint is added to a new Identity Grouping for that person and a new Face Class is also created for the Faceprint [4350], or if the Faceprint is within a predetermined minimum distance of an existing Identity Grouping then that Identity Grouping is enlarged to encompass the Faceprint. This enlargement process for an Identity Grouping is described in greater detail below when physical manifestations are discussed such as having to do with Faceprints, Identity Regions and Face Classes in Face Space. Once a match has been determined and the current Faceprint has been added to the Face Recognition Data for the "known person" who was matched, the system next creates a link from the Image Data to the database profile of that "known person" [4350]. A cross-link is also added to the profile of the matched "known person" which associates the image with that person. A message detailing the successful match may be sent to the Message Module which may store, forward, or display it, depending on the administrative settings of the system. Finally, the System Database is updated [4360]. If there are more face candidate regions remaining on the Manual Recognition list then the next is loaded and the system will repeat this loop until the list is empty [4370]. Once this condition is satisfied it will return to the main workflow idle state [4110].

Image Normalization

After a list of face candidate regions within an image has been returned by the detection module, the main workflow will work to normalize these before they are passed on to the recognition module. The exact normalization procedure to be followed will depend, in part, on (i) the techniques employed in the recognition module to extract a faceprint; (ii) the one or more basis sets, in terms of which the faceprint will be described, and (iii) the physical characteristics of the face candidate region which is to be normalized.

As will be known to those skilled in the art, different face recognition techniques exhibit differing levels of sensitivity to different aspects and physical characteristics of a face candidate region. We cite, as an example, the well-known sensitivity of Eigenface, or PCA techniques to differences in illumination. It has been determined by those skilled in the art that much of this sensitivity is embodied in the three or four largest eigenface basis vectors. Thus, if the faceprint of a face region, described in terms of eigenface basis vectors, omits those particular basis vectors from the basis set, in terms of which the faceprint is described, then the recognition process will be insensitive to variations in illumination.

Implementing a normalization scheme to correct for illumination, in-plane rotation or scaling distortions of a face candidate region are relatively straightforward compared with pose distortions. Thus, the description that follows focuses on approaches to normalization techniques for pose distortion as this is more difficult to compensate for in a normalization scheme. It is worthwhile remarking that the system of the preferred embodiment provides a framework within which existing techniques may be combined to compliment and enhance each other and provide an improved workflow system for face detection, normalization of the resulting face candidate region, the generation of a recognition signature, or faceprint from the normalized face candidate region, and ultimately improved accuracy of recognition of the person associated with the face candidate region. Thus, the pose normalization described herein may be preferably combined with other normalization techniques as understood by those skilled in the art.

Regarding pose normalization, we note that there are two distinct approaches which are implemented in the preferred embodiment of our workflow system. These two approaches to normalization of the image also affect the subsequent face recognition process. Note that these two approaches are complimentary and both may be employed within the same preferred embodiment to enhance the overall accuracy of the workflow recognition process.

Figure 5A:
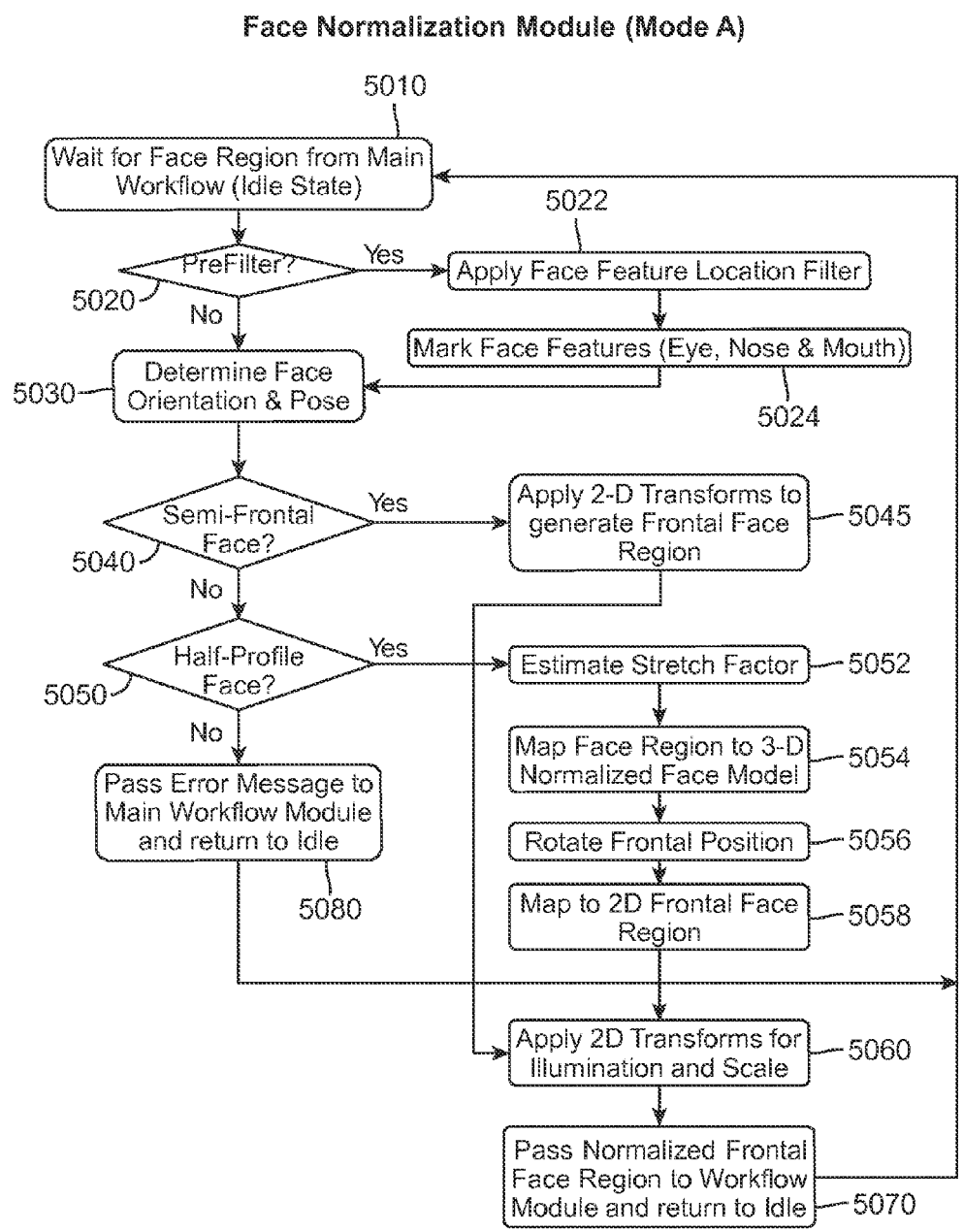
FIGS. 5(a)-5(b) shows a face normalization workflow in accordance with a preferred embodiment.

Our first implementation of the normalization module is described by FIG. 5(a) and is referred to as normalization mode A. It is assumed that the facial candidate region to be normalized is rotated no more than 45 degrees to the left (or right) and no more than 30 degrees up (or down). The normalization module is activated from its idle state [5010] when it is passed such a facial candidate region from the main workflow module. Now in order to further process this facial candidate region it is necessary to determine the facial pose which, in our preferred embodiment, is calculated based on the relative positions of the principle face features (eyes, nose, mouth and, occasionally, ears, hairline and chin). Now information on the locations of said features may already be determined by the face detection module and passed to the normalization module with the image, or may be contained within the image metadata. If this is the case [5020] then we may proceed directly to the pose determination step [5030]. If, however, information is not available on the locations of the pertinent face features for the face candidate region [5020] then it will be necessary to apply a face feature localization filter [5022] to the candidate region and to record the locations of the relevant features [5024].

Figure 6A:
FIGS. 6(a)-6(e) illustrate shows some of the different ways that a face candidate region, obtained from the detection module, can be distorted; these distortions should be corrected by the normalization module.
Figure 6B:
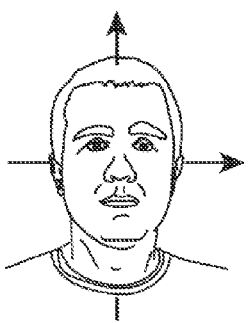
Figure 6C:
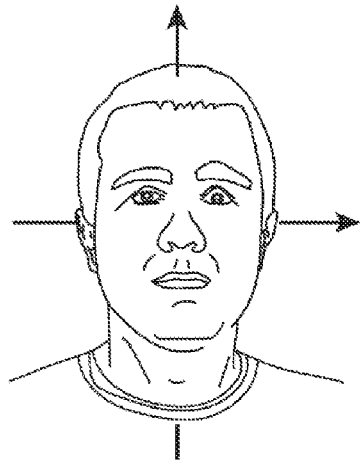

In addition to the illumination level of the potential face candidate region, other physical characteristics which can influence the recognition process are illustrated in FIGS. 6(a)-6(e). The most common of these, but also the more straight-forward of these to handle, as they relate to frontal, or semi-frontal face candidate regions, are in-plane rotation of the face, illustrated by FIG. 6(a) and scaling variations in the size of the face candidate region, illustrated in FIG. 6(b). The ideal face candidate region which is fully frontal and is free of rotational or scaling distortions, is illustrated in FIG. 6(c).

Figure 6D:
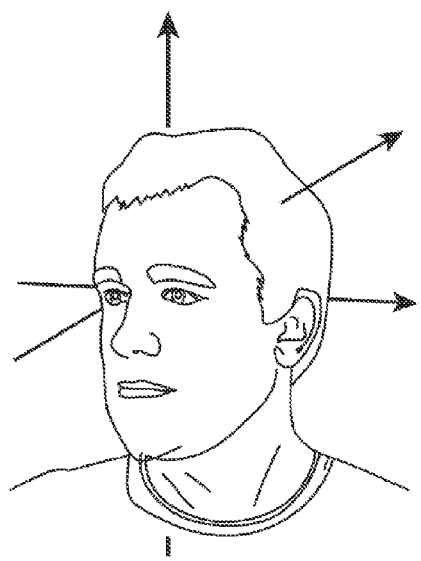
Figure 6E:
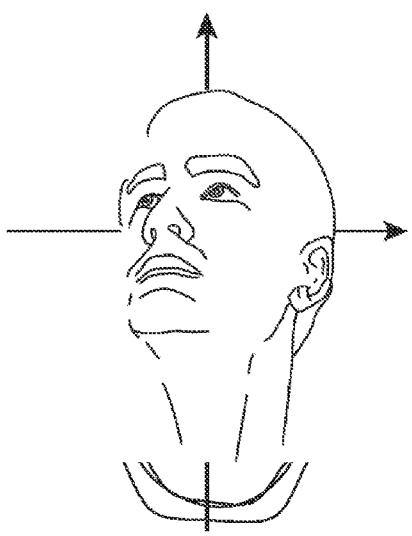

The more difficult distortions of a face candidate region occur when the face is rotated to face to the left (or right) so that it appears in a semi-profile as illustrated in FIG. 6(d) [Note: If it is rotated to 45 degrees we shall refer to this as half-profile; to 90 degrees as full-profile]. Equally difficult to correct is the case when the face candidate region is rotated so that the face looks up (or down) as illustrated in FIG. 6(e). In what follows these latter two cases will be referred to as pose distortion whereas simple in-plane rotation, as shown in FIG. 6(a) will be referred to as rotational distortion. We will also refer to faces as semi-frontal where there is a complete view of each eye region and the mouth. In very approximate terms this requires that the left-right rotation is less than 30 degrees and the up/down rotation is less than 15 degrees. The amount of allowable rotation depends partly on the size of the nose and also on how well-defined the eye and mouth regions are.

Once the information on the location of the face features within the face candidate region is available, it is possible to proceed to the pose determination step. A number of approaches to pose determination are understood by those skilled in the art. In our preferred embodiment, we utilize a technique which is based on determining the 2-D projection of the 3-D eye-mouth triangle onto the face candidate region. The anthropometric data indicates that the region delineated by these face features forms an equilateral triangle in the plane of the face for the majority of persons. Thus, from the shape of the 2-D projection of this region, it is possible to determine the plane of the face, and thereby extrapolate the pose distortion [5030].

The next step is to determine how this pose distortion can be normalized. A full normalization would require that we transform the face candidate region to a 3-D space map and then rotate it until the appropriate corrections for left/right (yaw) and up/down (pitch) rotations are normalized. However this can be computationally intensive and if a face candidate region is semi-frontal, then we can achieve accurate normalization results using 2-D transformations [5045].

Figure 7A:
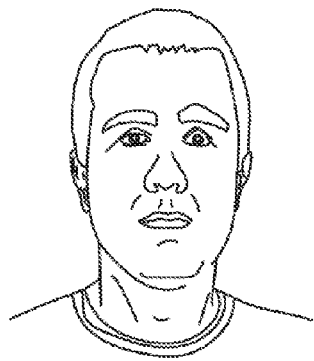
FIGS. 7(a)-7(f) illustrate how a 3-D model can be applied to model a range of face candidate regions.
Figure 7B:
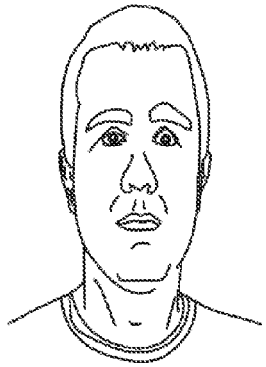
Figure 7C:
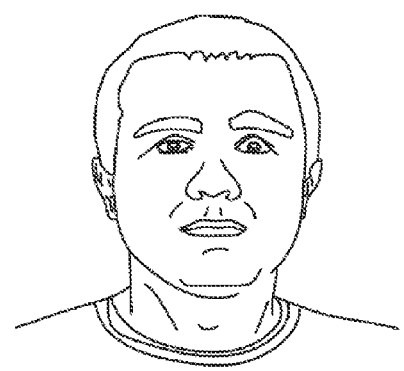

If the pose distortion is more extreme, then it is more desirable to transform the face candidate region into a 3-D space. Again there are a variety of approaches that may be understood by those skilled in the art for handling this problem. Most of these employ some technique of deforming a pre-defined 3-D face model to fit the extracted face candidate region. One such technique is described by Tony Jebara in a Ph.D. thesis from McGill University, 1996, entitled 3D Pose Estimation and Normalization for Face Recognition. This employs a normalized 3D face model illustrated in FIG. 7(a) which is drawn from the thesis manuscript. Jebara proposes that a simple 1-D scaling of this model along its horizontal axis is sufficient to match a broad range of faces; thus a person with a thin face can be represented by the compacted model illustrated in FIG. 7(b) and another person with a plump, or "moon" face can be modeled by an elongation of the basic model illustrated in FIG. 7(c). The advantage of this technique is that the simple 1-D scaling employed will require much less computing power than more complex 2-D or 3-D matching techniques.

Figure 7D:
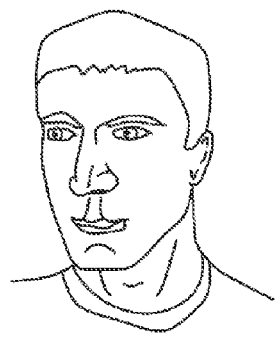
Figure 7E:
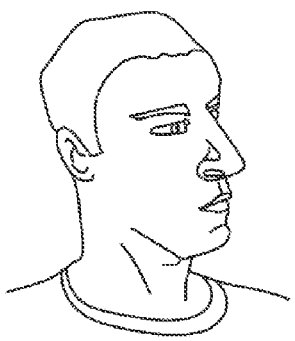
Figure 7F:

Thus, when a face candidate region is determined to have a greater pose distortion than can be compensated for using a 2-D transformation [5050], then it is desired to employ a mapping of the candidate region onto a 3-D model. This begins with a determination of the 1-D horizontal stretch factor [5045] which then allows the appropriate scaling of the normalized 3-D face model. The texture, color and feature regions of the 2-D candidate region are next mapped onto the 3-D model [5054]. A physical representation of several such example mappings is shown in FIGS. 7(d)-7(f); FIG. 7(d) shows that this technique is also applicable to semi-frontal images; FIG. 7(e) shows how a candidate region with significant pitch angle is mapped onto the 3-D model and FIG. 7(f) shows how a candidate region with both pitch and yaw pose distortion is mapped to the same model.

Once the candidate region is mapped to the 3-D model the next step is to rotate the model so that the face is in a fully-frontal orientation [5056], and this 3-D frontal face is then mapped onto a 2-D normalized face candidate region [5058]. This normalized face candidate region must now be further corrected for variations in scale and illumination [5060]. It is, for example, particularly important for most face recognition algorithms that the eye and mouth regions be closely aligned to facilitate accurate recognition. This is relatively easy to achieve when standardized "mug-shot" images are used, but when the face candidate regions originate from complex images with a cluttered background it becomes more problematic. Finally, the normalized face candidate region is passed back to the main workflow module and the normalization module returns to its idle state.

Figure 5B:
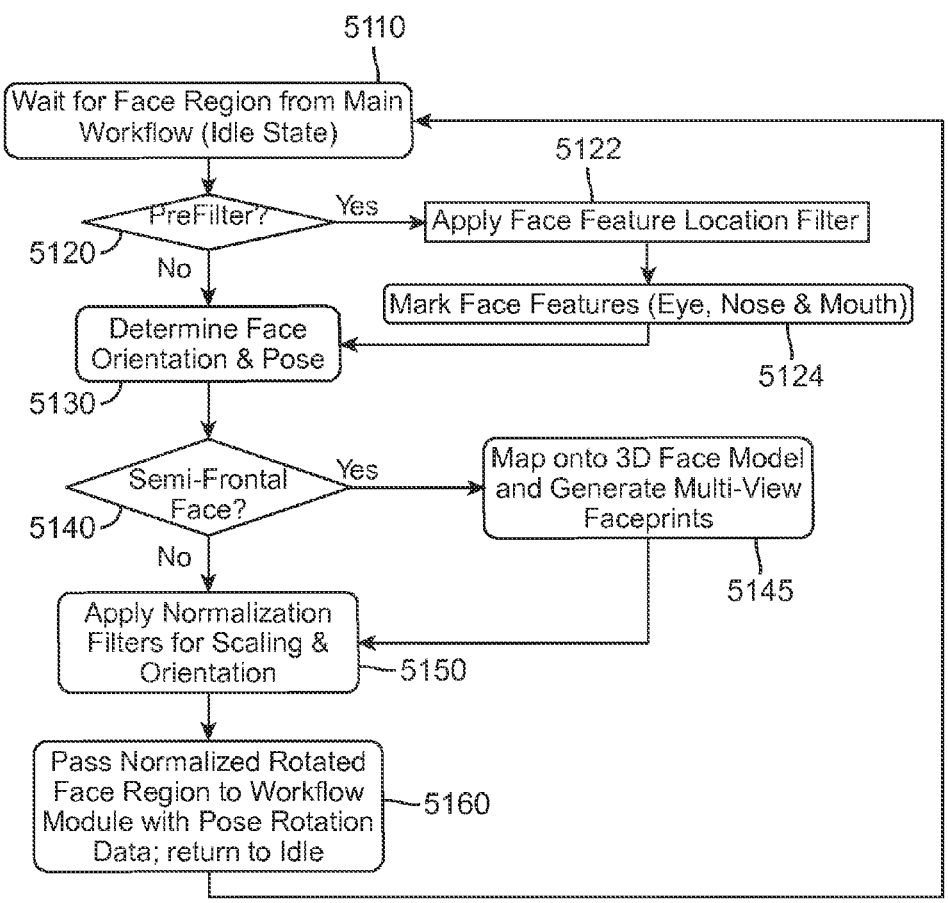

Our second implementation of the normalization module is described by FIG. 5(b) and is referred to as normalization Mode B. In this mode of operation the normalization module does not attempt to re-align the face candidate region into a standardized frontal candidate region. Instead the system maintains a plurality of face recognition datasets [2300], each of which is associated with a particular discrete range of pose angles. In a simple case there would be face recognition datasets associated with left/right pitch rotations of 0, 15, 30, 45, 60, 70 and 90 degrees and for up/down yaw rotations of 0, 15, 30 and 45 degrees. This implies 91 distinct face recognition datasets, but due to lateral face symmetry it can, in fact, be reduced to 49 distinct datasets. Further, each dataset, associated with a particular pitch & yaw angular combination may be described in terms of a unique basis set. Thus the recognition module is accordingly modified to generate a faceprint based not only on the input face candidate region but also on the pitch & yaw angular combination of pose distortion as determined by the normalization module. In other words, when operating in Mode B the normalization module does not actually modify the pose of the face candidate region but rather determines the pose distortion and matches it to a basis set which is tuned to enhance recognition of faces at that pose angle.

Those skilled in the art will realize that given 49 distinct classes of pose distortion it will take a large amount of input data to populate each of these distinct face spaces with face-prints associated with known persons. To compensate for this we preferably utilize a prior art technique described in detail in Chapter 7, of MIT Artificial Intelligence Technical Report No. 1574 to Beymer.© MIT 1996. This allows a multiplicity of views, at different pitch & yaw pose angles, to be generated from a single input image. Note that the techniques employed by Beymer utilize 2-D techniques, whereas we have extended these to use more sophisticated 3-D techniques, and as this operation can be performed in the background we can employ multi-dimensional approaches utilizing, for example, 3-D Active Appearance Models which offer superior results to the 1-D matching technique described by Jebara and previously cited in this section. Following the generation of this multiplicity of views from a single image, a faceprint is obtained for each view, and each of these faceprints is added to the face recognition dataset for that particular combination of pitch & yaw pose angles. In this way, the 49 face recognition datasets associated with the 49 distinct classes of pose distortion are populated at the same rate as would occur when a single face recognition dataset is used.

FIG. 8(c) illustrates a browser window showing nine face region images of a same person. Each of them, with the exception perhaps of the image labeled 10.jpg, would undergo some normalization processing prior to being subject to the recognition programming. For example, most would undergo some pose and orientation normalization, whereas size and luminance may or may not, depending on the sensitivity that is set, be within tolerance for face recognition.

A description of the practical operation of the face normalization module when operating in Mode B is given in FIG. 5(b). The normalization module is activated from its idle state [5110] when it is passed such a facial candidate region from the main workflow module. Now in order to further process this facial candidate region it is necessary to determine the facial pose which, in our preferred embodiment, is calculated based on the relative positions of the principle face features (eyes, nose, mouth and, occasionally, ears, hairline and chin). Now information on the locations of the features may already be determined by the face detection module and passed to the normalization module with the image, or may be contained within the image metadata. If this is the case [5120] then we may proceed directly to the pose determination step [5130]. If, however, information is not available on the locations of the pertinent face features for the face candidate region [5120], then it will be necessary to apply a face feature localization filter [5122] to the candidate region and to record the locations of the relevant features [5124].

The next step is to determine if the face candidate region is a semi-frontal one [5140]. This does not affect the actual normalization procedure, but if the face candidate region is semi-frontal then it is added to a background processing list and will subsequently be used to generate a multiplicity of face views from which the corresponding multi-pose faceprints will be extracted and added to the relevant face recognition datasets [5145]. The normalization module then applies filters to scale and correct in-plane orientation of the master face candidate region [5150] which is then passed back to the main workflow module together with the relevant pitch & yaw pose angle data [5160]. After this, the module returns to an idle state [5110].

Image Recognition Process

Figure 9A:
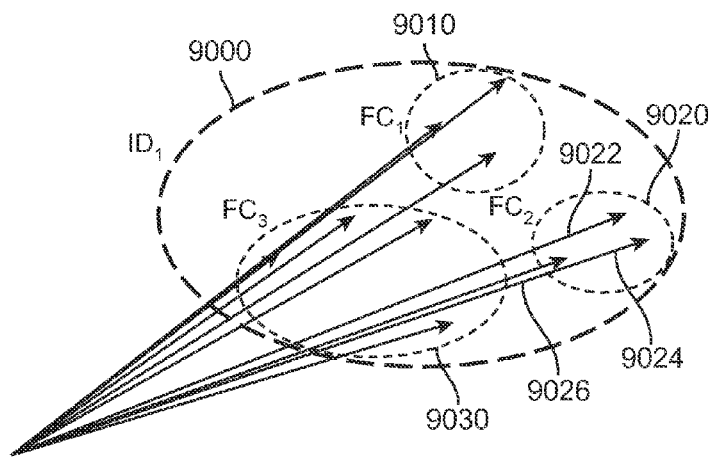
FIG. 9(a) shows a graphical representation of how multiple, distinct, face classes, formed from collections of closely collocated faceprints can be used to define a unique region in face space which is associated with a particular person's identity.

A highly advantageous feature of the system of the preferred embodiment is its approach to the problem of implementing an adaptive, self-learning means of performing face recognition. FIG. 9(a) shows a graphical representation of how multiple, distinct, face classes formed from collections of closely collocated faceprints can be used to define a unique region in Face Space which is associated with a particular Identity Region for a "known person". In FIG. 9(a), a single Identity Region, $ID_1$ [9000] is shown, which is composed of three separate Face Classes, $FC_1$ [9010], $FC_2$ [9020], and $FC_3$ [9030]. FIG. 9(a) also illustrates three face prints which constitute the members of $FC_2$ [9020], that is $FP_{2A}$ [9022], $FP_{2B}$ [9024] and $FP_{2C}$ [9026]. Note that in this and the following discussions, the assumption is made that the Face Space is limited to 3 orthonormal basis vectors. This facilitates an analogy with conventional 3D Cartesian Space making some of the concepts easier to visualize and understand. However, any practical Face Space which is used for face recognition purposes may typically utilize a minimum of 20 orthonormal basis vectors, and may generally have an arbitrary number. Thus we emphasize that our analogy with 3D Cartesian Space is a device to simplify the understanding of the concepts outlined in what follows.

Figure 9B:
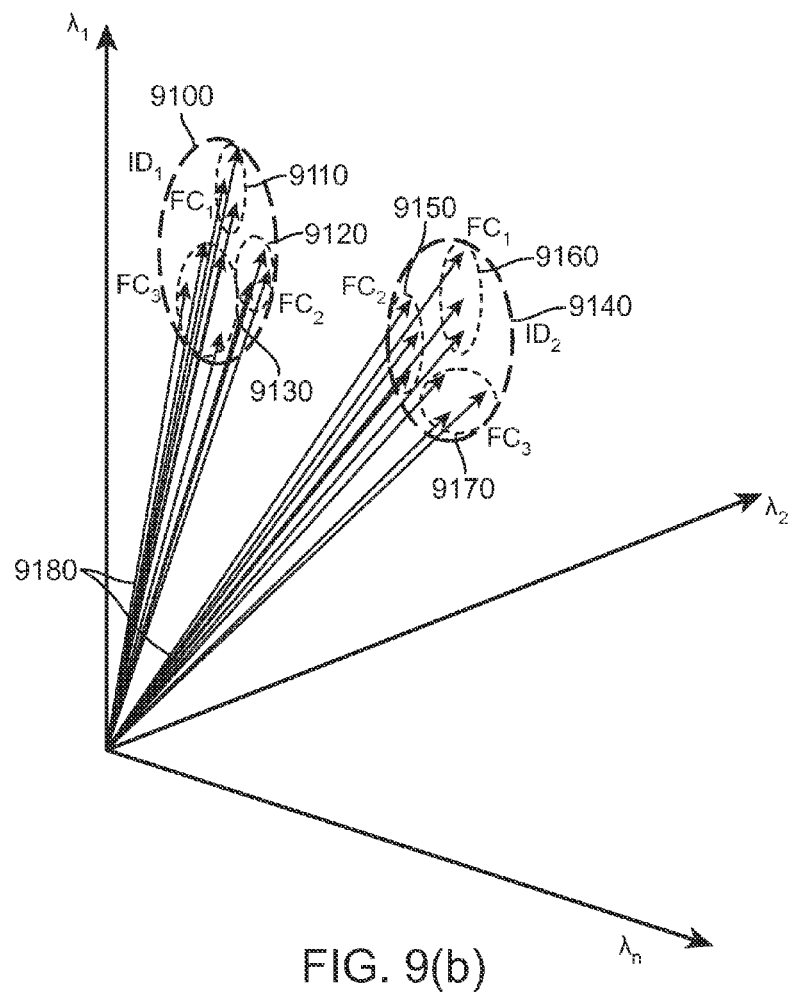
FIG. 9(b) illustrates two such identity spaces with their associated face classes and faceprints.

FIG. 9(b) illustrates two such Identity Spaces with their associated face classes and faceprints. Three orthonormal basis vectors, $\lambda_1$, $\lambda_2$, and $\lambda_n$ are shown, although there are actually 20-50 basis vectors employed in practical implementations, i.e., n=20+. Each of the vectors comprising an entry in a Face Class is shown as a 3D Cartesian Vector, although in reality it has 20+ dimensions.

The overall concept of how this adaptive face recognition algorithm works is somewhat analogous to a series of expanding "bubbles" of "known regions" within Face Space. New points in our multi-dimensional Face Space are obtained from the new Faceprints extracted from face candidate regions identified within the images comprising an image collection. These new points in Face Space are then associated with "known persons" or "known identities" either automatically, or through manual recognition by the user such as in a semi-automatic mode. Once they are associated with a "known person", we use the Face Space coordinate location of this new Faceprint to grow the current Face Classes and Identity Region associated with this "known person". This will enhance future recognition of this particular "known person".

Figure 10A:
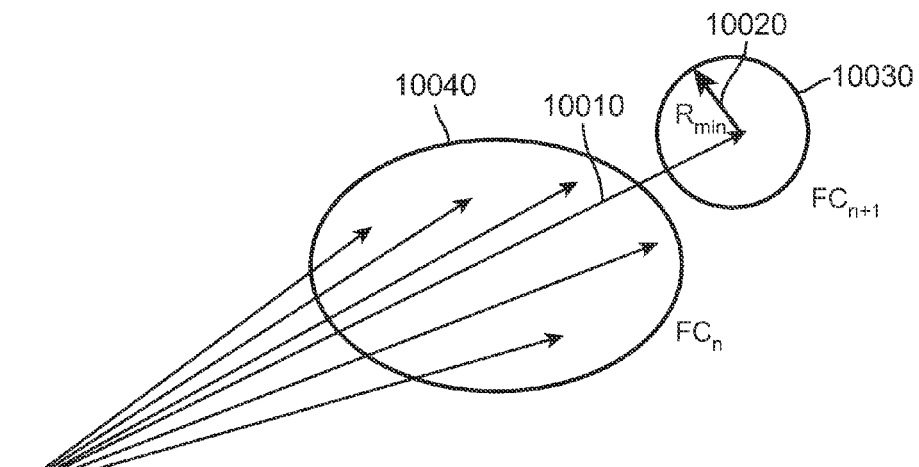
FIG. 10(a) illustrates how a new faceprint creates a new face class for a person's identity when it is located at a distance further than a certain $R_{min}$ from an existing face class.
Figure 10B:
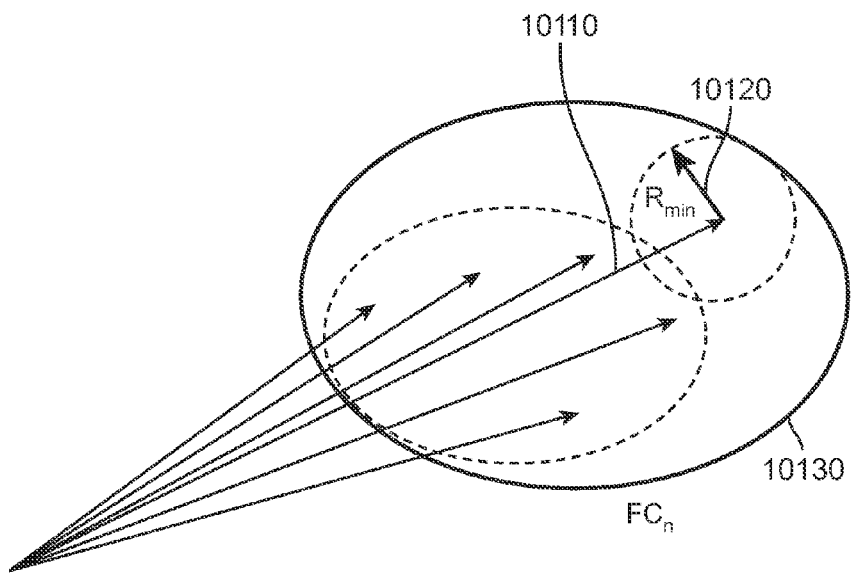
FIG. 10(b) illustrates how a new faceprint extends or grows an existing face class when it is within a distance $R_{min}$ from the existing face class.

Several such means to grow the region of Face Space associated with a "known person" are described in FIGS. 10(a)-10(b). In FIG. 10(a), it is illustrated how a new Faceprint [10010] which is associated, either automatically or manually, with a "known person" will lead to the creation of a new Face Class [10030] when it is located at a distance further than a certain $R_{min}$ [10020] from any existing face classes [10040] associated with the same "known person". In this way new Face Classes are created by an adaptive recognition algorithm. Such new Face Classes preferably will, in turn, grow the nearest Identity Region for that "known person".

FIG. 10(b) shows how a new Faceprint [10110] extends or grows an existing Face Class [10130] when it is within a distance $R_{min}$ [10120] from the existing face class. This mechanism allows existing Face Classes to grow the region they occupy in Face Space.

Figure 11A:
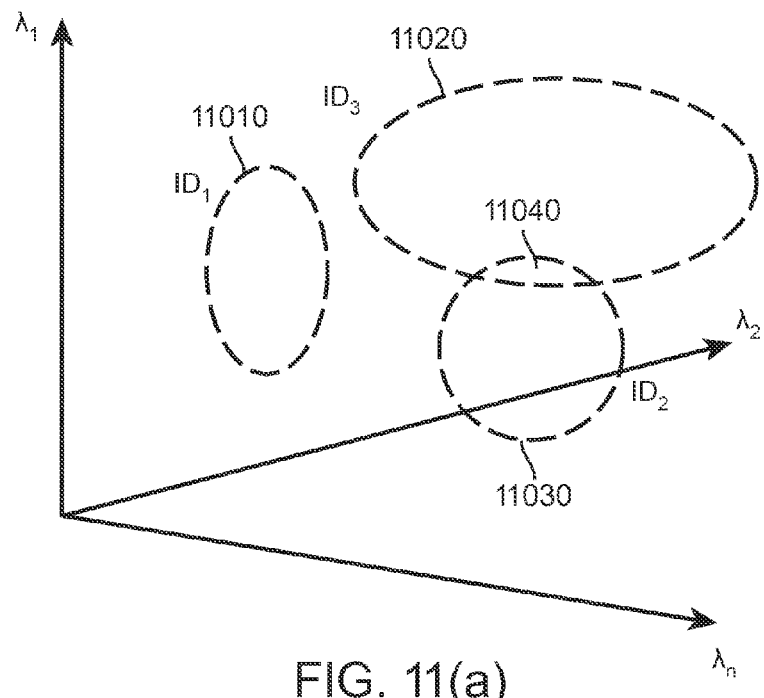
FIG. 11(a) illustrates how an identity region associated with one person can grow to overlap with the identity region of another person.
Figure 11B:
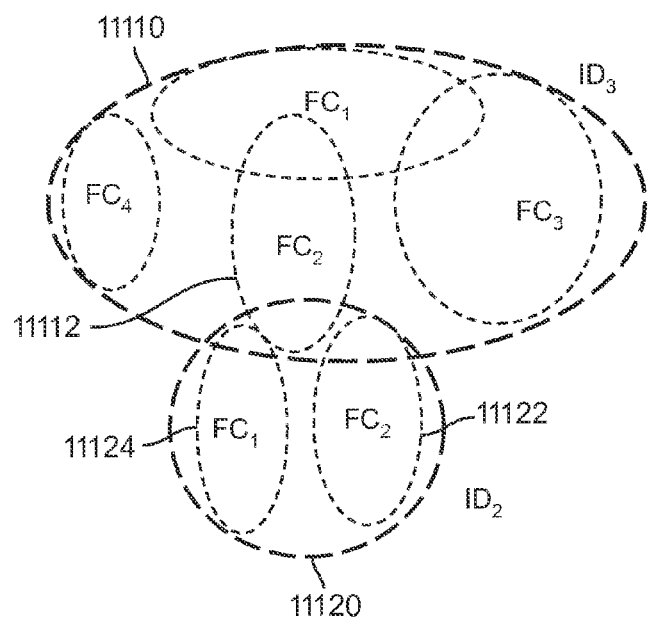
FIG. 11(b) describes how these overlapping identity regions can be separated from each other by shrinking the two identity regions into their component face classes.
Figure 11C:
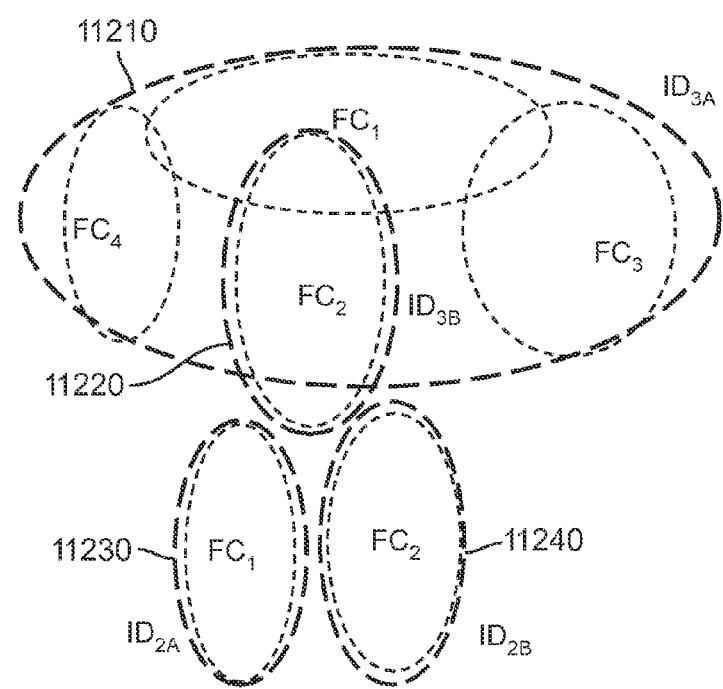
FIG. 11(c) illustrates a face class shrinking operation in accordance with a preferred embodiment.

Naturally as these bubbles of "known regions" in Face Space continue to expand they will eventually begin to overlap with other such bubbles. When this happens, a means of refining the boundary between the two regions in Face Space may become involved. To stay with the analogy of expanding bubbles: when two bubbles grow to overlap each other, these "outer bubbles" or larger bubbles (Identity Regions) will preferably "burst" when they begin to overlap, while the smaller bubbles within these larger bubbles (Face Classes) remain intact and continue to grow independently. The various steps of this process are illustrated in FIGS. 11(a)-11(c). In FIG. 11(a), it is illustrated how an Identity Space, $ID_3$ [11020], associated with one person can grow to overlap with the identity region, $ID_2$ [11030], of another person. When this occurs, a more granular separation of the boundary is preferably obtained between the regions of Face Space which identify these two distinct "known persons". The first step in this process is shown in FIG. 11(b) which describes how these overlapping identity regions can be separated from each other by "bursting" the outer bubbles, or Identity Regions and thus shrinking the region of Face Space associated with each "known person" back to their component Face Classes. In this example, the first Identity Region, $ID_3$ [11110], includes four internal Face Classes of which one, $FC_2$ [11112] overlaps with the second Identity Region, $ID_2$ [11120], which is composed of only 2 Face Classes, $FC_1$ [11124] and $FC_2$ [11114]. Each of these component Face Classes are now regrouped into new Identity Regions as shown in FIG. 11(c). Here we see that both Identity Regions have split into two smaller regions. The larger region now includes $ID_{3A}$ [11210] which contains three component Face Classes, and $ID_{3B}$ [11220] which includes a single component Face Class. The smaller region now includes $ID_{2A}$ [11230] and $ID_{2B}$ [11240] each including a single component Face Class.

Following on from the analogy of growing "bubbles" of Face Space and now "bursting" these "bubbles" when they start to overlap in order to shrink back the boundary region, there may occasionally arise a desire to reorganize and break down a Face Class into smaller constituent Face Classes. This occurs after the operation described with reference to FIGS. 11(a)-11(b), because three of the new Identity Regions obtained from the shrinking operation, illustrated in FIG. 11(c), have only a single constituent Face Class. Thus, if any of these classes now grows to overlap another Identity Region, shrinking it again is a problematic issue. A separate situation can also arise where the number of distinct Faceprints which constitute a Face Class has grown to quite a large number. In this situation this multiplicity of Faceprints represents a large amount of redundant information. Furthermore, during the search algorithm to determine a match with a new Faceprint each of these existing Faceprints would preferably be searched against separately. In such a case it also makes sense to break this parent Face Class down into a smaller, more compact, constituent set of Face Classes using some form of "clustering algorithm" to determine the main focal centers and substantially reduce the number of individual Face Prints.

Those skilled in the art will realize that there are a number of different ways to achieve the stated goal of separating a large Face Class into a set of smaller, more compact, Face Classes with a significantly reduced number of constituent Faceprints. In FIGS. 12(a)-12(c), an approach to solving this problem is illustrated which is that adopted in the preferred embodiment we describe herein. However there are other related algorithms which may prove more beneficial in different situations and we remark that it is not our intention to restrict the means by which a Face Class may be broken up into smaller, more compact, Face Classes. FIG. 12(a) shows a face class [12020] which has grown over time to incorporate a relatively large number of Faceprints [12010] which exhibit localized clustering. In this example, there are three obvious clusters of Faceprints. FIG. 12(b) illustrates explicitly how these Faceprints are clustered. For example the cluster, $C_3$ [12150] is comprised of three constituent Faceprints, [12152, 12154, and 12156]. By applying a conventional clustering algorithm, FIG. 12(c) shows how each local cluster can be replaced by a single Clustered Face Class which is composed of a centre faceprint location in face space and a cluster radius, $R_n$.

When the system is implemented on a handheld imaging apparatus such as a digital camera, it is possible to determine the equivalent of a clustered face class by capturing two reference images—one under flash illumination and one under ambient illumination. After processing these reference images to extract their normalized faceprints, they can be used to determine a baseline, or center, faceprint from the flash illuminated image and a radius of local variability, or face cluster radius, using the faceprint of the image captured under ambient illumination. An exemplary set of process steps for this technique is provided in FIGS. 15(a)-(e).

In our earlier description of the functioning of the recognition algorithm which operates as part of the Core Workflow module, it was mentioned that there is a 3-step comparative analysis applied to the current Faceprint. Thus, if the current Faceprint lies within a region of Face Space which corresponds to an existing Face Class, then the current Faceprint can be unambiguously associated with the "known person" described by the Face Class. Alternatively, if the current Faceprint lies within a region of Face Space which corresponds to an Identity Region then, again, the current Faceprint can unambiguously be associated with the "known person" described by the Identity Region. In the third step of comparison, the current Faceprint lies outside any known Face Classes or Identity Regions and thus is identified in the context of the closest N Faceprints.

Figure 13A:
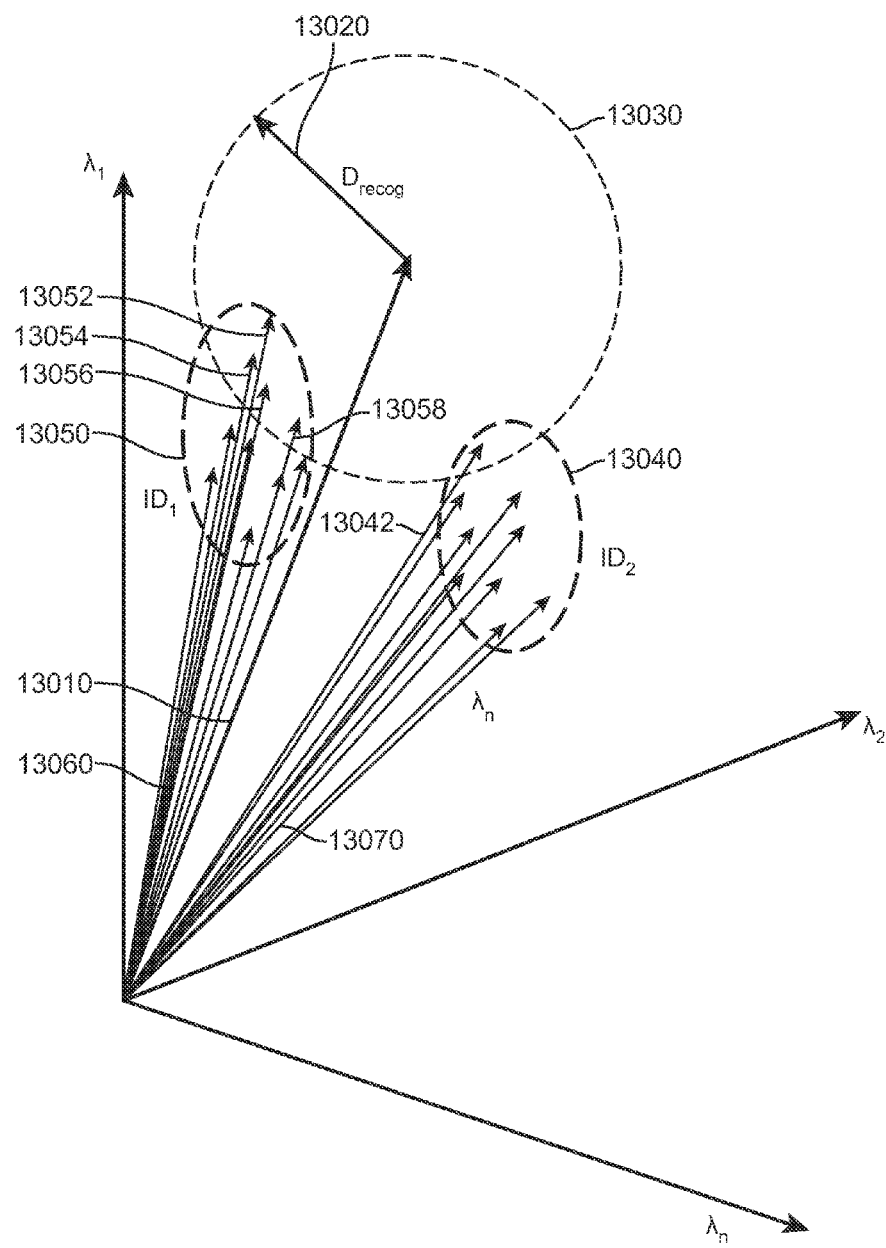
FIG. 13(a) describes the recognition process where a newly detected faceprint lies in an region of face space between two "known" identity regions.

This third step is now described in more detail. FIG. 13(a) describes the recognition process where the current Faceprint lies in a region of Face Space between two "known" Identity Regions. Typically the matching Faceprints lie within a maximum recognition distance or the current Faceprint is considered to be too far from any "known" Identity Regions to provide a useful match. Given that this distance criterion is satisfied, the algorithm matches at the N closest Faceprints to the current Faceprint. However, as the distances to the N nearest Faceprints may often be almost equal we generally accept that all Faceprints within a certain recognition radius, $D_{recog}$ [13020] are accepted as matches, provided that the number of matching Faceprints is greater than N. In the example shown, the value of N is 5. There are 4 matching Faceprints [13052, 13054, 13056 and 13058] which lie in Identity Region $ID_1$ [13050] and one matching Faceprint [13042] which lies in Identity Region $ID_2$ [13040]. As a rule of thumb, the algorithm requires that at least 75% of the closest Faceprint matches should be commonly associated to the same "known person" for an unambiguous match to be allowed. Thus in this example drawn from our preferred embodiment, the current Faceprint [13010] is matched with the "known person" associated with Identity Region $ID_1$ [13050].

Figure 13B:
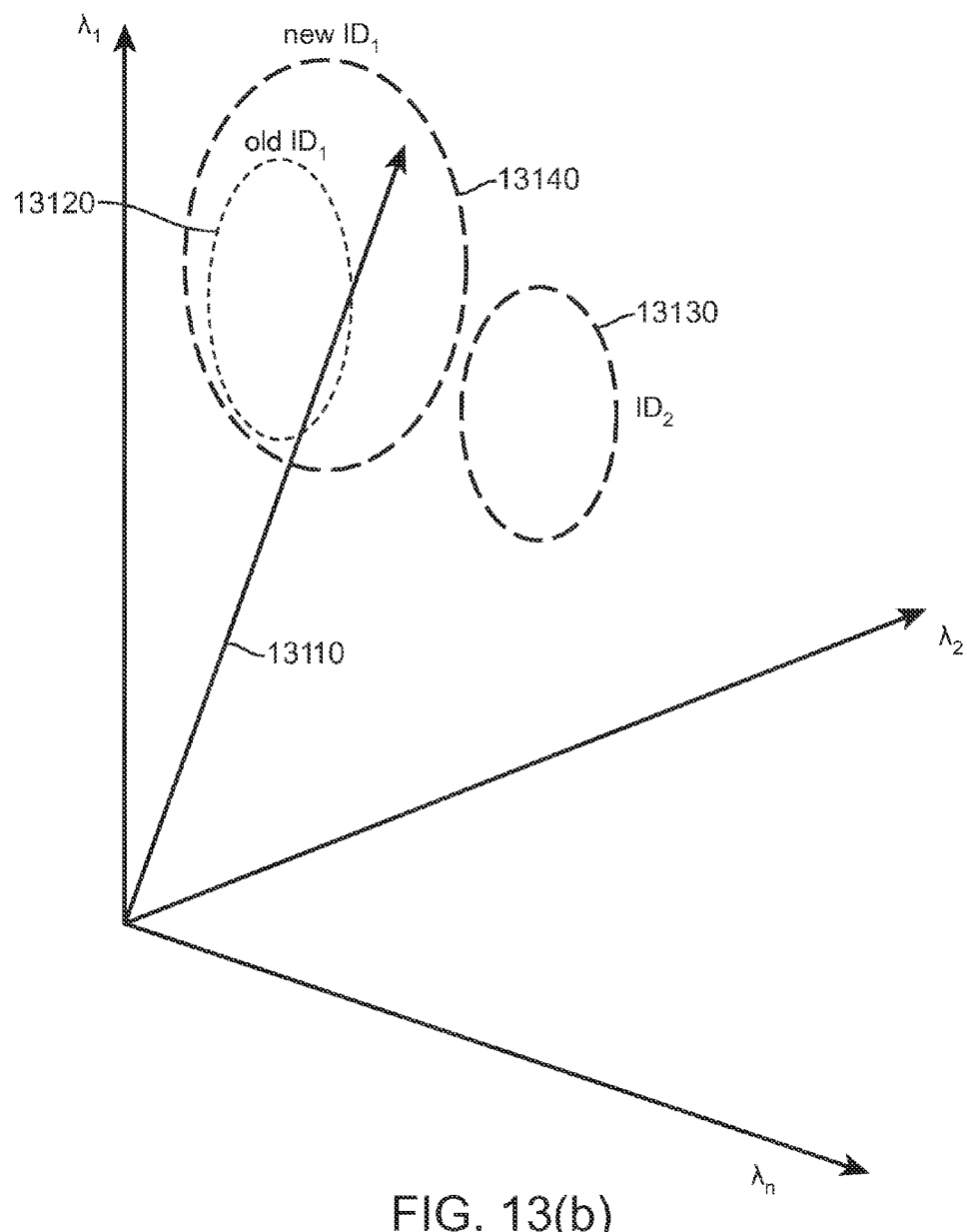
FIG. 13(b) shows how, once the recognition process has associated the new faceprint with one of the two known identity regions, $ID_1$, that identity region then grown to include the new faceprint as a new face class within $ID_1$.

FIG. 13(b) shows how, once the recognition process has associated the new faceprint [13110] with one of the two known identity regions, $ID_1$, that identity region, in this case $oldID_1$ [13120], then grows to include the new faceprint as a new face class within $ID_1$, forming $newID_1$ [13140].

Figure 13C:
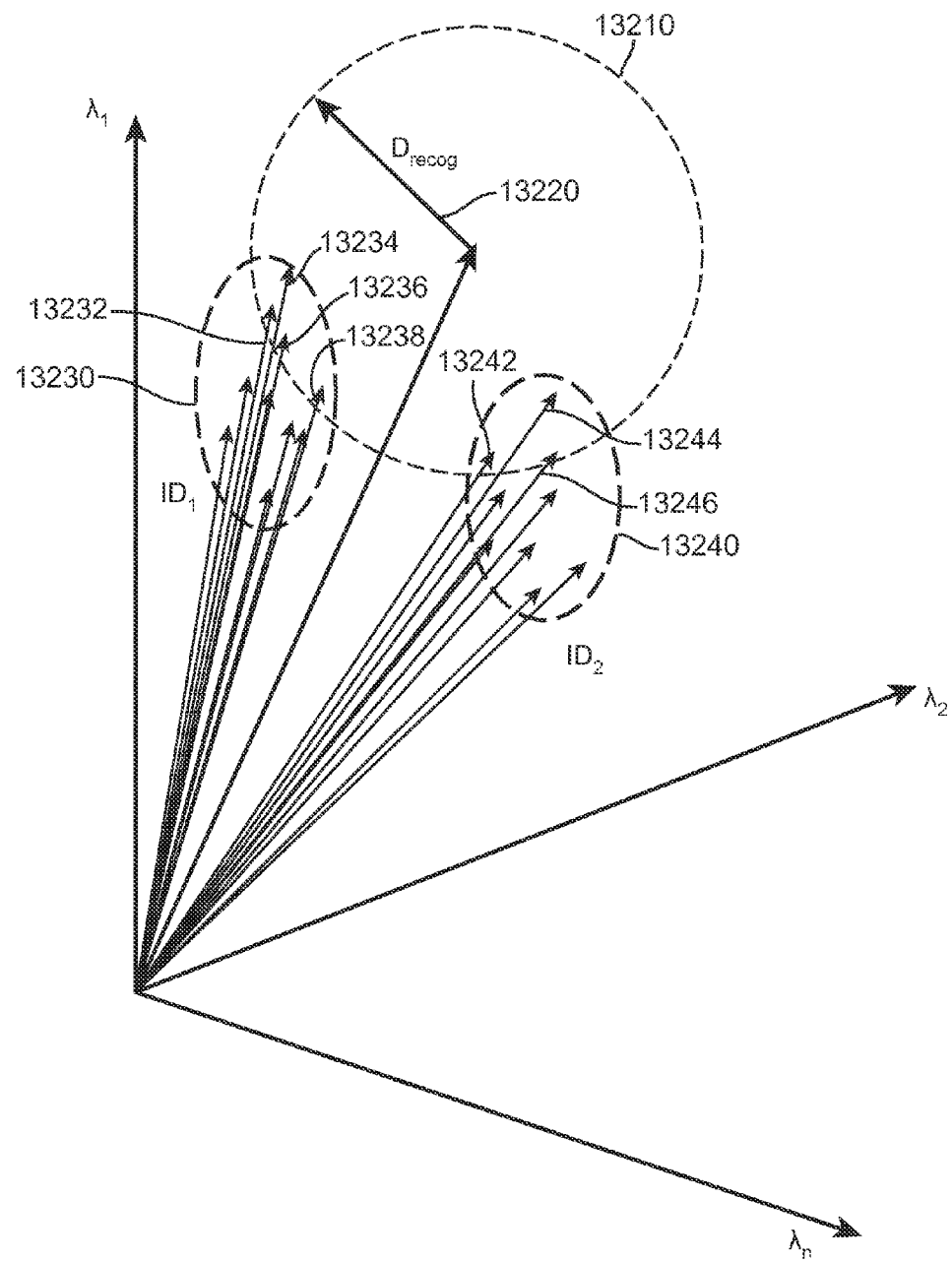
FIG. 13(c) shows a similar situation to FIG. 13(a) but in this case it is not clear which of the two identity regions should be associated with the new faceprint and the system must ask the user to make this determination.
Figure 13D:
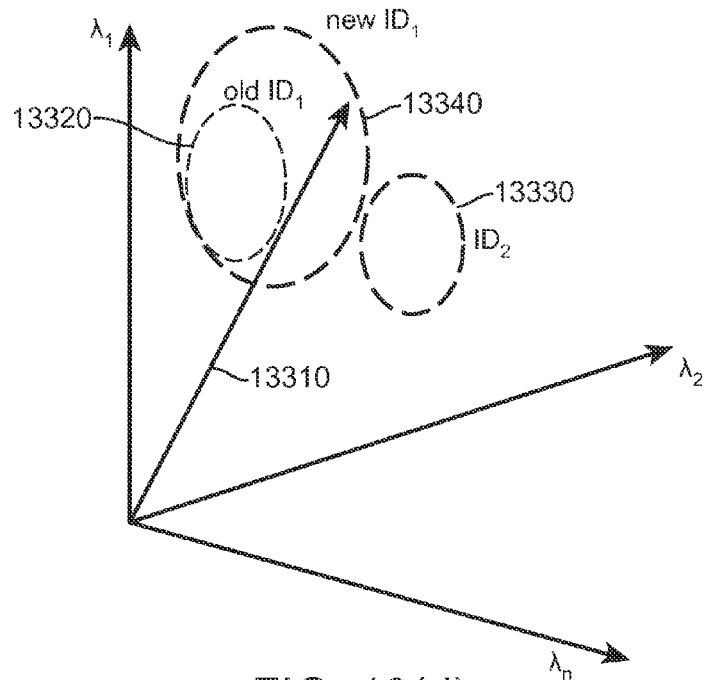
FIG. 13(d) illustrates the case where the user chooses $ID_1$.
Figure 13E:
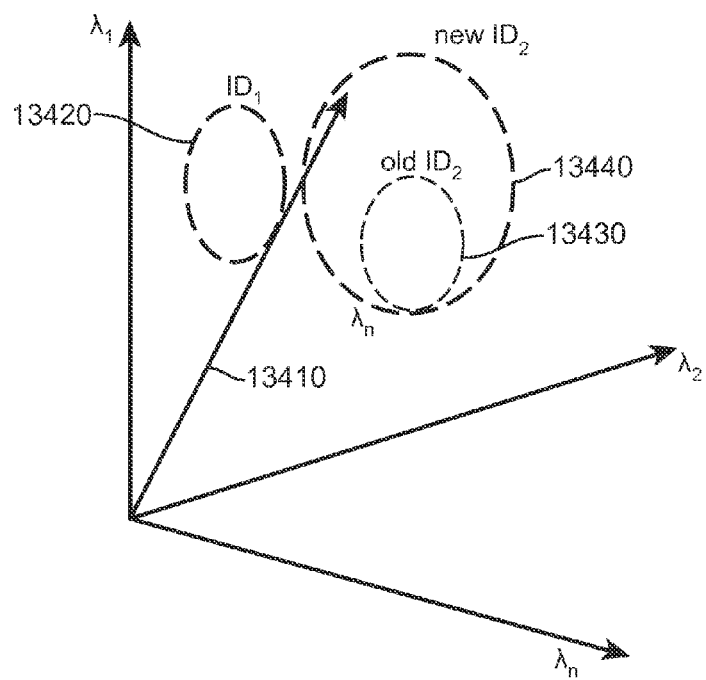
FIG. 13(e) illustrates the case where the user chooses $ID_2$.

FIG. 13(c) shows a similar situation to FIG. 13(a), but in this case it is not clear which of the two identity regions should be associated with the new faceprint as there is an almost equal number of matching Faceprints from each ID space and the system then preferably asks the user to make this determination. FIG. 13(d) illustrates the case where the user chooses identity space $ID_1$. In this case $oldID_1$ [13320], then grows to include the new faceprint [13310] as a new face class within $ID_1$, forming the new identity space, $newID_1$ [13340]. FIG. 13(e) illustrates the alternative case where the user chooses $ID_2$. In this case $oldID_2$ [13430], then grows to include the new faceprint [13410] as a new face class within $ID_2$, forming the new identity space, $newID_2$ [13440].

In this way, we may consider that new Faceprints cause "bubbles" of known face space to grow around existing identity regions until the surfaces of these "bubbles" begin to intersect with other regions. When a clear, unambiguous, association with an existing known identity cannot be established, then the system will return to the user to make this association.

FIGS. 14(a)-14(d) illustrates an exemplary user interface (UI) for implementing the system of the preferred embodiment. In the upper left of the browser window, an acquired digital image is shown, e.g., as acquired by a webcam, a digital camera cable-coupled to a PC, a digital camera (dedicated or as part of a mobile phone or pda) wherein the browser is resident on the camera and the UI is visible through a display on the camera, or a scanner. The lower left box within the browser window shows that two face regions have been identified. As described above, the face regions, upon detection as being in fact face regions, would be normalized and a set of face classifier parameter values would be extracted. Then, these would be compared to values corresponding to known identities archived within the database. The right hand side of the browser window indicates that one of the face regions identified corresponds to Darina who is a known person within the database. In this embodiment, the user is provided an option to select Darina as the known identity with which the image is to be associated, or to match to another face or to create a new face, although the system is suggesting that there is a face recognition match with Darina. The user could then cycle to the second face detected and likely be provided a suggestion to associated the second face with another known identity, Sarah.

Figure 14A:
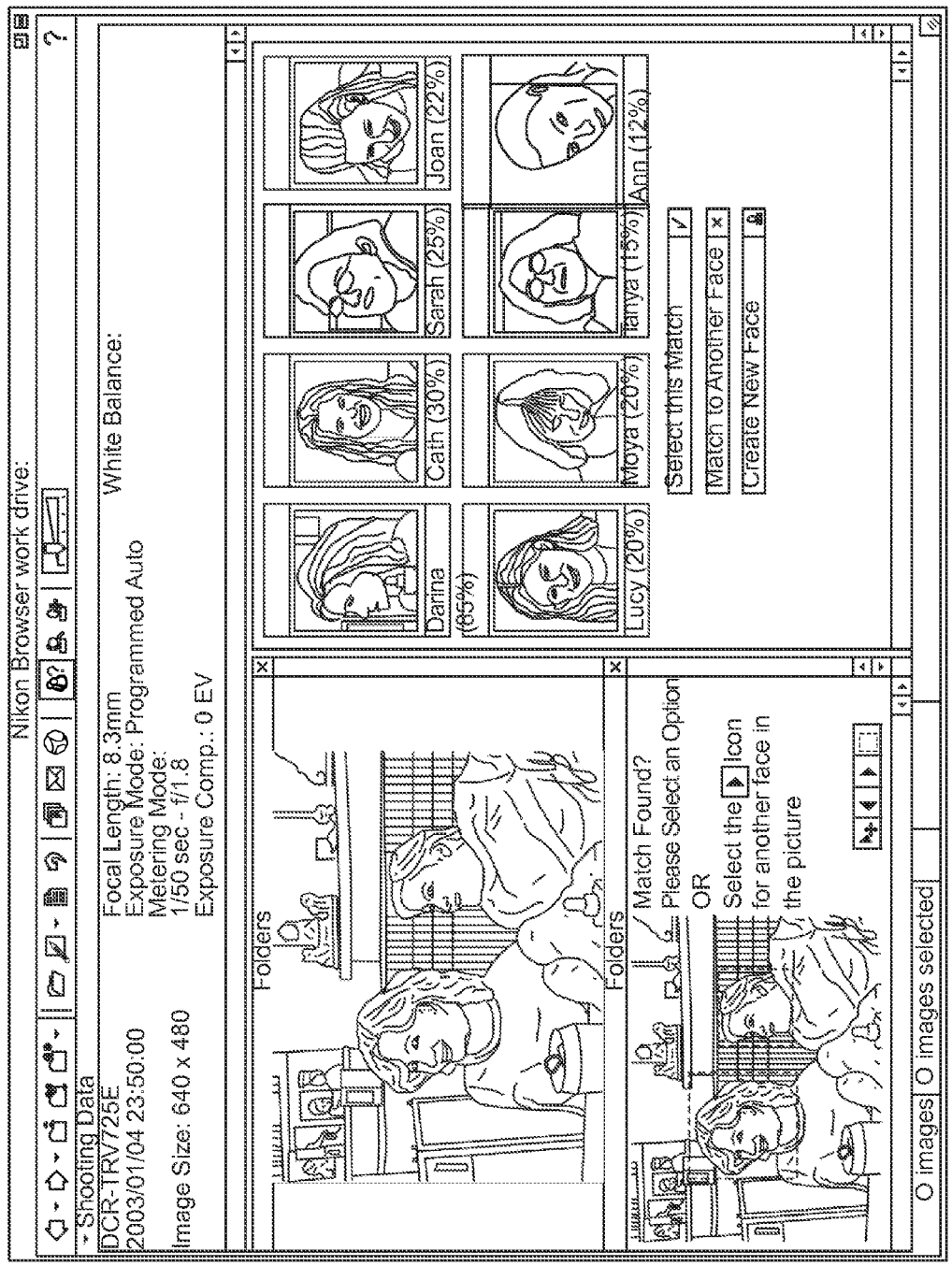
FIGS. 14(a)-14(d) show a variety of aspects of the user interface to the main workflow module.
Figure 14B:
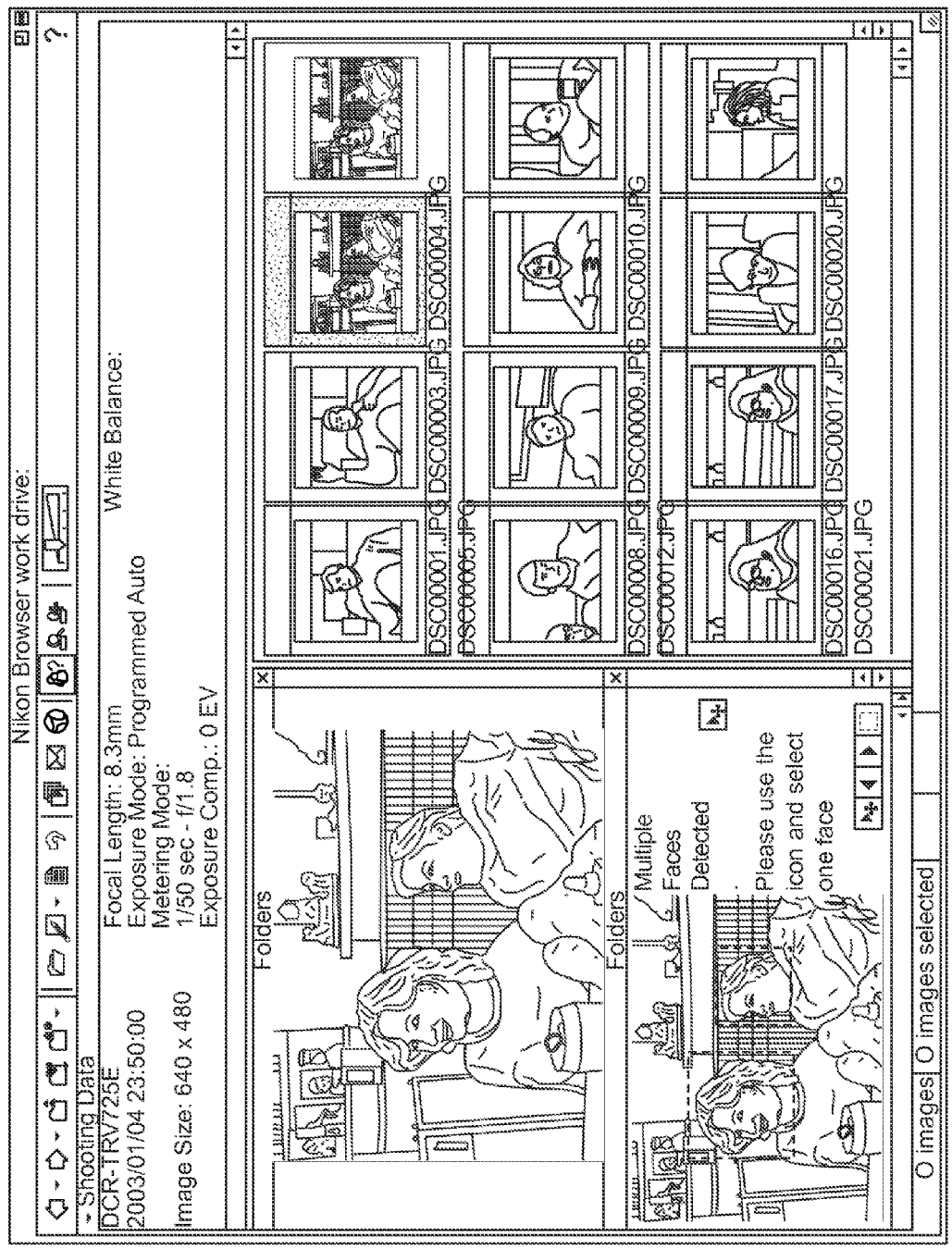

FIG. 14(b) indicates that the system recognizes that more than one face has been detected, and is providing the user an option to choose one of the faces for further processing. The right hand window in the browser is showing multiple digital images that may be linked and grouped in the archive in accordance with the preferred embodiment, including other images of the faces of Darina and Sarah that will be respectively associated with those known identities. Sarah and Darina themselves may be grouped together as friends, colleagues, workplace associates, etc., and probabilities for finding their faces together in an image containing multiple faces will preferably be increased within the face recognition algorithm.

Figure 14C:
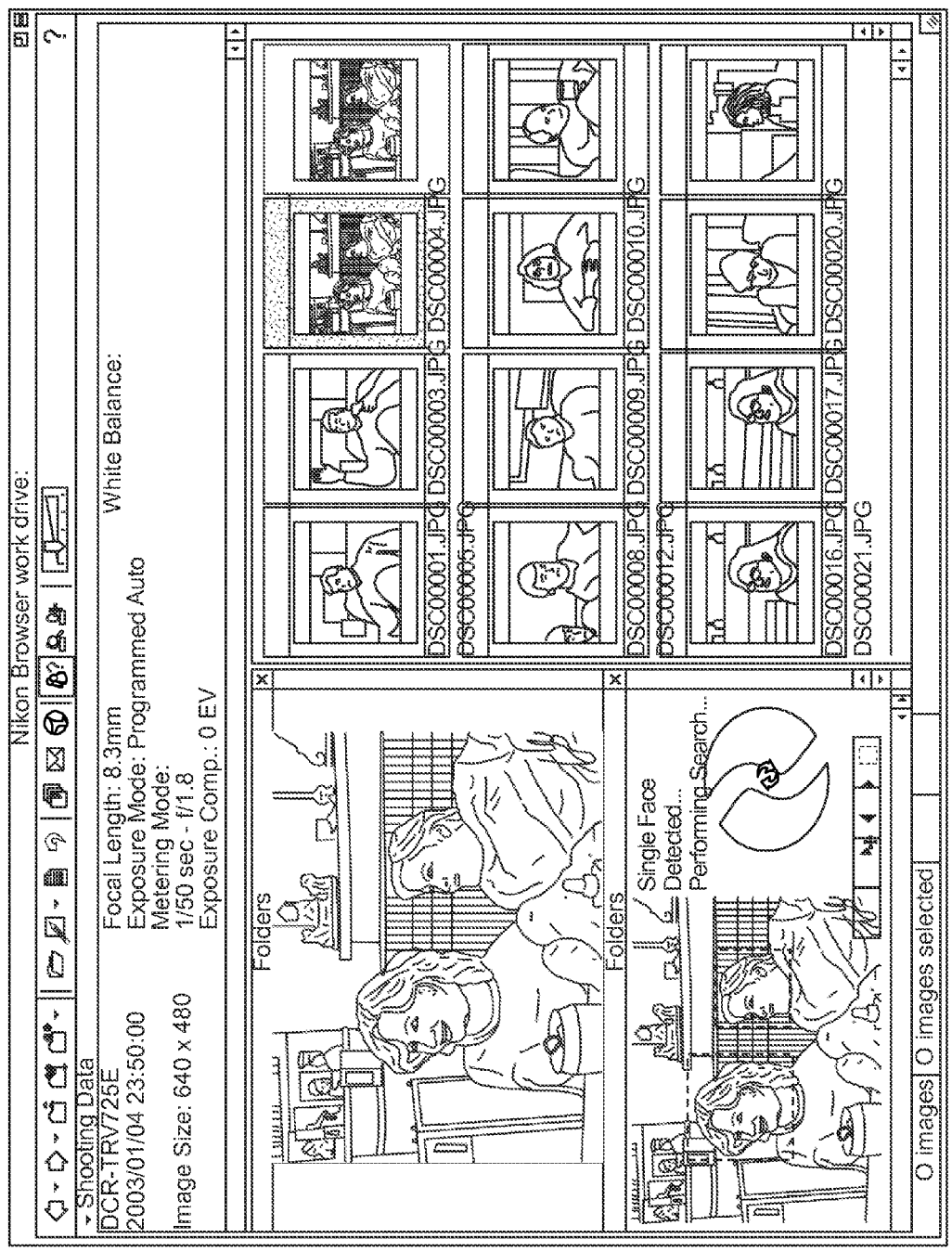
Figure 14D:
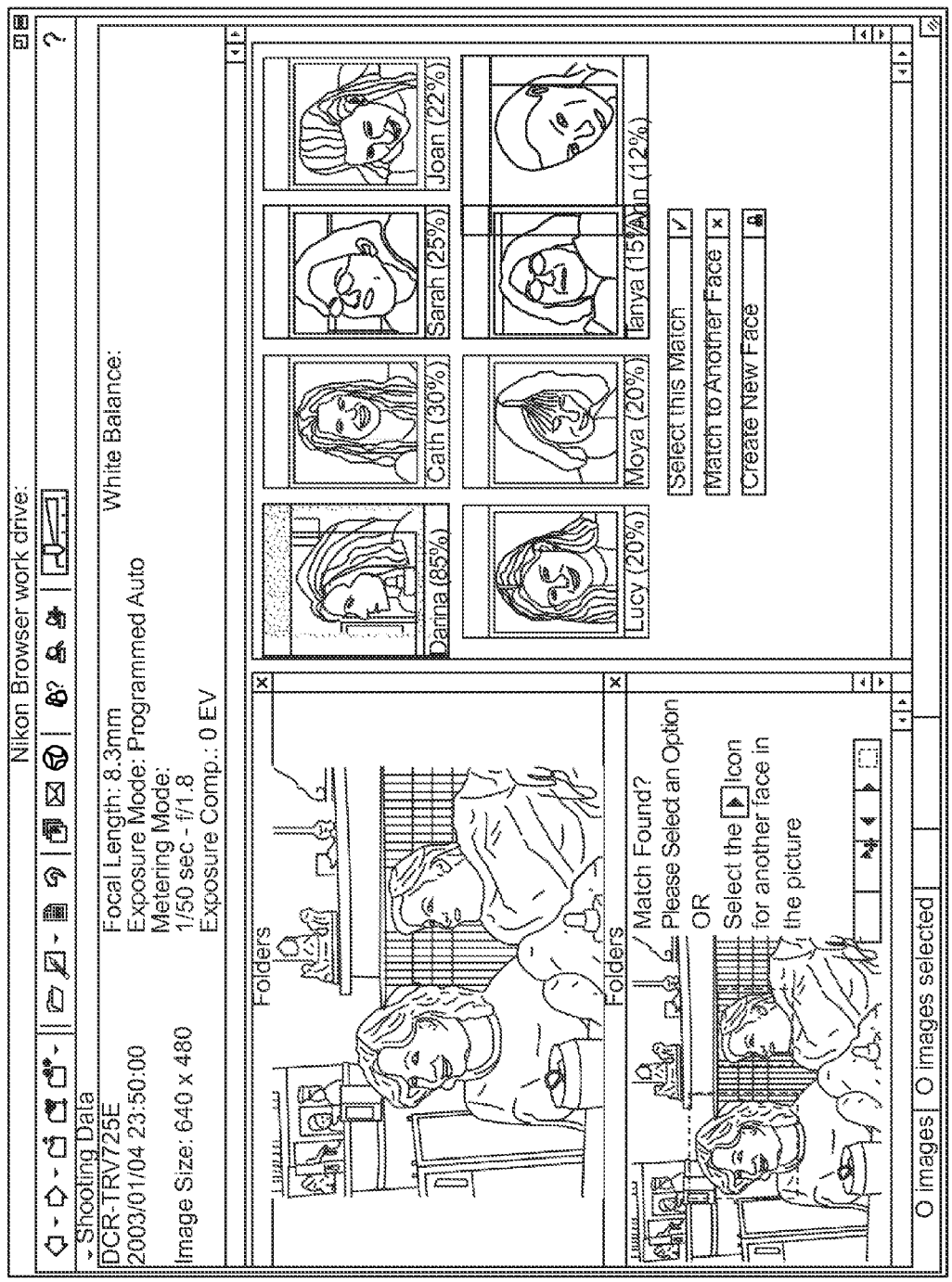

In FIG. 14(c), one of the faces has been selected, and FIG. 14(d) indicates that a match with Darina of 85% probability has been found among the prior known identities in the database. The system may be configured to automatically accept Darina as the match and associate and archive the face region and image within the database grouped with the identity Darina.

Face Detection and Enhancement Processing

Face detection was introduced above and a face detection module is included as part of the system of the preferred embodiment. Further details and alternative embodiments involving, utilizing or deriving from the face detection feature are now described. These embodiments include methods and devices for providing or suggesting options for automatic digital image enhancements based on information relating to the location, position, focus, exposure or other parameter or values of parameters of faces in an image. Such parameters or values of parameters may include a spatial parameter. For example, an orientation of a face or faces within an digital image may be used to adjust or suggest an adjustment of an orientation of the entire image or of one or more faces within the image. Color correction or enhancement may be automatically suggested or provided for digital images based on color or tonal values of faces in the image. Pleasing cropping of images may be suggested or provided based on knowledge particularly of the location and/or size of faces in the image. These enhanced images may be classified and archived within the database. In some cases, enhancements may be performed prior to facial recognition processing and/or as part of the normalization process. The enhanced images may be themselves alone archived or they may be preferably stored along with links to the original images.

A still image may be animated and used in a slide show by, e.g., zooming, panning and/or rotating where the center point of an image is within a face or at least the face is included in all or substantially all of the images in the slide show. Selective compression, or alternatively selective resolution, or both, of images may be suggested or automatically provided where one or more faces receive higher grade compression and/or alternatively higher local resolution than other portions of the image. A fill flash may be automatically digitally simulated or suggested, or actually applied to an object, upon analysis of a luminance map of the image. A camera may also be automatically focused prior to acquiring an image based on knowledge regarding the faces in an image.

One embodiment includes an image processing application whether implemented in software or in firmware, as part of the image capture process, image rendering process, or as part of post processing. This system receives images in digital form, where the images can be translated into a grid representation including multiple pixels. This application detects and isolates the faces from the rest of the picture, and determines sizes and locations of the faces relative to other portions of the image or the entire image. Orientations of the faces may also be determined. Based on information regarding detected faces, preferably separate modules of the system collect facial data and perform image enhancement operations based on the collected facial data. Such enhancements or corrections include automatic orientation of the image, color correction and enhancement, digital fill flash simulation and dynamic compression.

In another embodiment, the information regarding the location and size of faces in an image assist in determining correct auto focus distance and exposure in the camera. In a separate embodiment, such information can be processed in the camera as part of the post processing stage such that the saved image is already automatically corrected, enhanced and/or adjusted based on this information.

Advantages of these embodiments include the ability to automatically perform or suggest or assist in performing complex tasks that may otherwise call for manual intervention and/or experimenting. Another advantage is that important regions, e.g., faces, of an image may be assigned, marked and/or mapped and then processing may be automatically performed and/or suggested based on this information relating to important regions of the images. Automatic assistance may be provided to a photographer in the post processing stage. Assistance may be provided to the photographer in determining a focus and an exposure while taking a picture. Meta-data may be generated in the camera that would allow an image to be enhanced based on the face information.

Many advantageous techniques are provided in accordance with further alternative embodiments set forth herein. For example, a method of processing a digital image using face detection within said image to achieve one or more desired image processing parameters is provided. A group of pixels is identified that correspond to an image of a face within the digital image. Default values are determined of one or more parameters of at least some portion of the digital image. Values of the one or more parameters are adjusted within the digitally-detected image based upon an analysis of the digital image including the image of the face and the default values.

The digital image may be digitally-acquired and/or may be digitally-captured. Decisions for processing the digital image based on said face detection, selecting one or more parameters and/or for adjusting values of one or more parameters within the digital image may be automatically, semi-automatically or manually performed. Similarly, on the other end of the image processing workflow, the digital image may be rendered from its binary display onto a print, or a electronic display.

The one or more parameters that may be adjusted may include orientation, color, tone, size, luminance, relative exposure, relative spatial location, tone reproduction, sharpness or focus or combinations thereof. The one or more parameters may include a mask that defines one or more regions where the one or more parameters are valid. The mask may include a continuous presentation of varying strength within different sub-regions of said one or more regions. The one or more parameters may include the same parameter differing in value based on the mask.

Two or more parameters may be concatenated into a single parameter. The digital image may be transformed based on values of the one or more parameters. An operation list may be created for the digital image based on values of the one or more parameters. The operation list may be embedded within the digital image or may be external to the digital image.

Values of orientation may be adjusted such that a rotation value for the digital image is determined. Values of the color, tone, size, luminance, relative exposure may be adjusted including manipulating a color, tonal, size, luminance, fill-flash balance of the digital image, respectively. Values of relative spatial location may be adjusted including adjusting a spatial location of an image of a face relative to at least one other region of the digital image. Values of focus may be adjusted including adjusting values of focus for enhancing a focus of the image of the face within the digital image.

One or more different degrees of simulated fill flash may be created by manual, semi-automatic or automatic adjustment. The analysis of the image of the face may include a comparison of an overall exposure to an exposure around the identified face. The exposure may be calculated based on a histogram. Digitally simulation of a fill flash may include optionally adjusting tone reproduction and/or locally adjusting sharpness. One or more objects estimated to be closer to the camera or of higher importance may be operated on in the simulated fill-flash. These objects determined to be closer to the camera or of higher importance may include one or more identified faces. A fill flash or an option for providing a suggested fill-flash may be automatically provided. The method may be performed within a digital acquisition device, a digital rendering device, or an external device or a combination thereof.

The face pixels may be identified, a false indication of another face within the image may be removed, and an indication of a face may be added within the image, each manually by a user, or semi-automatically or automatically using image processing apparatus. The face pixels identifying may be automatically performed by an image processing apparatus, and a manual verification of a correct detection of at least one face within the image may be provided.

A method of digital image processing using face detection to achieve a desired image parameter is further provided including identifying a group of pixels that correspond to an image of a face within a digitally-detected image. Initial values of one or more parameters of at least some of the pixels are determined. An initial parameter of the digitally-detected image is determined based on the initial values. Values of the one or more parameters of pixels within the digitally-detected image are automatically adjusted based upon a comparison of the initial parameter with the desired parameter or an option for adjusting the values is automatically provided.

The digitally-detected image may include a digitally-acquired, rendered and/or digitally-captured image. The initial parameter of the digitally-detected image may include an initial parameter of the face image. The one or more parameters may include any of orientation, color, tone, size, luminance, and focus. The method may be performed within a digital camera as part of a pre-acquisition stage, within a camera as part of post processing of the captured image or within external processing equipment. The method may be performed within a digital rendering device such as a printer, or as a preparation for sending an image to an output device, such as in the print driver, which may be located in the printer or on an external device such as the PC, as part of a preparation stage prior to displaying or printing the image. An option to manually remove a false indication of a face or to add an indication of a face within the image may be included. An option to manually override, the automated suggestion of the system, whether or not faces were detected, may be included.

The method may include identifying one or more subgroups of pixels that correspond to one or more facial features of the face. Initial values of one or more parameters of pixels of the one or more sub-groups of pixels may be determined. An initial spatial parameter of the face within the digital image may be determined based on the initial values. The initial spatial parameter may include any of orientation, size and location.

When the spatial parameter is orientation, values of one or more parameters of pixels may be adjusted for re-orienting the image to an adjusted orientation. The one or more facial features may include one or more of an eye, a mouth, two eyes, a nose, an ear, neck, shoulders and/or other facial or personal features, or other features associated with a person such as an article of clothing, furniture, transportation, outdoor environment (e.g., horizon, trees, water, etc.) or indoor environment (doorways, hallways, ceilings, floors, walls, etc.), wherein such features may be indicative of an orientation. The one or more facial or other features may include two or more features, and the initial orientation may be determined base on relative positions of the features that are determined based on the initial values. A shape such as a triangle may be generated for example between the two eyes and the center of the mouth, a golden rectangle as described above, or more generically, a polygon having points corresponding to preferably three or more features as vertices or axis.

Initial values of one or more chromatic parameters, such as color and tone, of pixels of the digital image may be determined. The values of one or more parameters may be automatically adjusted or an option to adjust the values to suggested values may be provided.

Within a digital acquisition device, a method of perfecting acquisition parameters of a digital image as part of an image capture process using face detection within said captured image to achieve one or more desired image acquisition parameters is provided. Default values are determined of one or more image attributes of at least some portion of the digital image. Values of one or more camera acquisition parameters are determined. Groups of pixels are identified that correspond to an image of a face within the digitally-captured image. Corresponding image attributes to the groups of pixels are determined. One or more default image attribute values are compared with one or more captured image attribute values based upon analysis of the image of the face. Camera acquisition parameters are then adjusted corresponding to adjusting the image attribute values.

The method may be performed within any digital image capture device, which as, but not limited to digital still camera or digital video camera. The one or more parameters may include overall exposure, relative exposure, orientation, color balance, white point, tone reproduction, size, or focus, or combinations thereof. The face pixels identifying may be automatically performed by an image processing apparatus, and the method may include manually removing one or more of the groups of pixels that correspond to an image of a face. An automatically detected face may be removed in response to false detection of regions as faces, or in response to a determination to concentrate on less image faces or images faces that were manually determined to be of higher subjective significance, than faces identified in the identifying step. A face may be removed by increasing a sensitivity level of said face identifying step. The face removal may be performed by an interactive visual method, and may use an image acquisition built-in display.

The face pixels identifying may be performed with an image processing apparatus, and may include manually adding an indication of another face within the image. The image processing apparatus may receive a relative value as to a detection assurance or an estimated importance of the detected regions. The relative value may be manually modified as to the estimated importance of the detected regions.

Within a digital camera, a method of digital image processing using face detection for achieving a desired image parameter is further provided. A group of pixels is identified that correspond to a face within a digital image. First initial values of a parameter of pixels of the group of pixels are determined, and second initial values of a parameter of pixels other than pixels of the group of pixels are also determined. The first and second initial values are compared. Adjusted values of the parameter are determined based on the comparing of the first and second initial values and on a comparison of the parameter corresponding to at least one of the first and second initial values and the desired image parameter.

Initial values of luminance of pixels of the group of pixels corresponding to the face may be determined. Other initial values of luminance of pixels other than the pixels corresponding to the face may also be determined. The values may then be compared, and properties of aperture, shutter, sensitivity and a fill flash may be determined for providing adjusted values corresponding to at least some of the initial values for generating an adjusted digital image. The pixels corresponding to the face may be determined according to sub-groups corresponding to one or more facial features.

Within a digital acquisition device with an adjustable optical system having an auto focusing mechanism, a method of perfecting the auto focus mechanism of the adjustable optical system as part of an image capture process using face detection in the image capture process to achieve one or more desired image acquisition parameters is provided. Groups of pixels are identified that correspond to an image of a face within a digitally-captured image. Corresponding image attributes to the groups of pixels are determined. Auto focus is perfected by performing the auto focus on the plural groups of pixels that correspond to the image of the face.

The auto focus may be initially performed on the entire image the method for auto-focusing the lens and the automatic adjusting automatically adjusting one or more properties of the adjustable optical system. A user may manually activate the camera to perform the perfecting of the auto focus. The face pixels identifying may be automatically performed by an image processing apparatus, and one or more of the groups of pixels detected as faces may be manually removed in response to false detection of one or more regions as one or more faces, or in response to a determination to concentrate on less image faces than faces identified in the identifying step. The faces may be removed by increasing a sensitivity level of the face identifying step and/or by an interactive visual method. An image acquisition built-in display may be used. A weighted average on individual objects of the groups may be used in the auto-focus process. The face identifying step may be automatically performed by an image processing apparatus which receives a relative value as to detection assurance. In this case, a weighted average may be calculated based on the relative values as to the detection assurance. The face pixels identifying may be automatically performed by an image processing apparatus which receives a relative value as to an estimated importance of the detected regions. In this case, A weighted average may be calculated based on the relative values as to the estimated detection assurance. The estimated importance of the detected regions of faces may involve an analysis of a parameter such as size of the faces, location of the faces within the captured image, or relative exposure of the faces, or combinations thereof.

Within a digital camera having a lens system, a method of adjusting the capture parameters of a digitally-detected image based on detection of faces within the image to achieve a desired image parameter is also provided. The method may be used for auto-focusing the lens as part of the acquisition process. One or more parameters of pixels of the face image are determined. Values of the one or more parameters of the pixels may be automatically adjusted based upon a comparison of the initial parameter with the desired parameter. For example, one or more properties of the lens system may be automatically adjusted based on the values to adjust the focus, an indication to the region of focus or an adjustment option may be provided. The one or more parameters may include a spatial parameter such as a size and/or a location of the face in the image.

Within a digital acquisition device with a built in flash unit, a method of perfecting the exposure of an acquired digital image using face detection in the acquired image is provided. Groups of pixels that correspond to plural images of faces are identified within a digitally acquired image, and corresponding image attributes to the group of pixels are determined. An analysis is performed of the corresponding attributes of the groups of pixels. It is then determined to activate the built-in flash unit based on the analysis. An intensity of the built-in flash unit is determined based on the analysis.

An initial step of calculating image attributes may be performed on an entire acquired digital image and image attributes may be compared to the image attributes of the group of pixels. The image attributes may include exposure. The exposure may be calculated as a function of one or more parameters including aperture, speed, gain, or relative sensitivity, or combinations thereof. The groups of pixels of faces may be given a certain weight based on weight criteria. The weight criteria may be calculated based on a distance of the groups of pixels to the camera. The weight criteria may be calculated based on relative sizes of the groups of pixels.

A pre-flash may be performed based on the calculated flash intensity to determine whether the analysis is accurate. A second analysis may be performed based on the pre-flash.

One or more different degrees of simulated fill flash may be created by manual, semi-automatic or automatic adjustment. The analysis of the image of the face may include a comparison of an overall exposure to an exposure around the identified face. The exposure may be calculated based on a histogram. Digitally simulation of a fill flash may include optionally adjusting tone reproduction and/or locally adjusting sharpness. One or more objects estimated to be closer to the camera or of higher importance may be operated on in the simulated fill-flash. These objects determined to be closer to the camera or of higher importance may include one or more identified faces. A fill flash or an option for providing a suggested fill-flash may be automatically provided.

Within a digital camera, a further method of digital image processing using face detection for achieving a desired image parameter is provided. A group of pixels is identified that correspond to a face within a digital image. First initial values are determined of a parameter of pixels of the group of pixels. Second initial values of a parameter are determined of pixels other than pixels of the group of pixels. The first and second initial values are compared. Adjusted values of the parameter are determined based on the comparing of the first and second initial values and on a comparison of the parameter corresponding to at least one of the first and second initial values and the desired image parameter.

The parameter may include luminance, and the method may further include automatically generating the adjusted digital image using the adjusted values. The method may also further include automatically providing an option to generate the adjusted digital image using the adjusted values. The adjusted values of the luminance may be provided by a fill flash, or by a digitally-simulated fill flash.

Within a digital camera, a further method of digital image processing using face detection to achieve a desired luminance contrast is provided. A group of pixels is identified that correspond to a face within a digital image. First initial values of luminance of pixels of the group of pixels are determined. Second initial values of luminance of pixels other than pixels of the group of pixels are also determined. The first and second initial values are compared to determine an initial luminance contrast. Properties of a fill flash are determined for providing adjusted values of luminance for at least some of the pixels of the digital image based on a comparison of the initial luminance contrast and the desired luminance contrast.

Within a digital rendering device, a further method of digital image processing using face detection for achieving a desired image rendering parameters is provided. A group of pixels is identified that correspond to a face within a digital image. First initial values are determined of a parameter of pixels of the group of pixels. Second initial values of a parameter are determined of pixels other than pixels of the group of pixels. The first and second initial values are compared. Adjusted values of the parameter are determined based on the comparing of the first and second initial values and on a comparison of the rendering parameter corresponding to at least one of the first and second initial values and the desired image rendering parameter.

The parameter may include luminance, and the method may further include automatically generating the adjusted digital image using the adjusted values. The method may also further include automatically providing an option to generate the adjusted digital image using the adjusted values. The adjusted values of the luminance may be provided by changing the ink coverage, the display luminance values, etc.

Within a digital rendering device, a further method of digital image processing using face detection to achieve a desired contrast and color balance is provided. A group of pixels is identified that correspond to a face within a digital image. First initial values of contrast and/or color balance of pixels of the group of pixels are determined. Second initial values of contrast and/or color balance of pixels other than pixels of the group of pixels are also determined. The first and second initial values are compared to determine an initial contrast and/or color balance. Such tool may compensate for the disparity between the input or digitally acquired image and the output device. Such discrepancies may arise due to a mismatching of color gamut, the physical characteristic of the display, reflective or self luminance the limited contrast, the effect of the surrounding environment, etc.

A method of generating one or more new digital images using an original digitally-acquired image including a face is further provided. A group of pixels that correspond to a face within the original digitally-acquired image is identified. A portion of the original image is selected to include the group of pixels. Values of pixels of one or more new images based on the selected portion are automatically generated, or an option to generate them is provided, in a manner which always includes the face within the one or more new images.

A transformation may be gradually displayed between the original digitally-acquired image and one or more new images. Parameters of said transformation may be adjusted between the original digitally-acquired image and one or more new images. Parameters of the transformation between the original digitally-acquired image and one or more new images may be selected from a set of at least one or more criteria including timing or blending or a combination thereof. The blending may include dissolving, flying, swirling, appearing, flashing, or screening, or combinations thereof.

Methods of generating slide shows that use an image including a face are provided in accordance with the generation of one or more new images. A group of pixels is identified that correspond to a face within a digitally-acquired image. A zoom portion of the image including the group of pixels may be determined. The image may be automatically zoomed to generate a zoomed image including the face enlarged by the zooming, or an option to generate the zoomed image may be provided. A center point of zooming in or out and an amount of zooming in or out may be determined after which another image may be automatically generated including a zoomed version of the face, or an option to generate the image including the zoomed version of the face may be provided. One or more new images may be generated each including a new group of pixels corresponding to the face, automatic panning may be provided using the one or more new images.

A method of generating one or more new digital images using an original digitally-acquired image including a face is further provided. One or more groups of pixels may be identified that correspond to two or more faces within the original digitally-acquired image. A portion of the original image may be selected to include the group of pixels. Values of pixels may be automatically generated of one or more new images based on the selected portion in a manner which always includes at least one of the two or more faces within the one or more new images or a panning intermediate image between two of the faces of said two or more identified faces or a combination thereof.

Panning may be performed between the two or more identified faces. The panning may be from a first face to a second face of the two or more identified faces, and the second face may then be zoomed. The first face may be de-zoomed prior to panning to the second face. The second face may also be zoomed. The panning may include identifying a panning direction parameter between two of the identified faces. The panning may include sequencing along the identified panning direction between the two identified faces according to the identified panning direction parameter.

A method of digital image processing using face detection for achieving a desired spatial parameter is further provided including identifying a group of pixels that correspond to a face within a digital image, identifying one or more sub-groups of pixels that correspond to one or more facial features of the face, determining initial values of one or more parameters of pixels of the one or more sub-groups of pixels, determining an initial spatial parameter of the face within the digital image based on the initial values, and determining adjusted values of pixels within the digital image for adjusting the image based on a comparison of the initial and desired spatial parameters.

The initial spatial parameter may include orientation. The values of the pixels may be automatically adjusted within the digital image to adjust the initial spatial parameter approximately to the desired spatial parameter. An option may be automatically provided for adjusting the values of the pixels within the digital image to adjust the initial spatial parameter to the desired spatial parameter.

A method of digital image processing using face detection to achieve a desired orientation is also provided including identifying one or more groups of pixels that correspond to a face within a digital image, identifying one or more sub-groups of pixels that correspond to one or more facial features of the face, determining initial values of one or more parameters of pixels of the one or more sub-groups of pixels, determining an initial orientation of the face within the digital image based on the initial values, and determining adjusted values of pixels within the digital image for adjusting the orientation to the desired orientation.

Determining which of the sub-group of pixels belong to which of the group of face pixels may be performed. The determining of the initial values of one or more parameters of pixels may be calculated based on the spatial orientation of the one or more sub-groups that correspond to one or more facial features. The spatial orientation of the one or more sub-groups that correspond to one or more facial features may be calculated based on an axis of an ellipse fit to the sub-group. The adjusted values of pixels within the digital image may be rounded to a closest multiple of 90 degrees. The initial values may be adjusted to adjusted values for re-orienting the image to an adjusted orientation. The one or more facial features may include an eye, two eyes, two eyes and a mouth, an eye, a mouth, hairline, ears, nostrils, nose bridge, eyebrows neck as an extension of the face, or a nose, or combinations thereof, or otherwise as described above.

The method may include identifying one or more sub-groups of pixels that correspond to one or more facial features of the face. Initial values of one or more parameters of pixels of the one or more sub-groups of pixels may be determined. An initial spatial parameter of the face within the digital image may be determined based on the initial values. The initial spatial parameter may include any of orientation, size and location.

When the spatial parameter is orientation, values of one or more parameters of pixels may be adjusted for re-orienting the image to an adjusted orientation. The one or more facial features may include one or more of an eye, a mouth, two eyes, a nose, an ear, and other facial features including the neck as the physical extension of the face. The one or more facial features may include two or more features, and the initial orientation may be determined base on relative positions of the features that are determined based on the initial values. A shape such as a triangle may be generated for example between the two eyes and the center of the mouth, a golden rectangle as described above, or more generically, a polygon having points corresponding to preferably three or more features as vertices or axis.

Initial values of one or more chromatic parameters, such as color and tone, of pixels of the digital image may be determined. The values of one or more parameters may be automatically adjusted or an option to adjust the values to suggested values may be provided.

A method of digital image processing using face detection is also provided wherein a first group of pixels that correspond to a face within a digital image is identified, and a second group of pixels that correspond to another feature within the digital image is identified. A re-compositioned image is determined including a new group of pixels for at least one of the face and the other feature. The other feature may include a second face. The re-compositioned image may be automatically generated or an option to generate the re-compositioned image may be provided. Values of one or more parameters of the first and second groups of pixels, and relative-adjusted values, may be determined for generating the re-compositioned image.

A method of compression of an image including a face is also provided also including identifying a group of pixels that correspond to a face within a digitally-acquired image. A first compression portion of the image including the group of pixels is determined. A second compression portion of the image other than the group of pixels is also determined. The first compression portion may be automatically compressed with higher-grade compression than the second compression portion to generate a compressed image including the face, or an option to provided the compressed image including the different grade compressions may be provided.

A method of determining the necessary resolution of an image including a face is also provided also including identifying a group of pixels that correspond to a face within a digitally-acquired image. A first resolution portion of the image including the group of pixels is determined. A second resolution portion of the image other than the group of pixels is also determined. The first resolution portion may be automatically compressed with higher-resolution than the second resolution portion to generate a rendered image including the face, or an option to provided the compressed image including the different grade resolution may be provided. Such method may be used to save on rendering time or consumables. For example, such method may determine using more ink on the more important regions of an image, and less ink on regions of less importance, this saving on the overall ink consumption when printing an image.

Each of the methods provided are preferably implemented within software and/or firmware either in the camera, the rendering device such as printers or display, or with external processing equipment. The software may also be downloaded into the camera or image processing equipment. In this sense, one or more processor readable storage devices having processor readable code embodied thereon are provided. The processor readable code programs one or more processors to perform any of the above or below described methods.

Alternative Embodiments

Various techniques of optical engineering, software engineering and/or image processing may be utilized or incorporated with features of the preferred embodiments described above in advantageous alternative embodiments that may be within the scope of the present invention as set forth in the claims below and including structural and functional equivalents thereof. For example, techniques for image retrieval may be based on multi-scale edge characteristics (see. e.g., U.S. Pat. No. 6,072,904 to Desai et. al., hereby incorporated by reference). The target image and images in the database may be described by a vector of edge characteristics within the image. Thus image similarity may be determined based in part on a comparison of edge characteristics.

Visual information retrieval software may be employed to allow content-based search and retrieval of images based on visual objects contained within the images (see e.g., U.S. Pat. No. 5,911,139 to Jain et. al., hereby incorporated by reference). A set of universal primitives may be used for operating on images and generating a similarity score. Such techniques may be applied to face recognition. Advantageously, face recognition may be applied according to various techniques described herein or as understood by those skilled in the art, particularly following face region detection from digital images including single or multiple images of faces having random poses, sizes, colors and luminances, and corresponding normalization as described in accordance with a preferred embodiment.

Query by example may be used as part of an overall set of options to be used in an image classification and retrieval process, in addition to the many database index and query techniques already known to those skilled in the art (see, e.g., U.S. Pat. No. 5,852,823 to De Bonet, hereby incorporated by reference). A semantically based numeric descriptor may be used of a set of similar input images. The descriptor may be linguistically searchable, and when a new image is encountered, its signature can be matched with similar images in the database. Moreover, the techniques may be applied to entire images, or in accordance with a preferred embodiment, to detected faces within overall images captured with an image acquisition device such as a digital camera or scanner. Further, the detected faces are preferably normalized prior to application of the preferred facial recognition techniques based on comparison of faceprints of sets of facial classifier parameter values prior to classification.

Images may be compared by determining one or more main subject areas of an image and computing color histogram information on selected blocks within these areas (see, e.g., U.S. Pat. No. 6,351,556 to Loui et. al., hereby incorporated by reference). Correlations between histogram information in the two images, or areas within same overall images, video frames or photographs, may then be used as a measure of image similarity. Foreground "blobs" may be separated from background image data using segmentation techniques, and these foreground blobs may be determined to corresponds to images of persons captured within the image data (see, e.g., US patent application 2002/0168108 to Loui et. al., hereby incorporated by reference). Background/foreground similarity of images may be determined, and these can be subsequently grouped into event clusters (see, e.g., U.S. Pat. No. 6,351,556, hereby incorporated by reference).

Many of the image processing techniques involved with the preferred embodiments herein for face detection, normalization and recognition, and for association and classification in accordance with the workflow module, may be combined advantageously with archiving and retrieval into databases automatically or semiautomatically. An image management system may incorporate a method of managing images according to image groups (see, U.S. Pat. No. 6,349,373 to Sitka et al., hereby incorporated by reference). Images within particular groups may be associated with single persons in some applications such as for developing a file or biography of a single person, or with multiple persons in accordance with the preferred embodiment described above. Medical applications may benefit greatly by utilizing the single person application where a large amount of image data, e.g., x-rays, ultrasound scans, etc., which is related to a single patient may be gathered, classified and stored for organized retrieval. Much of this image data may not include facial images, but face detection may be applied to those images that do as a tool in the compiling and/or management this image data.

A database may be included in a preferred or alternative embodiment wherein raw visual data may be stored and can be converted to different output formats as requested by a data output device (see, e.g., U.S. Pat. No. 6,502,107 to Nishida, hereby incorporated by reference). Such database may be combined with the image processing techniques of the preferred embodiment permit advantageous data access and management. That is, a multi-format transcoder for visual data may be used with the face detection, normalization, recognition and workflow and database techniques previously described above and incorporated and not repeated here.

Further database techniques may be applied for managing digital image data, particularly following image processing in accordance with the modular software approach of the preferred embodiment, including the automatic or semiautomatic detection of faces, provision of detected face region information for normalization, extraction of face classifier values or comparison of extracted faceprints, among other automatic or semiautomatic features of the system. For example, image data may be maintained in its original, high-quality format, while the data may be delivered to a user in a lower quality format but one that may be, e.g., more efficient or functional (see, e.g., U.S. Pat. No. 6,564,225 to Brogliatti et. al., hereby incorporated by reference). Various techniques may be used for ensuring access control to image data stored on the system, and further for facilitating the online ordering and/or purchasing of image data over a Web interface. Image processing in accordance with a preferred embodiment may be combined with these techniques to determine image content or to organize or manage the image data.

An electronic photo album may be produced from image data stored in an image database. The photo album may be viewed over a network connection on a Web browser (see, e.g., U.S. Pat. No. 6,567,983 to Shiimori, hereby incorporated by reference). Preferably, the photo album may be constructed from images based on information concerning the identity of persons in each image, with these identities in turn being determined, at least primarily and/or where possible, based on face detection and recognition as set forth above herein and utilizing the workflow techniques or the preferred embodiment.

The facial detection, normalization, recognition and workflow techniques, by themselves or in any combination of these modules, may be combined with any of various recently developed techniques for accessing, grouping and managing of images in databases. For example, images in a database may be grouped and/or accessed based on some time-based similarity of the images (see, e.g., US patent applications 2003/0084065 to Lin et al., hereby incorporated by reference). The image similarity criteria may be based on an image creation timestamp, a last database access timestamp, or any other image information which is stored or can be computed or extrapolated from other image data stored in the database system.

The grouping of images may be automated based on a color correlogram of images (see, e.g., US patent application 2003/0059107 to Sun et. al., hereby incorporated by reference). The color correlogram of an image represents the spatial distribution of color in an image and provides an accurate color signature of an image compared, e.g., with a color histogram which only records the overall distribution of color in the image.

Image emphasis and appeal may be determined in part based on a some broad combination of different image characteristics (see, e.g., US patent applications 2003/0048950 and 2003/0059121 to Savakis et. al., hereby incorporated by reference). These image characteristics may include the presence of persons in an image. Face detection is preferably used for this purpose, while alternatively or in addition, a skin detector may be used. Face detection may also be used to determine if one or more people are part of the main subject of an image. Face region normalization and recognition, as well as workflow, are again preferably further included in the overall system. In one application, image emphasis and appeal data may be used to manage the retrieval and browsing of images in a database. In another application, the same emphasis and appeal data may be used to selectively control the compression of an image.

Advantages and Features

Several advantages and features have been described in accordance with preferred and alternative embodiments, in addition to the advantageous image classification workflow features. In a first aspect. A processor-based system is provided which operates according to digitally-embedded programming instructions and communicates with one or more digital data storage media for classifying and archiving images including face regions that are acquired with an image acquisition device. The programming instructions include a face detection module for identifying a group of pixels corresponding to a face region within digital image data acquired by the acquisition device. A normalization module generates a normalized version of the face region. A face recognition module extracts a set of face classifier parameter values from the normalized face region. The set of face classifier parameter values are collectively known as a faceprint associated with the normalized face region. A workflow module compares the extracted faceprint to a database of archived faceprints previously determined to correspond to one or more known identities. The workflow module determines based on the comparing whether the new faceprint corresponds to any of the one or more known identities, and associates the new faceprint and normalized face region with a new or known identity within a database including other data corresponding to the archived faceprints and associated parent images for performing further comparisons with further faceprints. A database module archives data corresponding to the new faceprint and its associated parent image according to the associating by the workflow module within one or more digital data storage media. A set of user interface modules serve to obtain user input in the classifying of faceprints and their associated normalized face regions and parent images.

In a related aspect, a processor-based workflow system is further provided which operates according to digitally-embedded programming instructions and communicates with one or more digital data storage media for classifying and archiving images including face regions that are acquired with an image acquisition device. The programming instructions include a workflow module providing for the automatic or semiautomatic processing of identified face regions within digital images from which normalized face classifier parameter values are extracted and collectively referred to as a faceprint. The processing includes comparing the extracted faceprint to a database of archived faceprints previously determined to correspond to one or more known identities. It is determined, based on the comparing, whether the new faceprint corresponds to any of the one or more known identities. The new faceprint is associated with a new or known identity within a database comprising other data corresponding to the archived faceprints and associated parent images for performing further comparisons with further faceprints, such as to permit data corresponding to the new faceprint and its associated parent image to be archived according to the associating by the workflow module within one or more digital data storage media. A set of user interface modules serve to obtain user input in the classifying of faceprints and their associated normalized face regions and parent images.

In a second aspect, a database of faceprint data corresponds to detected face regions within images acquired with an image acquisition device and digitally-embedded within one or more digital storage media. The database includes image, identity and face recognition data components. The image data component includes acquired digital image data including content data and unique identifiers corresponding to individual acquired digital images or face regions therein, or both. The identity data component includes an identification listing of known identities to which identified face regions detected within the image data have been determined to correspond. The face recognition data component includes, for an individual known identity, an appearance table, one or more identity tables and one or more face class tables. The appearance table includes one or more identity entries for the known identity. The one or more identity tables correspond to the one or more identity entries in the appearance table. The one or more face class tables correspond to one or more face class entries of the one or more identity tables. Each face class table includes one or more face print image entries corresponding to faceprints determined from normalized face regions identified within the acquired digital image.

The image data component may further include an image list of the acquired digital image data. A group of image data may include a face region list including one or more entries each corresponding to an identified face candidate region within an acquired digital image. The face region list may further include one or more links, corresponding to the one or more entries, to one or more known identities within the identification listing of the identity data component. The image data component may also include multiple tables of image classification categories to which the image data are determined to belong. The image data component may include a set of database links to the tables of image classification categories.

The known identities may correspond to handles identifying a known person. The identity data component may include database links to face recognition data of the face recognition component, and/or may include one or more database links to personal data associated with one or more known identities. The identity data component may also include a table of personal data associated with a known identity, and/or a set of links to a relationship list or a group membership list or both.

Each identity table may include one or more face class entries each defined by values of one or more face classifier parameters. Two identity entries may be characterized separately due to at least one distinguishing appearance characteristic. The appearance characteristic may be distinguished as determined from a sufficient difference in value of at least one face classifier parameter between faceprints and associated normalized face regions determined to correspond to the same known identity, or based on user input, or both The appearance table may include a list of links to one or more identity tables associated with distinct appearances determined for the known identity. The one or more identity tables may include one or more links corresponding to the one or more face class tables.

In another aspect, a database of faceprint data corresponds to detected face regions within images acquired with an image acquisition device and digitally-embedded within one or more digital storage media, and includes image, identity and face recognition data components. The image data component includes an acquired digital image, or a pointer to the location of the image, and additional data associated with the image including content data and unique identifiers corresponding to the acquired digital images or face regions therein, or both. The image data component further includes an image list of the acquired digital image data. The identity data component includes an identification listing of known identities to which identified face regions detected within the image data have been determined to correspond. The face recognition data component includes, for an individual known identity, one or more identity tables corresponding to one or more identity entries, and one or more face class tables corresponding to one or more face class entries of the one or more identity tables. Each face class table includes one or more faceprint entries corresponding to normalized face regions determined from the acquired digital image.

The one or more groups of image data may further include image metadata including acquisition device specific information or anthropometrical information associated with conditions of acquisition or normalization, or both, of a face region corresponding to a group of image data and its associated parent image. The image metadata information may include the focal length of a lens coupled with a digital camera at time of image acquisition, a focusing distance of the lens at time of acquisition, or an effective digital camera sensor size, or combinations of two or more of these.

The one or more image data groups may also include additional image data associated with circumstances of acquisition of a parent image and associated face region corresponding to a group of image data. These circumstances may include a location of image acquisition, date and time of image acquisition, type of image acquisition device, or any post-capture image processing including red eye correction or luminance correction, or combinations of these.

A group of image data may include a face region list including one or more entries each corresponding to an identified face candidate region within an acquired digital image. The face region list may include one or more links, corresponding to the one or more entries, to one or more known identities within the identification listing of the identity data component.

The image data component may include multiple tables of image classification categories to which the image data are determined to belong. The image data component may include a set of database links to the tables of image classification categories.

The known identities may correspond to handles identifying a known person. The identity data component may include database links to face recognition data of the face recognition component. The identity data component may also include one or more database links to personal data associated with one or more known identities, and/or a table of personal data associated with a known identity. The personal data may include full name, one or more addresses, one or more phone numbers, one or more email addresses, or one or more web addresses, or combinations of these. The identity data component may also include a set of links to a relationship list or a group membership list or both. The relationship list may include data on relationships between the known identity and other identities named within the database. The group membership list may include data on grouping of known identities based on family ties, hobbies, interests, group memberships, interpersonal relationships, or combinations thereof. Each identity table may include one or more face class entries each defined by values of one or more face classifier parameters.

In still another aspect, a database of face print image data corresponds to detected face regions within images acquired with an image acquisition device and digitally-embedded within one or more digital storage media, and includes image, identity and face recognition data components. The image data component includes acquired digital image data including content data and unique identifiers corresponding to individual acquired digital images or face regions therein, or both.

The identity data component includes an identification listing of known identities to which identified face regions detected within the image data have been determined to correspond. The face recognition data component includes, for an individual known identity, one or more identity tables and one or more face class tables. The identity tables correspond to one or more identities. Each identity table includes one or more face class entries each defined by values of one or more face classifier parameters. The face class tables correspond to the one or more face class entries of the one or more identity tables. Each face class table includes one or more face print image entries corresponding to faceprints from the acquired digital image data.

The image data component may include an image list of the acquired digital image data. The known identities may correspond to handles identifying a known person. The identity data component may include database links to face recognition data of the face recognition component, and/or to personal data associated with one or more known identities. The identity data component may also include a table of personal data associated with a known identity, wherein the personal data may include full name, one or more addresses, one or more phone numbers, one or more email addresses, or one or more web addresses, or combinations thereof. The identity data component may also include a set of links to a relationship list or a group membership list or both. The relationship list may include data on relationships between the known identity and other identities named within the database. The group membership list may include data on grouping of known identities based on family ties, hobbies, interests, group memberships, interpersonal relationships, or combinations thereof.

Two identity entries may be characterized separately due to at least one distinguishing appearance characteristic. The appearance characteristic may be distinguished as determined from a sufficient difference in value of at least one face classifier parameter between normalized faceprints determined to correspond to the same known identity, or based on user input, or both The appearance table may include a list of links to one or more identity tables associated with distinct appearances determined for the known identity. The identity tables may include one or more links corresponding to the one or more face class tables. The face class tables may include one or more of the previously determined value ranges of the one or more face classifier parameters. Each value range may be uniquely associated with an identified and user confirmed face region detected within an acquired digital image.

In a further aspect, a processor-based system programming instructions includes a face detection module for identifying face regions within digital images. A normalization module generates a normalized version of the face region that is at least pose normalized. A face recognition module extracts a set of face classifier parameter values from the normalized face region that are referred to as a faceprint. A workflow module compares the extracted faceprint to a database of archived faceprints previously determined to correspond to known identities. The workflow module determines based on the comparing whether the new faceprint corresponds to any of the known identities, and associates the new faceprint and normalized face region with a new or known identity within a database. A database module serves to archive data corresponding to the new faceprint and its associated parent image according to the associating by the workflow module within one or more digital data storage media.

In a related aspect, a processor-based workflow system is further provided which operates according to digitally-embedded programming instructions and communicates with one or more digital data storage media for classifying and archiving images including face regions that are acquired with an image acquisition device. The programming instructions include a normalization module for at least pose normalizing the face region. The programming instructions further include a workflow module providing for the automatic or semiautomatic processing of identified face regions within digital images from which normalized face classifier parameter values are extracted and collectively referred to as a faceprint. The processing includes comparing the extracted faceprint to a database of archived faceprints previously determined to correspond to one or more known identities. It is determined, based on the comparing, whether the new faceprint corresponds to any of the one or more known identities. The new faceprint is associated with a new or known identity within a database comprising other data corresponding to the archived faceprints and associated parent images for performing further comparisons with further faceprints, such as to permit data corresponding to the new faceprint and its associated parent image to be archived according to the associating by the workflow module within one or more digital data storage media.

The pose normalizing may include determining the pose of a confirmed face region, mapping the face region onto a 3d average-face model to create an interim 3d model of the face region, rotating the interim 3d model into full frontal alignment, and translating the facial aspect of the interim 3d model back onto 2d image space to create a pose normalized face region. The determining of the pose of a confirmed face region may include determining locations of principle facial feature within the face region, determining at least two geometric relationships between the facial features, and extrapolating from the geometric relationships the plane of the facial region, relative to the normal plane of the image acquisition apparatus thereby determining the facial pose relative to the normal plane of the image acquisition apparatus. The principle facial features may include two of an eye-pair, nose and mouth regions.

The mapping of the face region onto a 3d average-face model may include an additional resealing of the 3d average face model along at least one horizontal dimension. The additional resealing may be based on the at least two geometric relationships determined in the pose determining. The normalizing may include performing one or more additional normalizing operations on the pose normalized face region. The one or more additional normalization operations may include luminance, size, or orientation normalization, or combinations of two or more of these.

In another aspect, a processor-based system operating according to digitally-embedded programming instructions includes a face detection module for identifying face regions within digital images. A normalization module generates a normalized version of the face region. A face recognition module automatically extracts a set of face classifier parameter values from the normalized face region that are referred to as a faceprint. A workflow module automatically compares the extracted faceprint to a database of archived faceprints previously determined to correspond to known identities. The workflow module determines based on the comparing whether the new faceprint corresponds to any of the known identities, and associates the new faceprint and normalized face region with a new or known identity within a database. A database module serves to archive data corresponding to the new faceprint and its associated parent image according to the associating by the workflow module within one or more digital data storage media.

In a related aspect, a processor-based workflow system is further provided which operates according to digitally-embedded programming instructions and communicates with one or more digital data storage media for classifying and archiving images including face, regions that are acquired with an image acquisition device. The programming instructions include a normalization module for normalizing the face region. The programming instructions further include a workflow module providing for the automatic or semiautomatic processing of identified face regions within digital images from which normalized face classifier parameter values are automatically extracted and collectively referred to as a faceprint. The processing includes automatically comparing the extracted faceprint to a database of archived faceprints previously determined to correspond to one or more known identities. It is then determined, based on the comparing, whether the new faceprint corresponds to any of the one or more known identities. The new faceprint is associated with a new or known identity within a database comprising other data corresponding to the archived faceprints and associated parent images for performing further comparisons with further faceprints, such as to permit data corresponding to the new faceprint and its associated parent image to be archived according to the associating by the workflow module within one or more digital data storage media.

The face detection module may automatically identify the group of pixels corresponding to the face region when the digital image is received. The detected face regions may be automatically processed for normalization when they are identified.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

What is claimed is:

1. A processor-based image acquisition and processing system comprising:
   an image acquisition component comprising a lens and image sensor for acquiring a digital image, and
   a processing component including a processor and a memory having processor-readable code embedded therein for programming the processor to perform a method of classifying and archiving images including face regions that are acquired with an image acquisition component, wherein the method comprises:
   identifying a group of pixels corresponding to a face region within digital image data acquired by the acquisition device;
   extracting a set of face analysis parameter values from said face region, said set of face analysis parameter values comprising a faceprint associated with said face region that comprises a vector defined by a set of values for a set of face classifier parameters mapped into a faceprint space within one or more existing face classes or within a new face class defined as including one or more faceprints that are defined by vectors defined by a set of values that fall within a certain geometric distance of the vector defining a faceprint data range;

determining a first reference faceprint for a person using a reference image captured in predetermined face-portrait conditions;

determining a second reference faceprint for a person using a reference image captured using ambient conditions;

analyzing said first and second reference faceprints to determine a baseline faceprint and a range of variability from said baseline associated with said person; and storing results of said analyzing and using said results in the subsequent recognition of said person in a subsequent image acquired under ambient conditions.

2. The system of claim 1, wherein the method further comprises repeating for one or more different persons.

3. The system of claim 1, wherein the method further comprising normalizing said face regions with respect to size.

4. The system of claim 1, wherein the method further comprises normalizing said face regions with respect to a standard size based on one or more distances between eyes, nose or mouth, or combinations thereof.

5. The system of claim 1, wherein the method further comprises normalizing said face regions first with respect to pose, and then with respect to orientation, and then with respect to size.

6. A method of classifying and archiving images including face regions that are acquired with an image acquisition component, wherein the method comprises:

using a processor;

identifying a group of pixels corresponding to a face region within digital image data acquired by the acquisition device;

extracting a set of face analysis parameter values from said face region, said set of face analysis parameter values comprising a faceprint associated with said face region that comprises a vector defined by a set of values for a set of face classifier parameters mapped into a faceprint space within one or more existing face classes or within a new face class defined as including one or more faceprints that are defined by vectors defined by a set of values that fall within a certain geometric distance of the vector defining a faceprint data range;

determining a first reference faceprint for a person using a reference image captured in predetermined face-portrait conditions; determining a second reference faceprint for a person using a reference image captured using ambient conditions;

analyzing said first and second reference faceprints to determine a baseline faceprint and a range of variability from said baseline associated with said person; and storing results of said analyzing and using said results in the subsequent recognition of said person in a subsequent image acquired under ambient conditions.

7. The method of claim 6, further comprising repeating for one or more different persons.

8. The method of claim 6, further comprising normalizing said face regions with respect to size.

9. The method of claim 6, further comprising normalizing said face regions with respect to a standard size based on one or more distances between eyes, nose or mouth, or combinations thereof.

10. The method of claim 6, further comprising normalizing said face regions first with respect to pose, and then with respect to orientation, and then with respect to size.

11. One or more non-transitory computer-readable media having code embedded therein for programming a processor to perform a method of classifying and archiving images including face regions that are acquired with an image acquisition component, wherein the method comprises:

identifying a group of pixels corresponding to a face region within digital image data acquired by the acquisition device;

extracting a set of face analysis parameter values from said face region, said set of face analysis parameter values comprising a faceprint associated with said face region that comprises a vector defined by a set of values for a set of face classifier parameters mapped into a faceprint space within one or more existing face classes or within a new face class defined as including one or more faceprints that are defined by vectors defined by a set of values that fall within a certain geometric distance of the vector defining a faceprint data range;

determining a first reference faceprint for a person using a reference image captured in predetermined face-portrait conditions; determining a second reference faceprint for a person using a reference image captured using ambient conditions;

analyzing said first and second reference faceprints to determine a baseline faceprint and a range of variability from said baseline associated with said person;

storing results of said analyzing and using said results in the subsequent recognition of said person in a subsequent image acquired under ambient conditions.

12. The one or more computer-readable media of claim 11, wherein the method further comprises repeating for one or more different persons.

13. The one or more computer-readable media of claim 11, wherein the method further comprising normalizing said face regions with respect to size.

14. The one or more computer-readable media of claim 11, wherein the method further comprises normalizing said face regions with respect to a standard size based on one or more distances between eyes, nose or mouth, or combinations thereof.

15. The one or more computer-readable media of claim 11, wherein the method further comprises normalizing said face regions first with respect to pose, and then with respect to orientation, and then with respect to size.

* * * * *